US 011635004B2

United States Patent
Kiwan et al.

(10) Patent No.: US 11,635,004 B2
(45) Date of Patent: Apr. 25, 2023

(54) METHODS AND SYSTEM FOR OPERATING SKIPPED CYLINDERS TO PROVIDE SECONDARY AIR

(71) Applicant: Ford Global Technologies, LLC, Dearborn, MI (US)

(72) Inventors: Rani Kiwan, Canton, MI (US); Chris Paul Glugla, Macomb, MI (US); Brad VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 17/233,271

(22) Filed: Apr. 16, 2021

(65) Prior Publication Data

US 2022/0333509 A1 Oct. 20, 2022

(51) Int. Cl.
*F01L 1/344* (2006.01)
*F01L 1/08* (2006.01)
*F01L 13/00* (2006.01)
*F02D 13/02* (2006.01)
*F02D 13/06* (2006.01)
*F02D 41/06* (2006.01)

(52) U.S. Cl.
CPC .......... *F01L 1/3442* (2013.01); *F01L 1/08* (2013.01); *F01L 13/0005* (2013.01); *F02D 13/0207* (2013.01); *F02D 13/06* (2013.01); *F02D 41/064* (2013.01); *F01L 2001/34426* (2013.01); *F01L 2013/001* (2013.01); *F01L 2800/01* (2013.01)

(58) Field of Classification Search
CPC ...... F02D 41/06; F02D 41/062; F02D 41/064; F02D 13/00; F02D 13/02; F02D 2013/001
See application file for complete search history.

(56) References Cited

U.S. PATENT DOCUMENTS

| 5,117,790 | A | 6/1992 | Clarke et al. |
|---|---|---|---|
| 5,743,221 | A | 4/1998 | Schmitz |
| 7,555,896 | B2 | 7/2009 | Lewis et al. |
| 9,169,788 | B2 | 10/2015 | Smith et al. |
| 9,291,106 | B2 | 3/2016 | Switkes et al. |
| 9,708,993 | B2 | 7/2017 | Glugla |

(Continued)

OTHER PUBLICATIONS

Kiwan, R. et al., "Methods and System for Operating Skipped Cylinders To Provide Secondary Air," U.S. Appl. No. 17/233,233, filed Apr. 16, 2021, 122 pages.

*Primary Examiner* — John Kwon
(74) *Attorney, Agent, or Firm* — Vincent Mastrogiacomo; McCoy Russell LLP

(57) ABSTRACT

Methods and systems are provided for providing secondary air to an exhaust system during catalyst warm-up. In one example, a method may include, during a cold start condition, operating an engine with a first number of cylinders unfired and a remaining number of cylinders fired during an engine cycle, opening an intake valve of an unfired cylinder of the first number of cylinders during an expansion stroke of the unfired cylinder, and opening an exhaust valve of the unfired cylinder during a compression stroke of the unfired cylinder. In this way, the unfired cylinders may provide the secondary air to the exhaust system during a stroke that increases mixing of the secondary air with burned exhaust gas from fired cylinders, thus increasing exotherm production in the exhaust system to increase a temperature of the catalyst.

13 Claims, 25 Drawing Sheets

(56) References Cited

U.S. PATENT DOCUMENTS

| | | |
|---|---|---|
| 10,233,796 B2 | 3/2019 | Shost et al. |
| 11,365,693 B1 * | 6/2022 | Kiwan .................. F02D 41/064 |
| 11,365,695 B1 * | 6/2022 | Kiwan .................. F02D 41/064 |
| 11,391,227 B1 * | 7/2022 | Kiwan ................ F02D 41/0007 |
| 2019/0285016 A1 * | 9/2019 | Surnilla .................. F02N 11/08 |

* cited by examiner

METHODS AND SYSTEM FOR OPERATING SKIPPED CYLINDERS TO PROVIDE SECONDARY AIR

FIELD

The present description relates generally to methods and systems for introducing secondary air in an internal combustion engine system.

BACKGROUND/SUMMARY

Exhaust emission control devices, such as catalytic converters (also referred to herein as "catalysts"), achieve higher emission reduction after reaching a predetermined operating temperature (e.g., a light-off temperature). Thus, to lower vehicle emissions, various methods attempt to raise emission control device temperature as fast as possible. For example, catalysts are currently placed as close to the engine as possible to minimize heat losses and catalyst warm-up time after an engine cold start. Due to "lambda one" emissions regulations, it is desired to move catalysts further downstream from the engine to reduce catalyst degradation during peak power, as it may not possible to use enrichment to control exhaust temperature in the future. However, doing so may increase an amount of time before the catalyst reaches its light-off temperature. Therefore, new solutions are desired to quickly warm up the catalyst and simultaneously minimize hydrocarbon emissions during warm-up, even if the catalyst is located further downstream from the engine.

Other attempts to reduce hydrocarbon emissions during warm-up include leveraging engine skip-fire operation. One example approach is shown by Glugla et al. in U.S. Pat. No. 9,708,993 B2. Therein, an engine may be operated with a group of cylinders selectively deactivated, with spark retard on remaining active cylinders increased, and with engine speed increased to reduce noise, vibration, and harshness (NVH) issues during the skip-fire operation.

However, the inventors herein have recognized that deactivated cylinders may be further leveraged to provide thermactor functionality. Typically, a thermactor provides air to an exhaust system upstream of an emission control device, which exothermically reacted with unburnt fuel in exhaust gas to create an exothermic reaction that will heat the emission control device. The inventors herein have recognized that instead of having dedicated thermactor components, the deactivated (e.g., skipped) cylinders may be used to pump secondary (e.g., thermactor) air to the exhaust system. The inventors herein have further recognized that skip-fire patterns that are desirable for good mixing of the secondary air and the exhaust gas, which may aid exotherm generation, may result in excessive secondary air being provided and cooling of the exhaust system. Thus, finer control of a ratio of exhaust gas and secondary air is desired in order to expedite emission control device heating while reducing NVH and increasing mixing.

In one example, the issues described above may be addressed by a method, comprising: during a cold start condition, operating an engine with a first number of cylinders unfired and a remaining number of cylinders fired during an engine cycle, opening an intake valve of an unfired cylinder of the first number of cylinders during an expansion stroke of the unfired cylinder, and opening an exhaust valve of the unfired cylinder during a compression stroke of the unfired cylinder. In this way, the unfired cylinders may provide secondary air in a manner that increases mixing between the secondary air and exhaust gas, thus increasing exotherm production.

As one example, the intake valve may be controlled via an intake continuously variable valve lift (CVVL) actuator, and the exhaust valve may be controlled via an exhaust CVVL actuator. For example, the intake CVVL actuator may include an intake cam having a first intake cam lobe that provides a first intake valve lift interval during an intake stroke of the unfired cylinder and a second intake cam lobe that provides a second intake valve lift interval during the expansion stroke of the unfired cylinder. Similarly, the exhaust CVVL actuator may include an exhaust cam having a first exhaust cam lobe that provides a first exhaust valve lift interval during an exhaust stroke of the unfired cylinder and a second exhaust cam lobe that provides a second exhaust valve lift interval during the compression stroke of the unfired cylinder. In such an example, the method may include rotating each of the intake cam and the exhaust cam at half of a speed of a crankshaft of the engine. Alternatively, each of the intake cam and the exhaust cam may include a single valve lift interval, and the method may include rotating each of the intake cam and the exhaust cam at the speed of the crankshaft of the engine.

As a further example, to open the intake valve of the unfired cylinder during the expansion stroke, a first hydraulic pressure in the intake CVVL actuator may be maintained above a threshold pressure during the second intake valve lift interval. As such, the first hydraulic pressure may overcome a spring force of the intake valve during the second intake valve interval to open the intake valve. Similarly, to open the exhaust valve of the unfired cylinder during the compression stroke of the unfired cylinder, a second hydraulic pressure in the exhaust CVVL actuator may be maintained above the threshold pressure during the second exhaust valve lift interval. Further, during the cold start condition, the intake valve of the unfired cylinder may be maintained closed during the intake stroke of the unfired cylinder, such as by maintaining the first hydraulic pressure below the threshold hydraulic pressure during the first intake valve lift interval, and the exhaust valve of the unfired cylinder may be maintained closed during the exhaust stroke of the unfired cylinder by maintaining the second hydraulic pressure below the threshold hydraulic pressure during the first exhaust valve lift interval. Alternatively, the intake valve may be opened during both of the intake stroke and the expansion stroke during the cold start condition, and the exhaust valve may be opened during both of the exhaust stroke and the compression stroke during the cold start condition.

In this way, secondary air may be provided by at least the portion of the unfired cylinders during a cold start condition, prior to a catalyst reaching its light-off temperature, during at least the compression stroke of the corresponding unfired cylinder. By providing the secondary air via one or more of the unfired cylinders instead of a separate, dedicated thermactor air source, a cost of the system may be reduced. Further, by exhausting the secondary air during the compression stroke, increased mixing with exhaust gas from a fired cylinder may occur, as the fired cylinder may emit the exhaust gas at a same time as the secondary air is exhausted. By increasing mixing using the unfired cylinder(s), exotherm generation may be increased without using cylinder deactivation patterns that result in excess secondary air flow. By reducing or preventing excessive secondary air flow, exhaust system cooling may be reduced or prevented, further expediting the catalyst warm-up and further reducing vehicle emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 21:
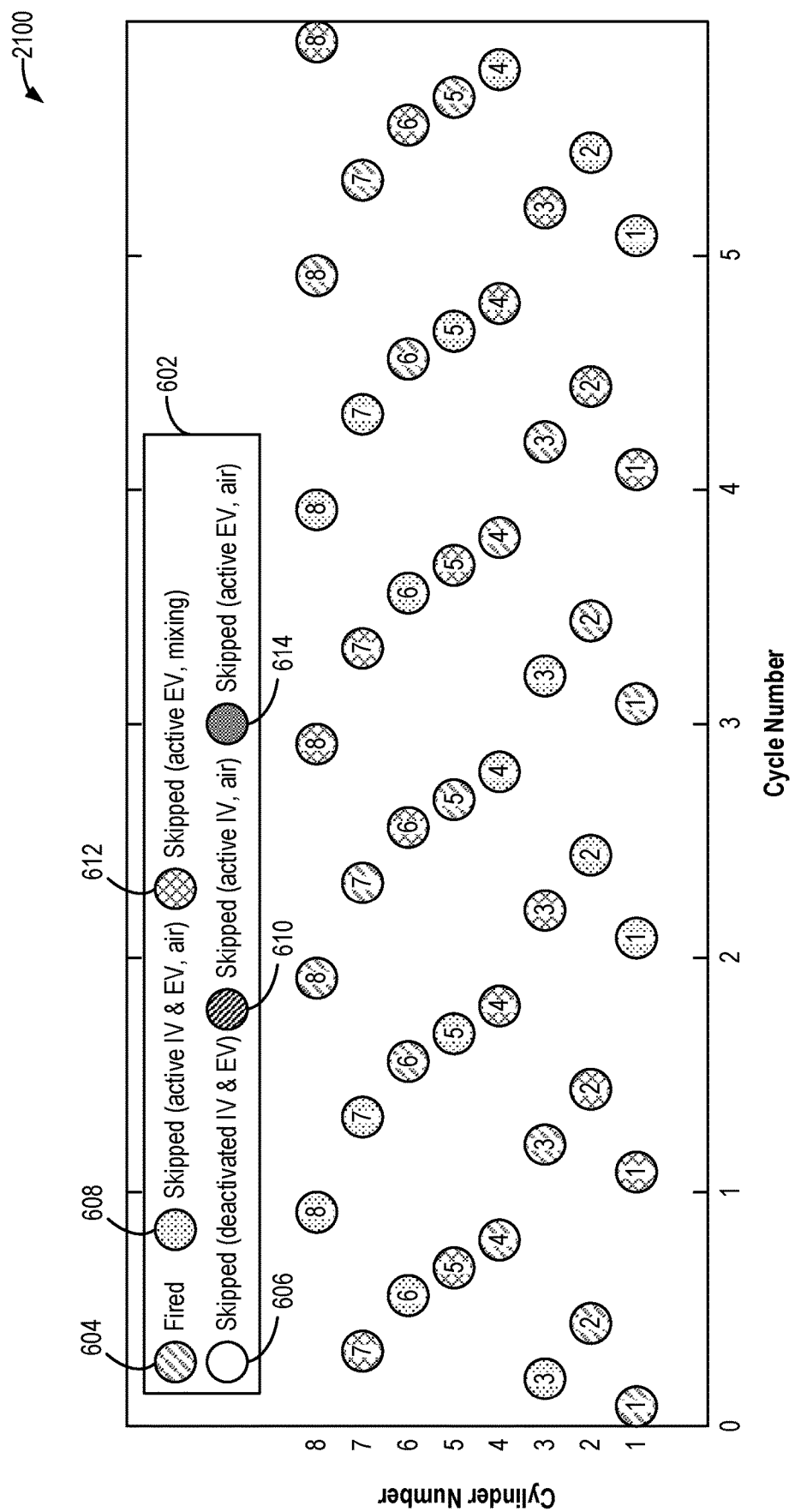
FIG. 21 shows a sixteenth example cylinder deactivation pattern, where secondary air is provided to an exhaust system using a same rolling patterns for each cylinder with increased mixing.
Figure 22:
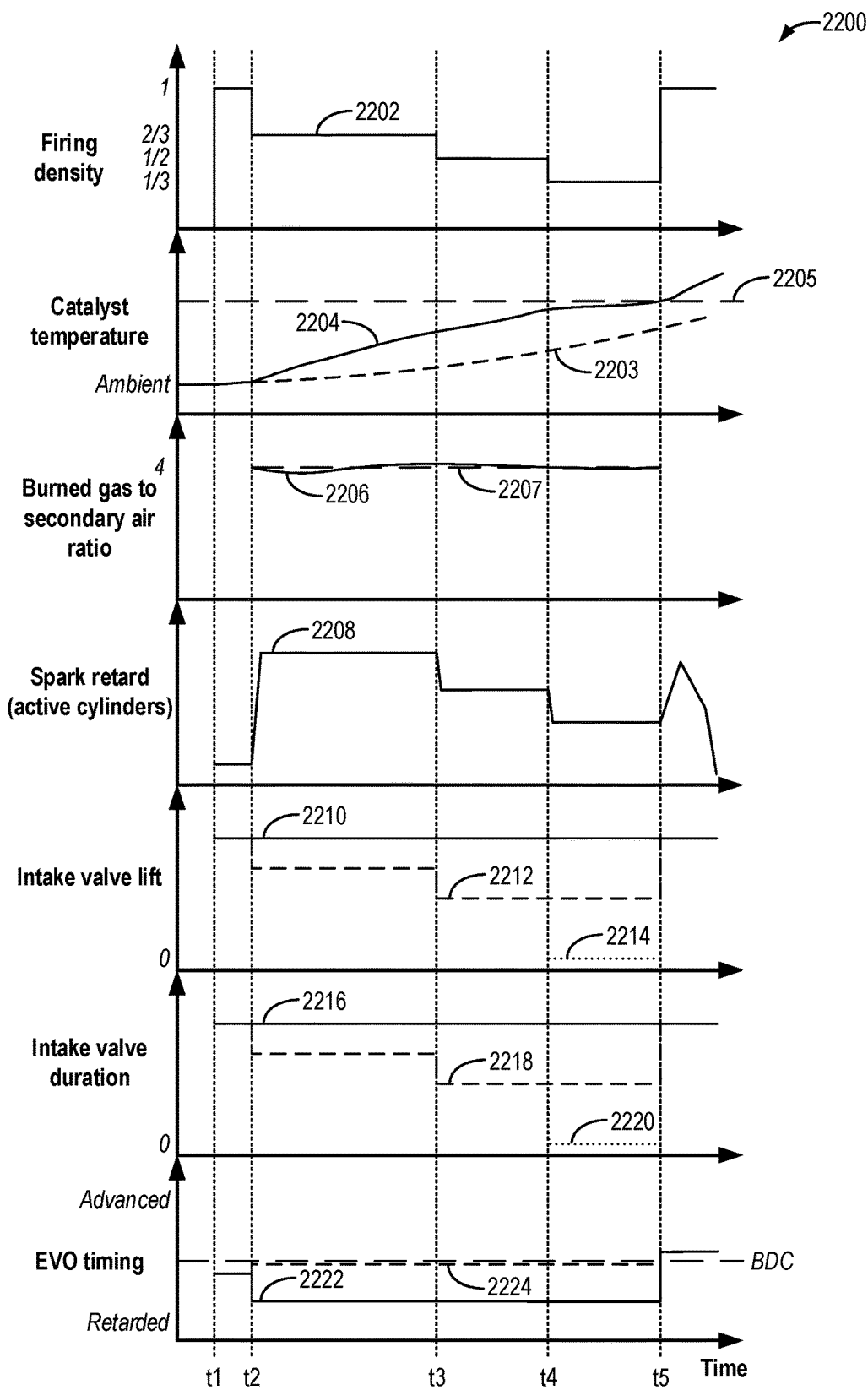
FIG. 22 shows a prophetic example timeline for adjusting engine operating parameters during an engine cold start to provide secondary air for catalyst heating via deactivated cylinders.

The following description relates to systems and methods for reducing exhaust emissions during an engine start. The engine may be the engine schematically shown in FIG. 1, for example, and may be a variable displacement engine (VDE), wherein combustion may be discontinued in a number of cylinders (referred to herein as deactivated cylinders) while a remaining number of active cylinders produce torque. Further, the engine may include a valve actuation mechanism that enables intake and/or exhaust valves to be differently adjusted for each cylinder or group of cylinders. For example, the valve actuation mechanism may be a variable cam timing (VCT) mechanism, such as the VCT mechanism shown in FIG. 2, or a continuously variable valve lift (CVVL) mechanism, such as the CVVL mechanism shown in FIG. 4. In particular, the VCT mechanism may be a "fast" VCT mechanism that enables valve timing adjustments between cylinders that are consecutive in firing order, such as shown in the example VCT phasing plots of FIGS. 3A-3C. During engine operation prior to a catalyst reaching its light-off temperature, a controller may select a cylinder deactivation pattern based on a catalyst heating demand in order to provide secondary air to an exhaust system of the engine via at least a portion of the deactivated cylinders. Burned gas from the remaining active cylinders may mix with the secondary air to generate exotherms, which may heat the catalyst. Further, a burned gas to secondary air ratio, as well as a degree of mixing of the burned gas and secondary air, may be adjusted by one or more of adjusting the cylinder deactivation pattern and adjusting cylinder intake and/or exhaust valves, such as according to the example method of FIGS. 5A and 5B. Example cylinder deactivation patterns having different firing densities, mixing effects, and secondary air production are shown in FIGS. 6-21. Further, an example timeline for adjusting the firing density and valve settings while operating providing secondary air is shown in FIG. 22. In this way, the catalyst may reach its light-off temperature to become maximally efficient at treating exhaust emissions more quickly.

Figure 1:
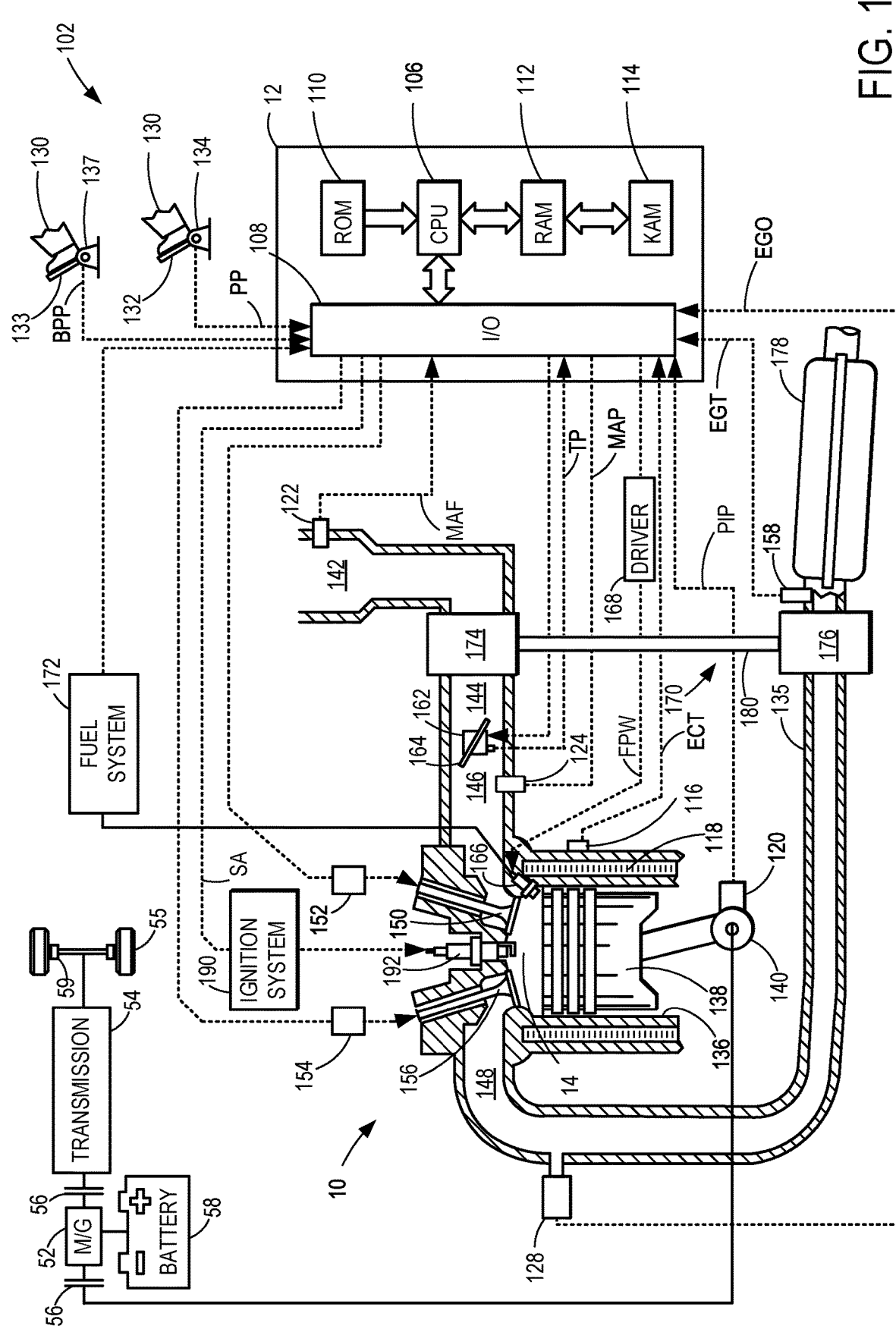
FIG. 1 schematically depicts an example cylinder of an internal combustion engine.

Turning now to the figures, FIG. 1 depicts an example of a cylinder 14 of an internal combustion engine 10, which may be included in a vehicle 102. Engine 10 may be controlled at least partially by a control system, including a controller 12, and by input from a vehicle operator 130 via an accelerator pedal 132 and an accelerator pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 102 may be a hybrid vehicle with multiple sources of torque available to one or more vehicle wheels 55. In other examples, vehicle 102 is a conventional vehicle with only an engine. In the example shown, vehicle 102 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Vehicle wheels 55 may include mechanical brakes 59 to slow the rotation of vehicle wheels 55. Mechanical brakes 59 may include friction brakes, such as disc brakes or drum brakes, or electromagnetic (e.g., electromagnetically-actuated) brakes, for example, both friction brakes and electromagnetic brakes configured to slow the rotation of vehicle wheels 55, and thus the linear motion of vehicle 102. As an example, mechanical brakes 59 may include a hydraulic brake system comprising brake calipers, a brake servo, and brake lines configured to carry brake fluid between the brake servo and the brake calipers. Mechanical brakes 59 may be configured such that a braking torque applied to wheels 55 by the brake system varies according to the pressure of brake fluid within the system, such as within the brake lines. Furthermore, vehicle operator 130 may depress a brake pedal 133 to control an amount of braking torque supplied by mechanical brakes 59, such as by controlling the pressure of brake fluid within the brake lines, to slow vehicle 102 and/or hold vehicle 102 stationary. For example, a brake pedal position sensor 137 may generate a proportional brake pedal position signal BPP, which may be used to determine the amount of braking torque requested by vehicle operator 130. Further, mechanical brakes 59 may be used in combination with regenerative braking (e.g., via electric machine 52) to slow vehicle 102.

Cylinder 14 of engine 10 can receive intake air via a series of intake passages 142 and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger 170, including a compressor 174 arranged between intake passages 142 and 144 and an exhaust turbine 176 arranged along an exhaust passage 135. Compressor 174 may be at least partially powered by exhaust turbine 176 via a shaft 180. In examples where turbocharger 170 is a variable geometry turbocharger (VGT), an effective aspect ratio (or flow area) of exhaust turbine 176 may be varied. Further, in some examples, exhaust turbine 176 may be a mono-scroll turbine, wherein other examples, exhaust turbine 176 may be a twin-scroll turbine. In examples where exhaust turbine 176 is a twin-scroll turbine, a first scroll of exhaust turbine 176 may receive exhaust gas from a first set of cylinders of engine 10, and a second scroll of exhaust turbine 176 may receive exhaust gas from a second, different set of cylinders of engine 10.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164. However, in other examples, engine 10 may not include throttle 162, such as where engine 10 is a diesel engine or a throttle-less gasoline engine.

An exhaust manifold 148 can receive exhaust gases from other cylinders of engine 10 in addition to cylinder 14. An exhaust gas sensor 128 is shown coupled to exhaust manifold 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178, also referred to herein as a "catalyst" or "catalytic converter," may be a three-way catalyst, a NOx trap, various other emission control devices, or combinations thereof. As an example, the three-way catalyst may be maximally effective at treating exhaust gas with a stoichiometric AFR, as further discussed below. Further, the three-way catalyst may be maximally effective at treating exhaust gas when a temperature of the three-way catalyst (e.g., of emission control device 178) is greater than a pre-determined operating temperature referred to as a light-off temperature.

Herein, the AFR will be described as a relative AFR, defined as a ratio of an actual AFR of a given mixture to stoichiometry and represented by lambda ($\lambda$). A lambda value of 1 occurs at stoichiometry (e.g., during stoichiometric operation), wherein the air-fuel mixture produces a complete combustion reaction. For example, engine 10 may operate with stoichiometric fueling during nominal operation in order to decrease vehicle emissions. Nominal stoichiometric operation may include the AFR fluctuating about stoichiometry, such as by $\lambda$ generally remaining within a pre-determined percentage (e.g., 2%) of stoichiometry. For example, during nominal stoichiometric operation, engine 10 may transition from a rich lambda value that is less than 1 (where more fuel is provided than for a complete combustion reaction, resulting in excess, unburnt fuel) to a lean lambda value that is greater than 1 (where more air is provided than for a complete combustion reaction, resulting in excess, unburnt air) and from lean to rich between injection cycles, resulting in an "average" operation at stoichiometry.

Thus, emission control device 178 may be maximally effective at reducing vehicle emissions while engine 10 is operated at stoichiometry and the temperature of emission control device 178 is above its light-off temperature. Systems and methods that enable emission control device 178 to reach its light-off temperature more quickly upon engine start as well as provide substantially stoichiometric exhaust gas to emission control device 178 therefore reduce vehicle emissions, as will be elaborated herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an intake valve actuator (or actuation system) 152. Similarly, exhaust valve 156 may be controlled by controller 12 via an exhaust valve actuator (or actuation system) 154. The positions of intake valve 150 and exhaust valve 156 may be determined by respective valve position sensors (not shown) and/or camshaft position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cylinder deactivation valve control (CDVC), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system). An example VCT system is described in more detail below with respect to FIG. 2, and a continuously variable valve lift (CVVL) system is described in more detail below with regard to FIG. 4.

As further described herein, intake valve 150 and/or exhaust valve 156 may be deactivated or otherwise adjusted during selected conditions, such as during an engine start to provide secondary air to emission control device 178 via exhaust passage 135. As used herein, the term "secondary air" (also called "thermactor air") refers to air that is provided to engine 10 that is not used for producing torque via combustion. In contrast, air inducted into engine 10 and used to produce torque via combustion may be called "primary air." For example, one or more cylinders of engine 10 may be operated unfueled and may collectively act as a thermactor responsive to a cold start condition. The number and identity of the cylinders operated unfueled may be symmetrical or asymmetrical, such as by selectively discontinuing fueling to one or more cylinders on only a first engine bank, selectively discontinuing fueling to one or more cylinders on only a second engine bank, or selectively discontinuing fueling to one or more cylinders on each of the first and second engine banks. In some examples, the intake valve 150 and/or the exhaust valve 156 may be adjusted by the corresponding valve actuator 152 or 154, respectively, to adjust a ratio of burned exhaust gas to secondary air provided to emission control device 178 and/or to increase mixing, as will be elaborated herein with respect to FIGS. 5A-5B.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at or near maximum brake torque (MBT) timing to maximize engine power and efficiency. Alternatively, spark may be provided retarded from MBT timing to create a torque reserve. Controller 12 may input engine operating conditions, including engine speed, engine load, and exhaust gas AFR, into a look-up table and output the corresponding spark timing for the input engine operating conditions, for example. However, in other examples, spark plug 192 may be omitted, such as when compression ignition is used.

In some examples, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse-width of signal FPW received from controller 12 via an electronic driver 168. In this manner, fuel injector 166 provides what is known as direct injection (hereafter also referred to as "DI") of fuel into cylinder 14. While FIG. 1 shows injector 166 as a side injector, it may also be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a high pressure fuel system 172 including fuel tanks, fuel pumps, and a fuel rail. Alternatively, fuel may be delivered by a single stage fuel pump at lower pressure, in which case the timing of the direct fuel injection may be during a narrower range during the compression stroke than if a high pressure fuel system is used. Further, while not shown, the fuel tanks may have a pressure transducer providing a signal to controller 12.

It will be appreciated that in an alternative embodiment, fuel injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by fuel injector 166 to the cylinder during a single cycle of the cylinder. Further, the distribution and/or relative amount of fuel or knock control fluid delivered from the injector may vary with operating conditions. Furthermore, for a single combustion event, multiple injections of the delivered fuel may be performed per cycle. The multiple injections may be performed during the compression stroke, intake stroke, or any appropriate combination thereof.

Fuel tanks in fuel system 172 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for storing executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; an exhaust gas temperature signal (EGT) from a temperature sensor 158 coupled to exhaust passage 135, which may be used by controller 12 to determine the temperature of emission control device 178; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving a signal from temperature sensor 116 and/or temperature sensor 158 indicating that a cold start condition is present, controller 12 may adjust fueling to cylinder 14 by adjusting signal FPW from electronic driver 168 and may further adjust intake valve 150 and exhaust valve 156 via actuators 152 and 154, respectively, as will be elaborated below with respect to FIGS. 5A-5B. For example, cylinder 14 may be operated with rich fueling to provide unburnt fuel to exhaust passage 135 or may be unfueled to provide secondary air to exhaust passage 135 to react with the unburnt fuel (e.g., from other, fueled cylinders) and increase the temperature of emission control device 178. Further, controller 12 may adjust a timing, lift, and/or duration of intake valve 150 and/or exhaust valve 156 to adjust a ratio of exhaust gas to secondary air provided to emission control device 178 via exhaust passage 135.

As described above, FIG. 1 shows only one cylinder of a multi-cylinder engine. As such, each cylinder may similarly include its own set of intake/exhaust valves, fuel injector(s), spark plug(s), etc. It will be appreciated that engine 10 may include any suitable number of cylinders, including 2, 3, 4, 5, 6, 8, 10, 12, or more cylinders in various configurations. Further, each of these cylinders can include some or all of the various components described and depicted by FIG. 1 with reference to cylinder 14.

Figure 2:
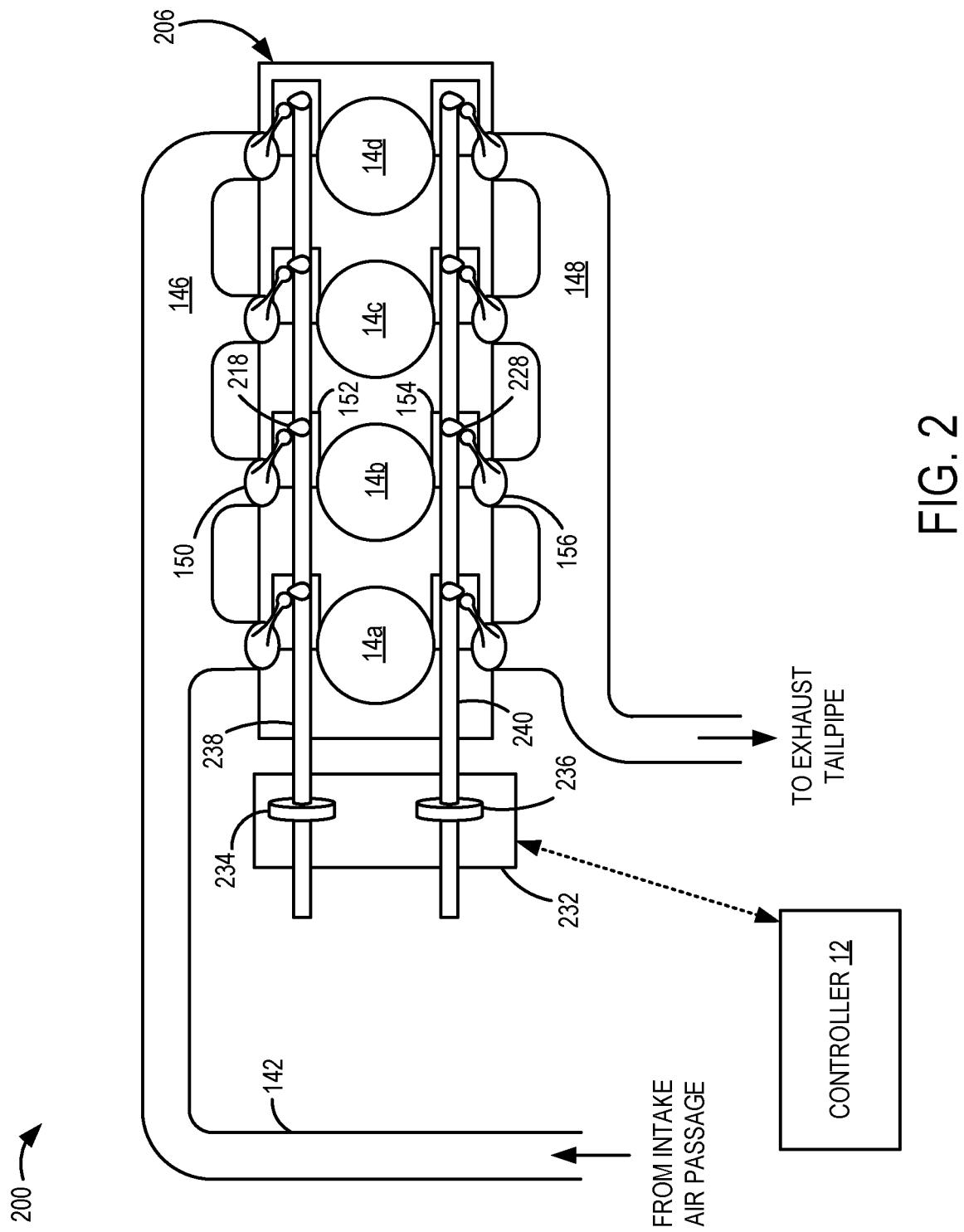
FIG. 2 shows an example variable cam timing (VCT) mechanism for an engine.

FIG. 2 shows an example embodiment of an engine 200 including a variable cam timing (VCT) system 232 and an engine block 206 with a plurality of cylinders 14. Engine 200 may be one example of engine 10 described in FIG. 1, and as such, components of engine 200 that function the same as components introduced with respect to engine 10 of FIG. 1 are numbered the same and will not be reintroduced. For example, engine 200 is shown having intake manifold 146 configured to supply intake air and/or fuel to the cylinders 14 and exhaust manifold 148 configured to exhaust the combustion products from the cylinders 14. Ambient air flow can enter the intake system through intake air passage 142, wherein a flow rate of the intake air can be controlled at least in part by a throttle (see FIG. 1).

Engine block 206 includes a plurality of cylinders 14, herein four (labeled 14a-14d). In the depicted example, all four of the cylinders are on a common engine bank. In alternative examples, the cylinders may be divided between a plurality of banks. For example, cylinders 14a and 14b may be on a first bank while cylinders 14c and 14d are on a second bank. Cylinders 14a-14d may each include a spark plug and a fuel injector for delivering fuel directly to the combustion chamber, as described above with respect to FIG. 1.

In the present example, each cylinder 14a-14d includes a corresponding intake valve 150 and exhaust valve 156. Each intake valve 150 is actuatable between an open position that allows intake air into the corresponding cylinder and a closed position that substantially blocks intake air from entering the cylinder. Further, FIG. 2 shows how intake valves 150 of cylinders 14a-14d may be actuated by a common intake camshaft 238. Intake camshaft 238 may be included in intake valve actuation system 152. Intake camshaft 238 includes intake cams 218, which have a cam lobe profile for opening the intake valves 150 for a defined intake duration. In some examples (not shown), the camshaft may include additional intake cam(s), each having a different cam lobe profile that allows the intake valves 150 to be opened for an different duration (herein also referred to as a cam profile switching system). Based on the lobe profile of the additional intake cam(s), the different duration may be longer or shorter than the defined intake duration of intake cam 218. The lobe profile may affect cam lift height, cam duration, and/or cam timing. Controller 12 may switch the intake valve duration by moving the intake camshaft 238 longitudinally and switching between intake cam profiles. However, in other examples, cam profile switching may not be included.

In the same manner, each exhaust valve 156 is actuatable between an open position that allows exhaust gas out of the corresponding cylinder and a closed position that substantially retains gas within the cylinder. Further, FIG. 2 shows how exhaust valves 156 of cylinders 14a-14d may be actuated by a common exhaust camshaft 240. Exhaust camshaft 240 may be included in exhaust valve actuation system 154. Exhaust camshaft 240 includes exhaust cams 228, which have a cam lobe profile for opening exhaust valves 156 for a defined exhaust duration. In some examples (not shown), the camshaft may include additional exhaust cam(s) each having a different cam lobe profile that allows the exhaust valves 156 to be opened for a different duration. Based on the lobe profile of the additional exhaust cam(s), the different duration may be longer or shorter than the defined exhaust duration of exhaust cams 228. The lobe profile may affect cam lift height, cam duration, and/or cam timing. When the additional cam(s) are included, controller 12 may switch the exhaust valve duration by moving the exhaust camshaft 240 longitudinally and switching between exhaust cam profiles.

It will be appreciated that while the depicted example shows common intake camshaft 238 coupled to the intake valves of each cylinder 14a-14d and common exhaust camshaft 240 coupled to the exhaust valves of each cylinder 14a-14d, in other examples, the camshafts may be coupled to cylinder subsets, and multiple intake and/or exhaust camshafts may be present. For example, a first intake camshaft may be coupled to the intake valves of a first subset of cylinders (e.g., coupled to cylinders 14a and 14b) while a second intake camshaft is coupled to the intake valves of a second subset of cylinders (e.g., coupled to cylinders 14c and 14d). Likewise, a first exhaust camshaft may be coupled to the exhaust valves of the first subset of cylinders while a second exhaust camshaft is coupled to the exhaust valves of the second subset of cylinders. Further still, one or more intake valves and exhaust valves may be coupled to each camshaft.

The subset of cylinders coupled to each camshaft may be based on their position along the engine block 206, their firing order, the engine configuration, etc.

Intake valve actuation system 152 and exhaust valve actuation system 154 may further include push rods, rocker arms, tappets, etc. Such components may control actuation of the intake valves 150 and the exhaust valves 156 by converting rotational motion of the cams into translational motion of the valves. As previously discussed, the valves may also be actuated via additional cam lobe profiles on the camshafts, where the cam lobe profiles between the different valves may provide varying cam lift height, cam duration, and/or cam timing. However, alternative camshaft (overhead and/or pushrod) arrangements may be used, if desired. Further, in some examples, cylinders 14a-14d may each have more than one exhaust valve and/or intake valve. In still other examples, each of exhaust valve 156 and intake valve 150 of one or more cylinders may be actuated by a common camshaft. Further still, in some examples, some of the intake valves 150 and/or exhaust valves 156 may be actuated by their own independent camshaft or another type of valve actuation system, such as discussed above with respect to FIG. 1.

Engine 200 may include variable valve timing systems, for example, VCT system 232.

In the example shown, VCT system 232 is a twin independent variable camshaft timing (Ti-VCT) system, such that intake valve timing and exhaust valve timing may be changed independently of each other. VCT system 232 includes an intake camshaft phaser 234 coupled to the common intake camshaft 238 for changing the intake valve timing and an exhaust camshaft phaser 236 coupled to common exhaust camshaft 240 for changing the exhaust valve timing. VCT system 232 may be configured to advance or retard valve timing by advancing or retarding cam timing and may be controlled via controller 12, for example. VCT system 232 may be configured to vary the timing of valve opening and closing events by varying a relationship between a crankshaft position and a corresponding camshaft position. For example, VCT system 232 may be configured to rotate intake camshaft 238 and/or exhaust camshaft 240 independently of the crankshaft to cause the valve timing to be advanced or retarded.

The valve/cam control devices and systems described above may be hydraulically powered, electrically actuated, or combinations thereof. In some examples, VCT system 232 may be a cam torque actuated device configured to rapidly vary the cam timing. In some examples, a position of the camshaft may be changed via cam phase adjustment of an electrical actuator (e.g., an electrically actuated cam phaser) with a fidelity that exceeds that of most hydraulically operated cam phasers. Controller 12 may send control signals to and receive a cam timing and/or cam selection measurement from VCT system 232.

In the depicted example, because the intake valves of all the cylinders 14a-14d are actuated by intake camshaft 238, a change in the position of intake camshaft 238 with respect to the crankshaft (e.g., crankshaft 140 shown in FIG. 1) will affect the intake valve position and timing of all the cylinders. Likewise, because the exhaust valves of all the cylinders 14a-14d are actuated by exhaust camshaft 240, a change in the position of the exhaust camshaft 240 with respect to the crankshaft will affect the exhaust valve position and timing of all the cylinders. For example, a change in position of the intake and/or exhaust camshaft that advances the (intake or exhaust) valve timing of a first cylinder 14a will also advance the (intake or exhaust) valve timing of the remaining cylinders 14b-14d.

However, because no two cylinders fire at the same time in a given engine cycle, a camshaft coupled to two or more cylinders may be adjusted during engine idling conditions (e.g., low engine speed) on a cylinder-by-cylinder basis for each four-stroke cycle of the two or more cylinders. As used herein, the term "engine cycle" is used in reference to a four-stroke engine and refers to a 720 degree rotation of a crankshaft of the engine. Thus, a first camshaft adjustment may be performed to move the common camshaft to a first position (or in a first direction) to perform a first valve timing adjustment for a first of the two or more cylinders, and then a second, different camshaft adjustment may be performed to move the common camshaft to a second, different position (or in a second direction) to perform a second, different valve timing adjustment for a second of the two or more cylinders, and so on for all the cylinders coupled to the common camshaft.

Figure 3A:
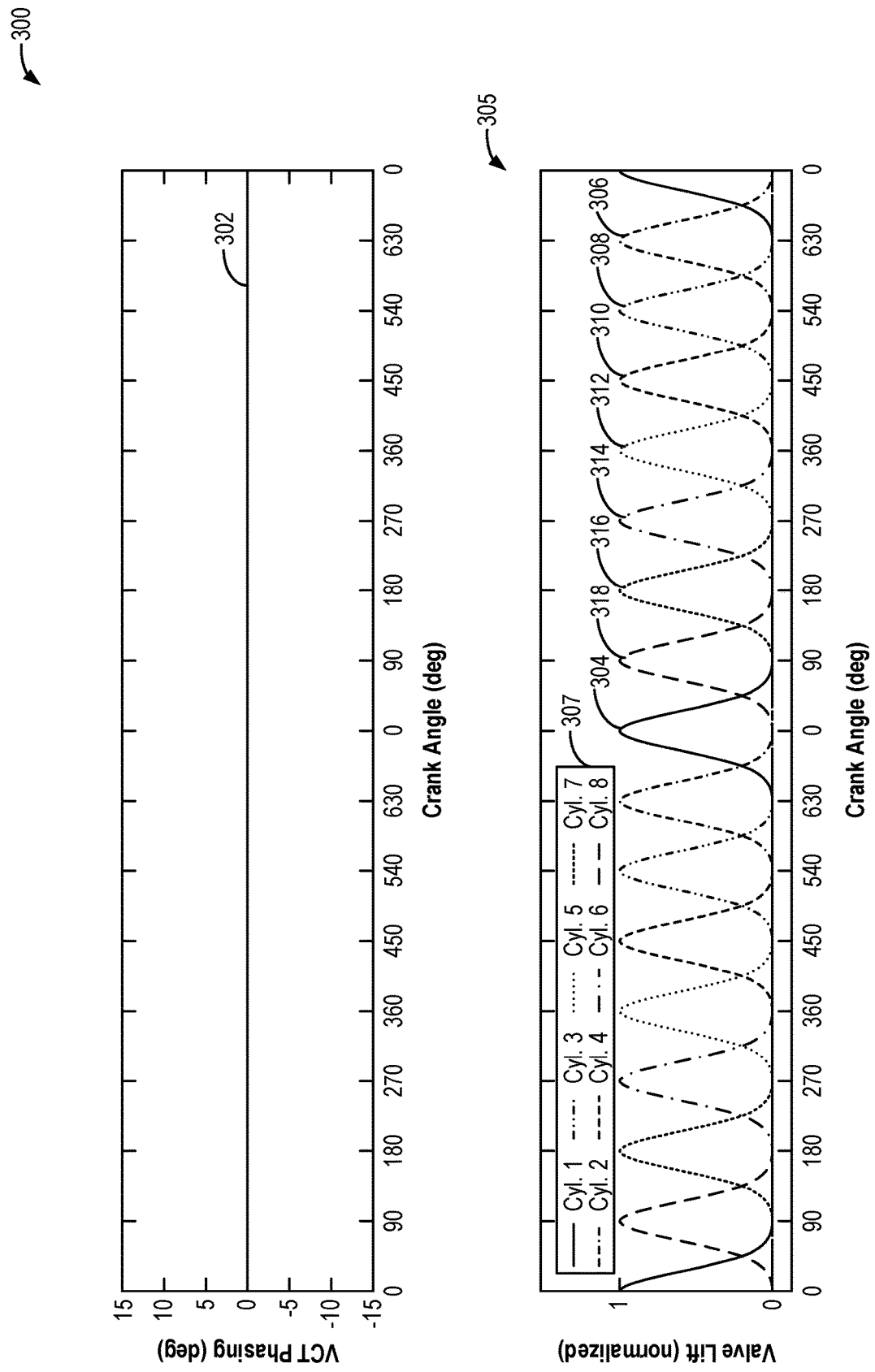
FIG. 3A shows plots depicting an example baseline VCT phasing.
Figure 3B:
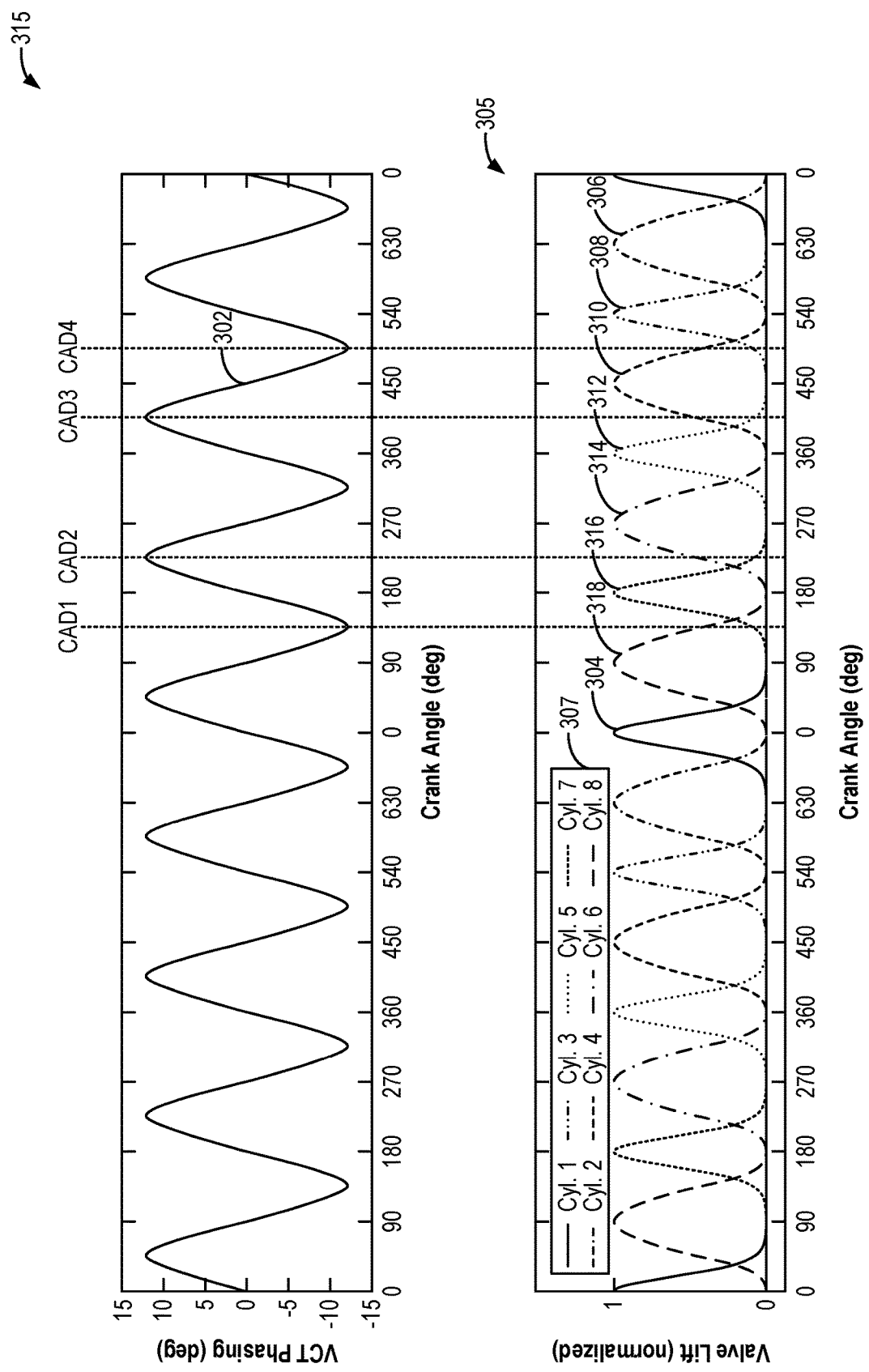
FIG. 3B shows plots depicting a first example adjusted VCT phasing that may be used to vary a valve opening timing and duration between sequentially firing cylinders.
Figure 3C:
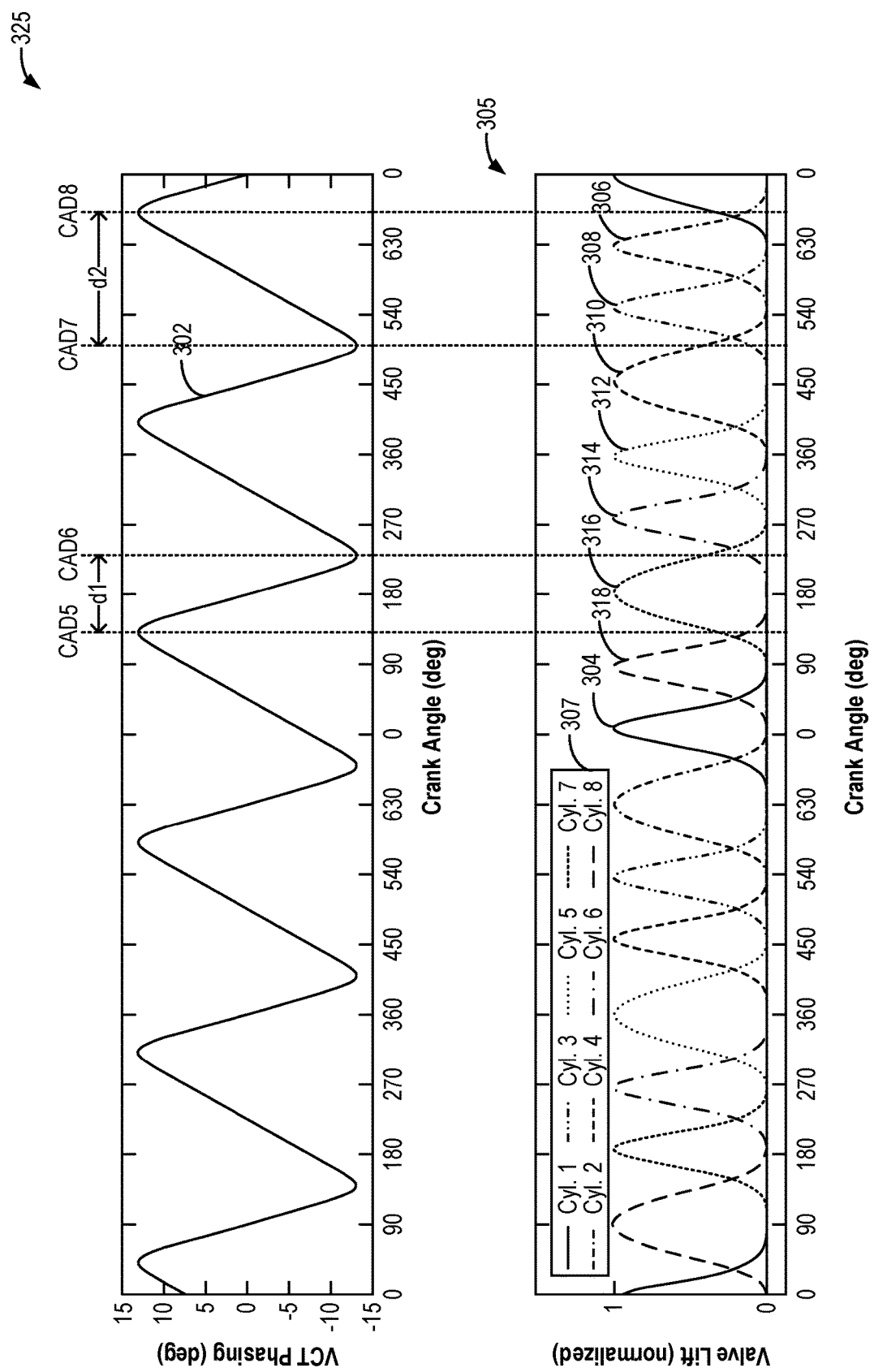
FIG. 3C shows plots depicting a second example adjusted VCT phasing that may be used to vary the valve opening timing and duration between sequentially firing cylinders.

For example, turning to FIGS. 3A-3C, a plurality of graphs demonstrate an effect of VCT phasing adjustments of a "fast" VCT system, such as the VCT system 232 shown in FIG. 2, on cylinder valve timing. In particular, a plot 302 shows VCT phasing (vertical axis, in degrees) with respect to a crank angle of an engine crankshaft (horizontal axis, in degrees), with negative (e.g., decreasing) VCT phasing adjustments resulting in advancing a corresponding cam and positive (e.g., increasing) VCT phasing adjustments resulting in retarding the corresponding cam. Further, a set of plots 305 show a normalized valve lift (vertical axis) with respect to the crank angle of the engine (horizontal axis) one valve of each of a plurality of cylinders. In particular, a plot 304 shows the normalized valve lift for a first cylinder ("Cyl. 1"), a plot 306 shows the normalized valve lift for a second cylinder ("Cyl. 2"), a plot 308 shows the normalized valve lift for a third cylinder ("Cyl. 3"), a plot 310 shows the normalized valve lift for a fourth cylinder ("Cyl. 4"), a plot 312 shows the normalized valve lift for a fifth cylinder ("Cyl. 5"), a plot 314 shows the normalized valve lift for a sixth cylinder ("Cyl. 6"), a plot 316 shows the normalized valve lift for a seventh cylinder ("Cyl. 7"), and a plot 318 shows the normalized valve lift for an eighth cylinder ("Cyl. 8"). Further, the plots of the different cylinders are distinguished by different line types, as shown in a legend 307. The normalized valve lift ranges from 0 to 1, where 0 indicates that the corresponding valve is fully closed and 1 indicates that the corresponding valve is fully open.

Furthermore, the crank angle values are aligned for plot 302 and the set of plots 305 to enable direct comparisons between adjustments to the VCT phasing with respect to crank angle and the resulting valve adjustments with respect to crank angle over two engine cycles (e.g., two 720 degree rotations of the engine crankshaft). For example, the VCT phasing may be that of an intake camshaft phaser, such as intake camshaft phaser 234 of FIG. 2, configured to adjust a position of an intake camshaft (e.g., intake camshaft 238 of FIG. 2) with respect to the engine crankshaft, and the position of the intake camshaft determines an intake valve opening and closing timing for each of the plurality of cylinders. Alternatively, the VCT phasing may be that of an exhaust camshaft phaser, such as exhaust camshaft phaser 236 of FIG. 2, configured to adjust a position of an exhaust camshaft (e.g., exhaust camshaft 240 of FIG. 2) with respect to the engine crankshaft in order to control the opening and closing timing of an exhaust valve of each of the plurality of cylinders. However, for simplicity, the valves will be described with respect to the intake valve example.

Referring first to FIG. 3A, a first set of graphs 300 show an example baseline VCT phasing. That is, the VCT phasing is set to 0 and remains at 0 throughout the two engine cycles, as shown by plot 302. With the VCT phasing set at 0, the position of the corresponding camshaft is not changed with respect to the engine crankshaft, and the valve of each cylinder is opened for a same duration at a same relative timing within an intake stroke of the corresponding cylinder. That is, the valve of the first cylinder opens at top dead center (TDC) of the intake stroke of the first cylinder and closes at bottom dead center (BDC) of the intake stroke of the first cylinder, the valve of the second cylinder opens at TDC of the intake stroke of the second cylinder and closes at BDC of the intake stroke of the second cylinder, etc.

Referring now to FIG. 3B, a second set of graphs 315 show a first example adjusted VCT phasing. As can be seen in plot 302, the VCT phasing is continually adjusted throughout the two engine cycles. In the example shown, the VCT phasing is advanced and retarded in a periodic, sinusoidal manner, resulting in different valve durations for different cylinders. In particular, retarding the camshaft by moving the VCT phasing in the positive direction while a valve is open (and close to full lift) reduces the open duration of the valve, such as shown between CAD1 and CAD2 for the valve of the seventh cylinder (plot 316), while advancing the camshaft by moving the VCT phasing in the negative direction while a valve is open (and close to full lift) increases the open duration of the valve, such as shown between CAD3 and CAD4 for the valve of the fourth cylinder (plot 310). Furthermore, retarding the camshaft results in a later valve opening timing (e.g., relative to TDC).

As a result, the valves of the first cylinder (plot 304), the third cylinder (plot 308), the fifth cylinder (plot 312), and the seventh cylinder (plot 316) are open for a shorter duration than the valves of the second cylinder (plot 306), the fourth cylinder (plot 310), the sixth cylinder (plot 314), and the eighth cylinder (plot 318). Further, the valves of the first cylinder (plot 304), the third cylinder (plot 308), the fifth cylinder (plot 312), and the seventh cylinder (plot 316) are open for a shorter duration than in the baseline VCT phasing shown in FIG. 3A. Similarly, the valves of the second cylinder (plot 306), the fourth cylinder (plot 310), the sixth cylinder (plot 314), and the eighth cylinder (plot 318) are open for a longer duration than in the baseline VCT phasing shown in FIG. 3A. Because the open duration is less for the first, third, fifth, and seventh cylinders than the second, fourth, sixth, and eighth cylinders, the first, third, fifth, and seventh cylinders may induct less air than the second, fourth, sixth, and eighth cylinders.

FIG. 3C shows a third set of graphs 325 depicting a second example adjusted VCT phasing. Similar to FIG. 3B, the VCT phasing is continually adjusted throughout the two engine cycles. In the example shown, the VCT phasing is advanced and retarded in a periodic, seesaw-like manner. In particular, the advancing occurs over a shorter crank angle range (e.g., between CAD5 and CAD6) than the retarding (e.g., between CAD7 and CAD8), resulting in different valve durations between cylinders and between engine cycles. For example, a difference d1 between CAD5 and CAD6 is smaller than a difference d2 between CAD7 and CAD8. As a result, the duration of the valve of the seventh cylinder (plot 316) increases between CAD5 and CAD6, while the duration of the valve of the third cylinder (plot 308) and the duration of the valve of the second cylinder (plot 306) are decreased between CAD7 and CAD8.

Further, the adjusted VCT phasing shown in FIG. 3C results in different valve durations between engine cycles for some cylinders. For example, the valve of the fifth cylinder (plot 312) is open for a longer duration during the first engine cycle relative to the second engine cycle. As another example, the valve of the fourth cylinder (plot 310) is open for a shorter duration during the first engine cycle relative to the second engine cycle. In contrast, the valves of the sixth cylinder (plot 314) and the third cylinder (plot 308) are each open for the shorter duration in both of the first engine cycle and the second engine cycle. In this way, all of the cylinders may be operated with a shorter duration-shorter duration-longer duration three-cycle pattern (two of which are shown in FIG. 3C) using the second adjusted VCT phasing. Thus, the "fast" VCT system flexibly enables the camshaft timing to be varied between consecutive valve lift events to reduce or extend a duration over which a given valve remains open as well as a timing of the opening.

Returning to FIG. 2, as described above, a non-limiting example of an internal combustion engine and associated intake and exhaust systems is shown. It should be understood that in some examples, the engine may have more or fewer cylinders. Example engines may have cylinders arranged in a "V" configuration rather than the in-line configuration shown. Further, the intake and exhaust valve of each cylinder may be adjusted via any combination of valve actuation systems, including, but not limited to, intake VCT combined with one of exhaust VCT, exhaust electric valve actuation (EVA), exhaust CVVL, exhaust valve deactivation, and/or exhaust CPS; and exhaust VCT combined with one of intake VCT, intake EVA, intake CVVL, intake valve deactivation, and/or intake CPS.

Figure 4:
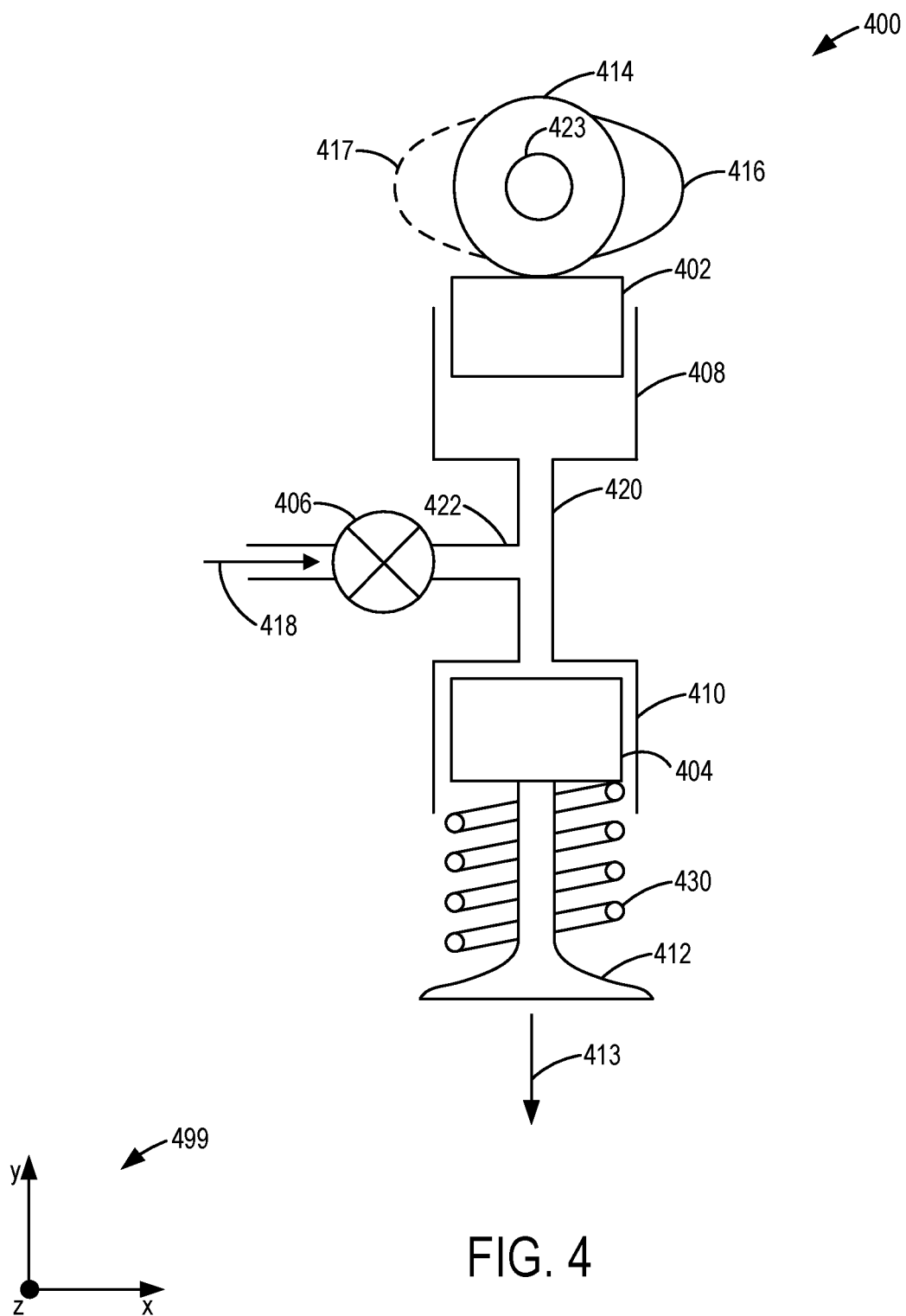
FIG. 4 shows a schematic view of an example continuously variable valve lift mechanism for an engine.

Next, FIG. 4 schematically shows an example CVVL system 400. CVVL system 400 is a hydraulic valve actuation mechanism and may be included in intake valve actuator 152 and/or exhaust valve actuator 154 of FIG. 1, for example. For example, intake valve actuator 152 may be an intake CVVL actuator and/or exhaust valve actuator 154 may be an exhaust CVVL actuator. Further, FIG. 4 depicts an x-y planar view of CVVL system 400, as shown by reference axes 499. CVVL system 400 hydraulically couples a cam 414 of a camshaft 423 to a valve 412 of a cylinder. Valve 412 may be one of an intake valve and an exhaust valve of a cylinder. In particular, CVVL system 400 may be configured so that adjusting an amount of hydraulic pressure between cam 414 and valve 412 changes an amount of valve lift for valve 412.

As shown in FIG. 4, CVVL system 400 includes a cam piston 402 in a cam cylinder 408 and a valve piston 404 in a valve cylinder 410. Each of the cam cylinder 408 and the valve cylinder 410 may be at least partially filled with hydraulic fluid, and the cam cylinder 408 may be fluidically coupled to the valve cylinder 410 via an inter-cylinder line (or passage) 420. Further, cam 414 may remain in contact with cam piston 402, and an amount of pressure in cam cylinder 408 may vary based on the position of cam piston 402, which is controlled by cam 414. Therefore, the pressure in cam cylinder 408 is lower when cam 414 is at base circle and higher when a lobe 416 of cam 414 is in contact with cam piston 402, with the pressure increasing as the lift of the lobe portion in contact with the cam piston increases, as this further displaces the cam piston in the negative y-direction with respect to reference axes 499. This may in turn increase an amount of hydraulic pressure in valve cylinder 410 that is applied to valve piston 404, which may adjust a position of valve 412.

When the hydraulic pressure applied to valve piston 404 overcomes an opposing spring force of a valve spring 430, valve 412 may open in a valve lift direction 413. Increasing the amount of hydraulic pressure may cause valve 412 to further move in the valve lift direction 413, resulting in a greater degree of opening (e.g., amount of lift) of valve 412. Valve lift direction 413 is parallel to the y-axis of reference axes 499. In particular, increasing an amount of valve lift for valve 412 includes moving the valve in the negative y-direction, with respect to reference axes 499. When the hydraulic pressure applied to valve piston 404 is less than the spring force of valve spring 430, valve spring 430 may maintain valve 412 closed.

An amount of hydraulic pressure in the CVVL system 400 may be adjusted by adjusting a hydraulic control valve 406, which may be positioned in a hydraulic supply line (or passage) 422. For example, hydraulic fluid in CVVL system 400 may be provided and refreshed via the hydraulic supply line 422. As one example, hydraulic control valve 406 may be adjustable between a plurality of positions ranging from fully closed (in which flow of the hydraulic fluid through hydraulic control valve 406 is blocked) and fully open (in which a maximum flow area is provided in hydraulic control valve 406). In some examples, hydraulic control valve 406 may be a continuously variable valve, while in other examples, hydraulic control valve 406 may include a finite number of steps or positions. In still other examples, hydraulic control valve 406 may be an on/off valve adjustable between the fully closed position and the fully open position and no positions in between. Further, hydraulic control valve 406 may be an electronically actuated valve that is adjusted in response to (e.g., responsive to) a control signal from an electronic controller, such as controller 12 of FIG. 1, in order to adjust the amount of valve lift of valve 412. Adjusting the amount of valve lift of valve 412 may change one or more cylinder operating parameters by adjusting gas flow to and/or from the cylinder.

In some examples of CVVL system 400, the valve may be opened or closed at any cam position by adjusting the hydraulic pressure of CVVL system 400. For example, increasing the hydraulic pressure of CVVL system 400 (e.g., above an upper threshold pressure) may enable valve 412 to open even when cam 414 is on base circle, and decreasing the hydraulic pressure of CVVL system 400 (e.g., below a lower threshold pressure) may maintain valve 412 closed, even when lobe 416 is in contact with cam piston 402. For example, the hydraulic fluid may apply a force to valve piston 404 that is greater than the spring force of valve spring 430, regardless of the position of cam 414, when the hydraulic pressure is greater than the upper threshold pressure, resulting in valve 412 being open while the hydraulic pressure is maintained above the upper threshold pressure. In contrast, the force applied on valve piston 404 by the hydraulic fluid may be less than the spring force of valve spring 430, even when lobe 416 is at its highest lift, when the hydraulic pressure is less than the lower threshold pressure, resulting in valve 412 being closed while the hydraulic pressure is maintained below the lower threshold pressure. Adjusting the pressure of the hydraulic fluid may facilitate precise adjustments to an opening timing, closing timing, and/or lift of valve 412. For example, the pressure may be adjusted to any pressure between and including the lower threshold pressure and the upper threshold pressure based on a desired amount of opening or closing of the valve 412 at a given point in an engine cycle. However, in other examples, valve 412 may only be opened while lobe 416 is in contact with cam piston 402, but the valve opening (e.g., lift) may be reduced or prevented by reducing the hydraulic pressure in CVVL system 400 via valve 406.

In some examples of CVVL system 400, a rotational speed of camshaft 423 is half of that of a rotational speed of a crankshaft of the engine (e.g., crankshaft 140 of FIG. 1). For example, camshaft 423 may rotate 360 degrees for every 720 degree rotation of the crankshaft. In some such examples, CVVL system 400 may include a second cam lobe 417, optionally indicated in FIG. 4 by dashed lines. Second cam lobe 417 may have a lobe profile that is the same as or different than lobe 416. In an example where valve 412 is an intake valve, lobe 416 may be positioned on camshaft 423 to open valve 412 during an intake stroke of the cylinder, and second cam lobe 417 may be positioned on camshaft 423 to open valve 412 during an expansion stroke of the cylinder. In an example where valve 412 is an exhaust valve, lobe 416 may be positioned on camshaft 423 to open valve 412 during an exhaust stroke of the cylinder, and second cam lobe 417 may be positioned on camshaft 423 to open valve 412 during a compression stroke of the cylinder. During nominal operation, the hydraulic pressure in CVVL system 400 may be adjusted in order to enable a single opening event of valve 412, such as by reducing the hydraulic pressure in CVVL system 400 below the lower threshold pressure prior to second cam lobe 417 contacting cam piston 402, referred to as bypassing a cam rise interval of second cam lobe 417, and raising the hydraulic pressure in CVVL system 400 above the lower threshold pressure prior to lobe 416 contacting cam piston 402. As a result, only one valve lift interval (or opening event) of valve 412 may occur during the 720 degree rotation of the crankshaft, corresponding to a cam rise interval of lobe 416.

During select operating conditions that will be elaborated below with respect to FIGS. 5A-5B, the hydraulic pressure in CVVL system 400 instead may be reduced below the lower threshold pressure prior to lobe 416 contacting cam piston 402 and raised to above the lower threshold pressure prior to second cam lobe 417 contacting cam piston 402 such that lobe 416 is bypassed and only second cam lobe 417 opens valve 412. Notably, second cam lobe 417 may be positioned such that the valve opening event enabled by second cam lobe 417 is shifted 360 crank angle degrees from the valve opening event enabled by lobe 416. For example, valve 412 may be an intake valve. In such an example, lobe 416 may be positioned to open valve 412 substantially within an intake stroke of a four-stroke combustion cycle (e.g., intake, compression, expansion, exhaust), and second cam lobe 417 may be positioned to open valve 412 substantially within an expansion stroke. Further, during some operating conditions, CVVL system 400 may be operated to open valve 412 during both cam lobe rises for two-stroke cylinder operation, as will also be elaborated below with respect to FIGS. 5A-5B.

In other examples of CVVL system 400, the rotational speed of camshaft 423 may be the same as the rotational speed of the crankshaft of the engine, and second cam lobe 417 may not be included. As such, two cam lobe rise intervals may occur during a 720 degree rotation of the crankshaft, similar to the manner described above for two cam lobes and rotating at half the speed of the crankshaft. Thus, operation of CVVL system 400 may be adjusted to provide valve opening every other cam lobe rise interval during four-stroke operation, where the cam rise interval bypassed (e.g., not used to open valve 412) changes based on operating conditions. Alternatively, the cam lobe rise interval may not be bypassed when two-stroke operation is used. Further, a width of lobe 416 may be doubled relative to when camshaft 423 is operated at half the speed of the crankshaft to maintain a same duration (in crank angles) of the cam rise interval.

Note that CVVL system 400 is provided by way of example, and other mechanisms that enable continuously variable valve lift and valve timing adjustments are also possible, such as EVA.

The above described valve actuation mechanisms may be advantageously utilized in combination with a variable displacement engine (VDE) mode of operation to provide secondary (e.g., thermactor) air flow to a catalyst during heating with finer control, thereby reducing an occurrence of exhaust gas cooling and excess air delivery to the catalyst, for example.

Figure 5A:
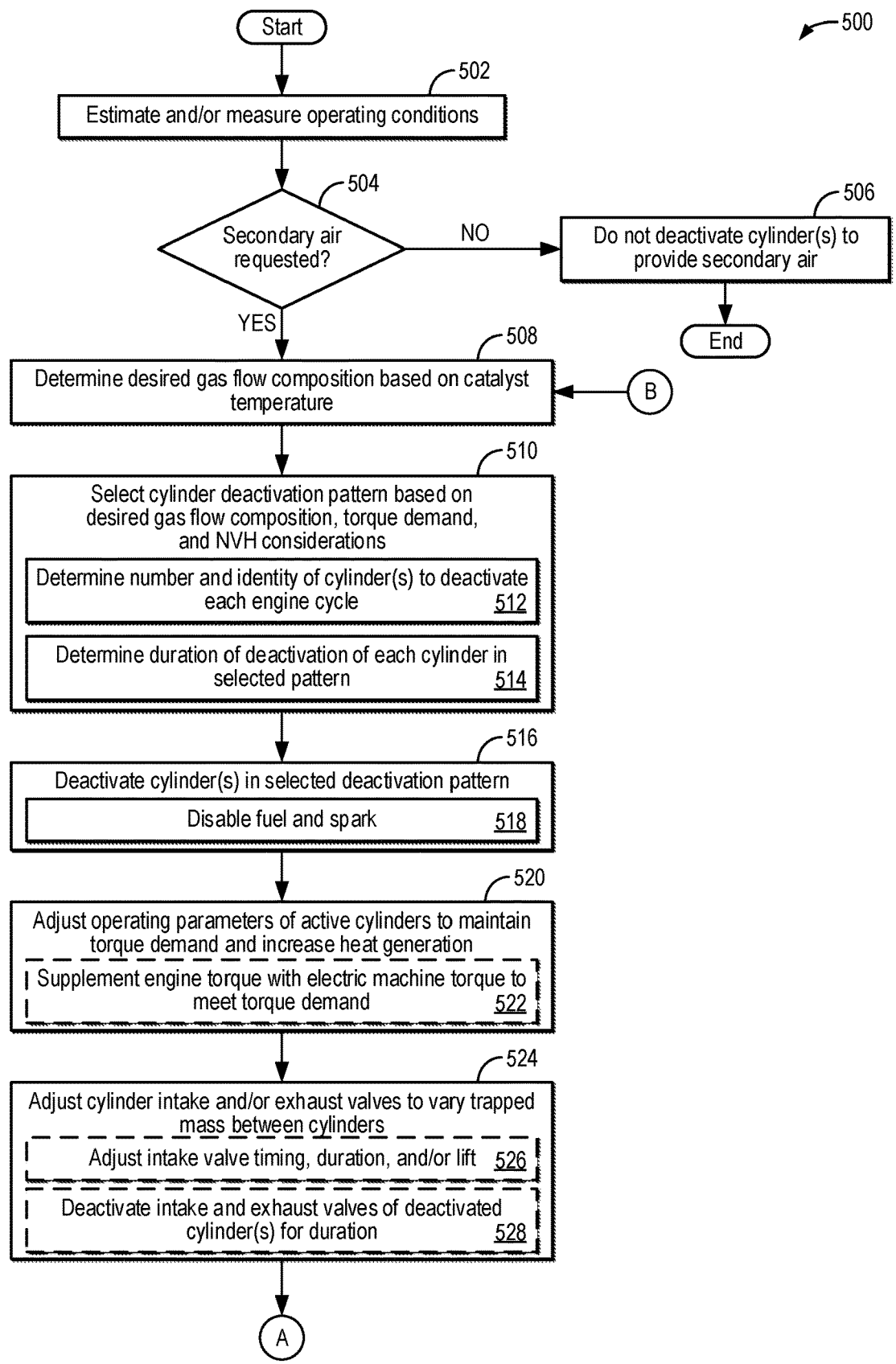
FIGS. 5A and 5B show an example method for operating an engine in a thermactor mode during an engine cold start to provide secondary air for catalyst heating via deactivated cylinders.
Figure 5B:
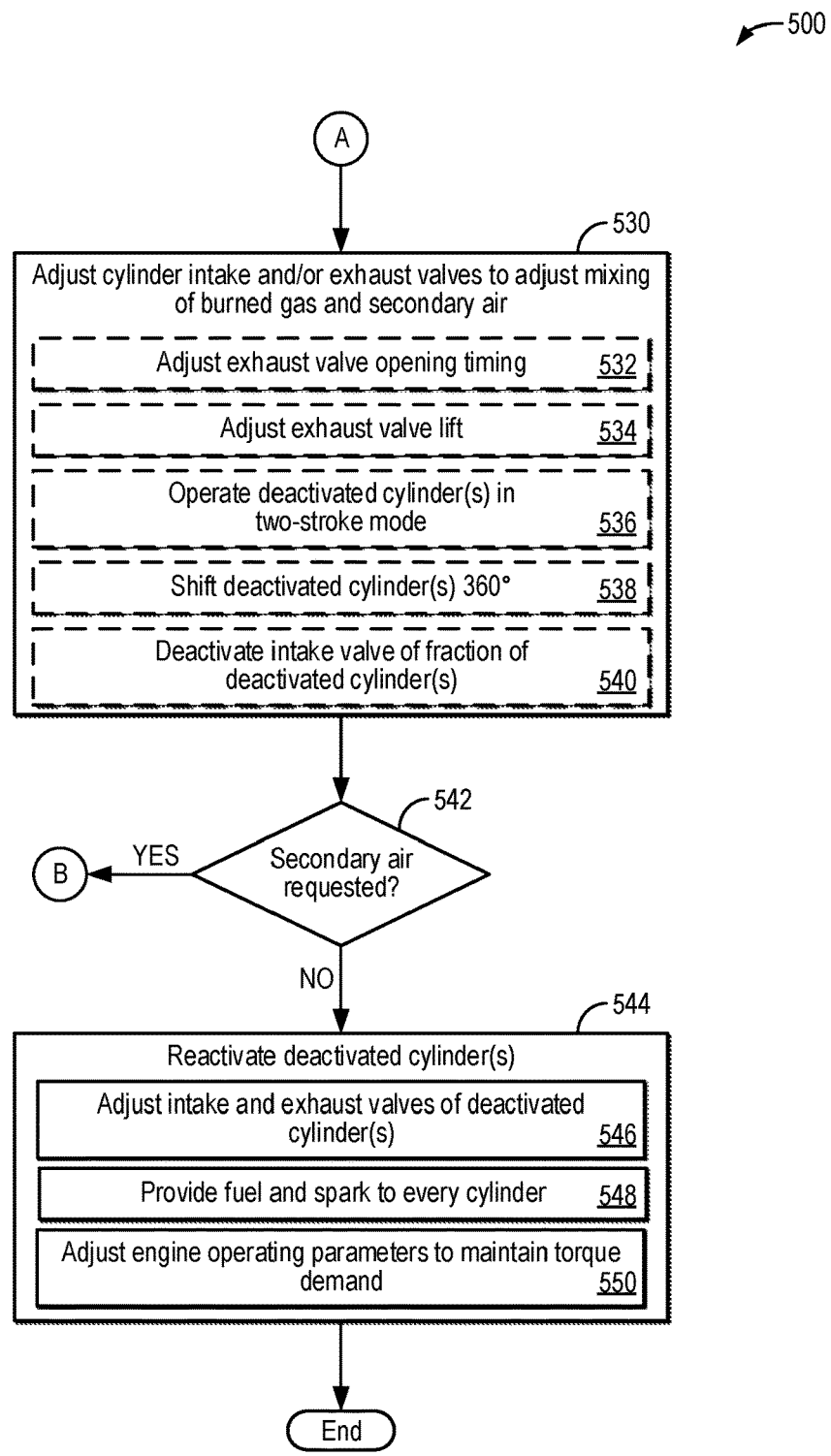

Therefore, FIGS. 5A and 5B show a method 500 for adjusting a cylinder deactivation (e.g., skip-fire) pattern and cylinder intake and/or exhaust valve operation of active and/or deactivated cylinders to provide secondary air to an exhaust system of an engine. Providing secondary air via one or more deactivated cylinders may be referred to as operating the engine in a thermactor mode. The engine may be engine 10 described with respect to FIG. 1, for example, and may include a plurality of cylinders positioned upstream of the catalyst (e.g., emission control device 178 of FIG. 1). Instructions for carrying out method 500 may be executed by a controller based on instructions stored on a memory of the controller and in conjunction with signals received from sensors of the engine system, such as the sensors described above with reference to FIG. 1 and also elaborated below. The controller may employ engine actuators of the engine system, such as fuel injectors and valve actuators, to adjust engine operation according to the methods described below.

Beginning with FIG. 5A, at 502, method 500 includes estimating and/or measuring operating conditions. The operating conditions may include, for example, an engine speed, an intake manifold pressure (e.g., MAP), a mass air flow of intake air provided to the engine (e.g., MAF), an engine temperature, a torque demand, an exhaust gas temperature, a commanded engine AFR, a measured engine AFR, an accelerator pedal position, a brake pedal position, etc.

As one example, the exhaust gas temperature may be measured by the exhaust gas temperature sensor, such as temperature sensor 158 of FIG. 1, and may be used to infer a temperature of the catalyst. As another example, the measured AFR may be determined based on output from an exhaust gas oxygen sensor (e.g., exhaust gas sensor 128 of FIG. 1). The intake manifold pressure may be measured by a MAP sensor, such as MAP sensor 124 of FIG. 1, and the inducted mass air flow may be measured by a MAF sensor, such as MAF sensor 122 of FIG. 1. As still another example, the engine temperature may be determined from an output of an engine coolant temperature sensor, such as ECT sensor 116 of FIG. 1. Further, the accelerator pedal position may be measured by an accelerator pedal position sensor, such as accelerator pedal position sensor 134 of FIG. 1, and the brake pedal position may be measured by a brake pedal position sensor, such as brake pedal position sensor 137 of FIG. 1. Together, the accelerator pedal position and the brake pedal position may indicate the torque demand.

At 504, method 500 includes determining if the secondary air is requested. For example, the secondary air may be requested responsive to a cold start condition of the engine. The cold start may be confirmed when the engine temperature is less than a first threshold temperature. The first threshold temperature may correspond to a non-zero, positive temperature value stored in a memory of the controller, above which the engine is considered to be warm and at a steady state operating temperature. As another example, the cold start may be confirmed when the engine temperature is substantially equal to an ambient temperature (e.g., within a threshold of the ambient temperature, such as within 10° C.) at engine start (e.g., when the engine cranked from zero speed to a non-zero speed, with fuel and spark provided to initiate combustion). As still another example, the cold start may be confirmed when the engine has been inactive for greater than a threshold duration, which may correspond to a non-zero amount of time (e.g., minutes, hours, or days) over which the engine is expected to cool to approximately ambient temperature.

Additionally or alternatively, the secondary air may be requested responsive to the temperature of the catalyst being less than a desired operating temperature. As one example, the desired operating temperature may be a light-off temperature of the catalyst. The light-off temperature of the catalyst may be a predetermined, second threshold temperature stored in the memory of the controller at or above which a high catalytic efficiency is achieved, enabling the catalyst to effectively decrease vehicle emissions, for example. The catalyst may be below its light-off temperature when the engine temperature is less than the first threshold temperature, for example, and thus, heating of the catalyst by supplying the secondary air to generate exotherms in the exhaust system may be requested during the cold start condition.

Because deactivated cylinders are used to provide the secondary air instead of producing torque, conditions for operating in the thermactor mode may overlap with conditions for operating in the VDE mode (e.g., VDE mode operating conditions). The conditions for operating in the VDE mode may include the torque demand, or engine load, being below a threshold. The threshold torque may refer to a positive, non-zero amount of torque (or engine load) that cannot be met or exceeded while operating with deactivated cylinder(s). For example, when the torque demand is less than the threshold, the torque demand may be met by the remaining active cylinders (and optionally, with electric assist) while the one or more cylinders is deactivated, as further described below. Thus, the conditions for operating in the thermactor mode may include the conditions for operating in the VDE mode and may additionally include the temperature of the catalyst being less than the desired operating temperature and/or the engine temperature being less than the first threshold temperature.

If the secondary air is not requested, the method 500 proceeds to 506 and includes not deactivating cylinder(s) to provide secondary air. However, in some examples, one or more cylinders may be deactivated responsive to a request for operating in the VDE mode, where a subset of the cylinders are deactivated when the torque demand is less than the threshold, as described above. Method 500 may then end.

Returning to 504, if the secondary air is requested, method 500 proceeds to 508 and includes determining a desired gas flow composition. The desired gas flow composition refers to a desired composition of gas to be provided to the exhaust system and comprises both a desired burned gas to secondary air ratio and a desired degree of mixing of the burned gas and secondary air. For example, the burned gas (e.g., exhaust gas) to secondary air ratio may be related to a firing density of the engine, which is a number of fired (e.g., active) cylinders divided by a total number of cylinders of the engine (both fired and skipped). The burned gas to secondary air ratio may also be related to a volumetric efficiency (or cylinder trapped mass) of skipped cylinders and a volumetric efficiency (or cylinder trapped mass) of fired cylinders. For example, the desired burned gas to secondary air ratio may decrease as the catalyst temperature decreases in order to provide more secondary air to the colder catalyst by deactivating a greater fraction of cylinders and/or increasing the volumetric efficiency of deactivated cylinders (e.g., by increasing an intake valve lift or duration of the deactivated cylinders). In other examples, the desired burned gas to secondary air ratio may remain relative constant throughout operation in the thermactor mode. In some examples, the desired burned gas to secondary air ratio may be constrained to a pre-determined range based on a configuration of the engine (such as a layout and the total number of cylinders, a number and identity of cylinders that are able to be deactivated, etc.) and the torque demand, as will be elaborated below at 510, as well as to prevent excessive air flow to the catalyst. Further, as used herein, the term "burned gas" denotes gas exhausted after a combustion event within a cylinder and may include unburned fuel.

At 510, method 500 includes selecting the cylinder deactivation pattern based on the desired gas flow composition, the torque demand, and noise, vibration, and harshness (NVH) considerations. The cylinder deactivation pattern may be selected based on the torque demand in order to maintain vehicle operability and drivability, as the remaining fueled cylinders provide all of the engine torque. Further, the cylinder deactivation pattern may be selected in order to mitigate NVH depending on the configuration of the engine. The cylinder deactivation pattern may be further dictated by hardware constraints of the engine. For example, some engine configurations may allow rolling VDE (rVDE) and/or enable a greater number of firing densities to be achieved, whereas other engine configurations have fixed cylinders that may be deactivated (e.g., static cylinder deactivation patterns) and/or enable a smaller number of firing densities to be achieved. Thus, in some examples, a number and identity of the cylinders selected for deactivation may be constant each engine cycle or deactivation event, while in other examples, the number and identity of the cylinders selected for deactivation may vary from engine cycle to engine cycle and/or from deactivation event to deactivation event. Further still, hybrid electric vehicles (HEVs) may enable the engine to operate with fewer active cylinders and still meet the torque demand, as will be elaborated below with respect to 522.

Mixing of the burned gas and the secondary air may be increased by having active, fired cylinders preceded and/or followed by deactivated, skipped cylinders within a known firing order of the engine. For example, a possible cylinder deactivation pattern may include alternating between active and deactivated (e.g., unfired) cylinders within the firing order (e.g., S-F-S-F-S-F, where "S" is a deactivated cylinder and "F" is an active cylinder), having two deactivated cylinders preceded and/or followed by a fired cylinder (e.g., S-S-F-S-S-F), or having two fired cylinders preceded and/or followed by a deactivated cylinder (e.g., S-F-F-S-F-F). However, cylinder deactivation patterns that increase mixing may not produce the desired burned gas to secondary air ratio and/or may not meet the torque demand. Therefore, the controller may select a cylinder deactivation pattern that increases mixing when that cylinder deactivation pattern is also able to produce the desired burned gas to secondary air ratio and the torque demand. For example, in selecting the cylinder deactivation pattern, the controller may more heavily weigh the desired burned gas to secondary air ratio and the torque demand over the desired mixing of the burned gas and secondary air.

Further still, as will be elaborated below, both the burned gas to secondary air ratio and mixing may be affected by adjusting intake and/or exhaust valve parameters. Therefore, the controller may further take into account available cylinder valve adjustments and their effects in selecting the cylinder deactivation pattern. The available cylinder valve adjustments may be dictated by a valve actuation mechanism controlling each intake valve and exhaust valve. For example, the valve actuation mechanism may include a VCT system (such as VCT system 232 shown in FIG. 2), a CVVL system (such as CVVL system 400 shown in FIG. 4), an electric valve actuation system (e.g., a camless system), or a valve deactivation system. In particular, the VCT system may be a "fast" VCT system that enables the cam timing to be varied between consecutive firing events, in contrast to a "slow" VCT system that is unable to vary cam timing between the consecutive firing events, even at low engine speeds (e.g., idle speed). Thus, in some examples, the controller may input the desired burned gas to secondary air ratio and the torque demand into one or more look-up tables, algorithms, and maps, which may output the cylinder deactivation pattern to select that will result in the most favorable mixing and reduced NVH given the available cylinder valve adjustments.

Selecting the cylinder deactivation pattern includes determining a number and identity of the cylinder(s) to deactivate each engine cycle, as indicated at 512. For example, the controller may select a group of cylinders and/or an engine bank to deactivate based on the engine operating conditions and the desired burned gas to secondary air ratio. As another example, the number of cylinders to be deactivated may increase as the driver torque demand decreases. In still other examples, the controller may determine a desired firing density or induction ratio (a total number of cylinder firing events divided by a total number of cylinder compression strokes) based at least on the torque demand and the desired burned gas to secondary air ratio. The controller may determine the number of cylinders to deactivate (or the desired firing density) by inputting the operating conditions, such as one or more of the torque demand and the desired burned gas to secondary air ratio, into one or more look-up tables, maps, or algorithms, which may output the number of cylinders to deactivate for the given conditions. As an example, the pattern for a firing density of 0.5 may include every other cylinder being fired (wherein combustion is carried out within the cylinder during a combustion cycle of the cylinder) or unfired (wherein fueling is disabled and combustion does not occur).

Selecting the cylinder deactivation pattern further includes determining a duration of deactivation of each cylinder in the selected pattern, as indicated at 514. For example, the controller may determine a number of combustion events or engine cycles over which to maintain the selected cylinders deactivated. In some examples, the same pattern may be applied for each consecutive engine cycle such that the same cylinders are unfired (e.g., skipped) on consecutive engine cycles while the remaining cylinders are fired on each of the engine cycles. In other examples, different cylinders may be unfired on each engine cycle such that the firing and unfiring is cycled or distributed amongst the engine cylinders. Furthermore, in some examples, the same set of cylinders may be selected for deactivation each time cylinder deactivation conditions are met, while in other examples, the identity of the deactivated cylinders may be varied each time cylinder deactivation conditions are met.

At 516, method 500 includes deactivating the cylinder(s) in the selected deactivation pattern. In particular, as indicated at 518, deactivating the cylinder(s) in the selected deactivation pattern includes disabling fuel and spark in the cylinder(s) in the selected deactivation pattern for the determined duration of deactivation (e.g., one engine cycle, two engine cycles, or more). However, the intake and exhaust valves of the cylinder(s) in the selected deactivation pattern may continue to open and close depending on the selected deactivation pattern in order to pump air through the deactivated cylinder(s). As will be elaborated below, the selected deactivation pattern may include operating the deactivated cylinder(s) in one or a plurality of different skipped states that include differences in intake and/or exhaust valve settings, including one or more of different valve timing settings, different valve lift settings, different valve duration settings, and different valve deactivation settings based on a desired control of the burned gas and the secondary air. For example, the desired control of the burned gas and the secondary air may include controlling (or changing) the relative amounts (e.g., based on the desired burned gas to secondary air ratio) as well as controlling (or changing) a degree of mixing between the burned gas and the secondary air. Thus, as used herein, deactivating a cylinder does not include deactivating the intake and exhaust valves of that cylinder unless explicitly stated. As such, the engine may be transitioned to operating in the thermactor mode to provide secondary air to the exhaust system.

At 520, method 500 includes adjusting operating parameters to maintain the torque demand and increase heat generation. For example, one or more of airflow, spark timing, and cylinder valve timing may be adjusted in the active cylinders in order to maintain the engine torque demand and minimize torque disturbances as well as to further expedite catalyst heating. As such, the engine may be operated with a subset of cylinders deactivated in the selected pattern while a remaining number of active cylinders provide all of the torque demand.

As one example, the active cylinders may be operated at a rich AFR so that the additional fuel from the fired cylinders burns with the secondary air from the skipped cylinders to heat the catalyst. The controller may determine a degree of enrichment by inputting the desired exhaust gas to secondary air ratio and the catalyst temperature into a look-up table stored in memory, which may output the corresponding degree of enrichment. As another example, the spark timing may be retarded to increase an exhaust temperature of the active, fired cylinders. The retarded spark timing may also increase an in-cylinder pressure at exhaust valve opening, resulting in a larger blowdown pulse and increased mixing. However, because the retarded spark timing reduces torque, an amount of allowable spark retard may depend on the torque demand, the number of active cylinders, and an availably of electric torque assist, which will be elaborated below. For example, the controller may input the torque demand, the number of active cylinders, and an amount of electric torque assist (when available) into a look-up table, which may output the amount of spark retard (or a retarded spark timing) to use given the input parameters.

In some examples, adjusting the operating parameters to maintain the torque demand optionally includes supplementing the engine torque with torque from an electric machine (e.g., electric machine torque) to meet the torque demand, as optionally indicated at 522. In particular, when the engine is included in a HEV, the vehicle may be operated with electric torque assist, wherein the electric machine (e.g., electric machine 52 shown in FIG. 1) draws power from a system battery (e.g., battery 58 of FIG. 1) to provide additional positive torque to a crankshaft of the engine. As such, a first portion of the torque demand may be provided by the active cylinders while a second, remaining portion of the torque demand may be provided by the electric machine. In this way, the engine may be operated with fewer active cylinders compared to when the vehicle is not a HEV, enabling the controller to select between a greater number of possible cylinder deactivation patterns and/or operate active cylinders with a greater amount of spark retard.

At 524, method 500 includes adjusting cylinder intake and/or exhaust valves to vary a trapped mass between cylinders. That is, a trapped mass in a first cylinder (or a first number of cylinders) may be varied relative to a trapped mass in a second cylinder (or a second number of cylinders) by adjusting the intake and/or exhaust valve of one or both of the first and second cylinders. In some examples, the trapped mass of the active cylinders may be varied relative to the trapped mass of the deactivated cylinders (or vice versa). Additionally or alternatively, the trapped mass of a first deactivated cylinder (or a first number of deactivated cylinders) may be varied relative to that of second deactivated cylinder (or a second number of deactivated cylinders). As a further example, additionally or alternatively, the trapped mass of a first active cylinder (or a first number of active cylinders) may be varied relative to that of a second active cylinder (or a second number of active cylinders). Thus, the controller may select cylinder intake and/or exhaust valves adjustments that will produce the desired burned gas to secondary air ratio given the firing density of the selected cylinder deactivation pattern. For example, the controller may input the torque demand, the firing density, and the desired burned gas to secondary air ratio into a look-up table stored in memory that contains the available intake and exhaust valve adjustments for the type of valve actuation system installed in the engine, and the look-up table may output the intake and/or exhaust valve adjustments that will produce the greatest mixing for the input constraints.

In some examples, adjusting the cylinder intake and/or exhaust valves includes adjusting an intake valve timing, duration, and/or lift, as optionally indicated at 526. For example, if the intake valve actuation system enables different cylinders to "breathe" differently, the intake valves of some or all of the active cylinders and/or some or all of the deactivated cylinder may be differently adjusted. Because different cylinders interact differently with the intake manifold based on their location and the intake manifold configuration, the intake valve timing, duration, and lift may differ among each of the active cylinders and each of the deactivated cylinder(s), at least in some examples, in order to account for these different interactions. Intake valve actuation systems that may allow such an adjustment include a fast VCT system, a CVVL system, and an electric valve actuation system. For example, an intake camshaft phaser (e.g., intake camshaft phaser 234 of FIG. 2) of a fast VCT system may be retarded prior to opening the intake valve of a deactivated cylinder to retard its opening timing and/or while the intake valve of the deactivated cylinder is open to reduce an open duration of the intake valve, such as described with respect to FIGS. 3B and 3C. As another example, a hydraulic pressure in the CVVL system may be reduced by partially opening a hydraulic control valve to reduce the intake valve lift.

As an illustrative example, when the desired burned gas to secondary air ratio is 4 to 1, an alternating cylinder deactivation pattern of F S F SFS may be used where a deactivated cylinder traps one-fourth of the mass trapped by an active cylinder by reducing the intake valve duration and/or lift of the deactivated cylinders compared to the active cylinders. This cylinder deactivation pattern may be selected (e.g., at 510) instead of F F F F S F F F F S, which would also produce the 4 to 1 desired burned gas to secondary air ratio when different intake valve adjustments are not used, because the alternating cylinder deactivation pattern has increased mixing. Further, the reduced trapped mass of the deactivated cylinders may further increase mixing by increasing a vacuum in the deactivated cylinders at exhaust valve opening, which may result in a suction effect that produces backward flow followed by forward exhaust flow later in the exhaust stroke as the piston within the corresponding deactivated cylinder rises.

In other examples, adjusting the cylinder intake and/or exhaust valves includes deactivating the intake and exhaust valves of the deactivated cylinder(s) for a duration, as optionally indicated at 528. For example, the intake and/or exhaust valves of some or all of the deactivated cylinder(s) may be deactivated when the engine includes a valve deactivation system, an electric valve actuation system, or a CVVL system for controlling the intake valve and the exhaust valve of each deactivated cylinder. As one example, the controller may reduce a hydraulic pressure in the CVVL system below a threshold hydraulic pressure by fully opening a hydraulic control valve. The threshold hydraulic pressure refers to a pre-determined pressure above which a corresponding intake or exhaust valve is opened during a cam lobe rise interval, such as described above with respect to FIG. 4. Thus, while the hydraulic pressure is less than the threshold pressure, a hydraulic pressure increase caused by the cam lobe rise interval is unable to overcome a spring force maintaining the corresponding intake or exhaust valve closed, and valve lift is prevented. In contrast, deactivating the intake and/or exhaust valves of the deactivated cylinder(s) for the duration may not be performed when the engine includes a VCT system for controlling the intake and exhaust valve of each deactivated cylinder.

The duration may be a pre-determined value stored in the memory of the controller that is calibrated to provide the desired change in the trapped mass between the active and deactivated cylinders, resulting in the desired burned gas to secondary air ratio, for example. As one example, the duration may be one or more engine cycles. For example, all or a portion of the deactivated cylinder(s) may be alternated (or cycled) between having deactivated intake valves with active exhaust valves and having active intake valves with deactivated exhaust valves. Further, in some examples, both the intake and exhaust valve may be deactivated for one or more engine cycles after air is inducted into the corresponding deactivated cylinder. As such, an air charge may be inducted into the corresponding deactivated cylinder during an engine cycle where the intake valve is not deactivated and may be trapped within the cylinder until a subsequent engine cycle (e.g., after the duration) where the exhaust valve is active. A portion of the air charge may bleed into a crankcase of the engine while trapped within the deactivated cylinder, thus reducing a mass of the air charge when it is exhausted upon reactivating the exhaust valve. This may enable cylinder deactivation patterns with decreased NVH to be selected (e.g., at 510), for example. Examples of such cylinder deactivation patterns will be described below with respect to FIGS. 9 and 13.

In another example, additionally or alternatively, both the intake valve and the exhaust valve of a portion of the deactivated cylinders may be deactivated for the duration. As such, a first number of the deactivated cylinders may be operated in a first skipped state to provide secondary air and/or mixing while a second number of the deactivated cylinders (e.g., having the fully closed intake and exhaust valves) are operated in a second, different skipped state to reduce pumping losses while not participating in the secondary air production or mixing.

Continuing to FIG. 5B, at 530, method 500 includes adjusting the cylinder intake and/or exhaust valves to adjust mixing of the burned gas and the secondary air. As mentioned previously, reducing the trapped mass of the deactivated cylinders via the intake valve adjustments may increase vacuum at the exhaust valve opening of the deactivated cylinders, which may increase mixing. However, intake and/or exhaust valve operation may be further varied for individual deactivated and/or active cylinders for additional increased mixing. In some examples, the controller may adjust the cylinder intake and/or exhaust valves of one or more or each of the active cylinders and/or the deactivated cylinder(s) to substantially maximize mixing based on the type of valve actuation system included in the engine, as will be elaborated below, as well as the torque demand, the firing density of the selected cylinder deactivation pattern, and the desired burned gas to secondary air ratio. That is, the controller may select cylinder intake and/or exhaust valves adjustments that will result in the greatest increase in mixing while still meeting the torque demand and producing the desired burned gas to secondary air ratio. For example, the controller may input the torque demand, the firing density of the selected cylinder deactivation pattern, and the desired burned gas to secondary air ratio into a look-up table stored in memory that contains the available intake and exhaust valve adjustments given the type of valve actuation system controlling each intake and exhaust valve, and the look-up table may output the intake and/or exhaust valve adjustments that will produce the greatest mixing for the input constraints.

Thus, in some examples, adjusting the cylinder intake and/or exhaust valves to adjust mixing of the burned gas and the secondary air includes adjusting an exhaust valve opening (EVO) timing, as optionally indicated at 532. An EVO timing farther from BDC (either advanced or retarded) may result in a larger blowdown pulse from active cylinders due to a higher in-cylinder pressure, which results in more turbulence and pressure gradients in an exhaust manifold of the engine for increased mixing. As one example, the EVO timing of some or all of the active cylinders may be retarded to increase the blowdown pulse, where higher pressure burned gas is exhausted immediately following EVO. Further, the EVO timing of the active cylinders may be retarded from BDC rather than advanced from BDC to ensure that the EVO does not occur prior to combustion being completed. As another example, an EVO timing closer to BDC (e.g., less advanced or less retarded) for the deactivated cylinder(s) may produce higher in-cylinder vacuum at EVO, which causes back flow into the deactivated cylinder(s) for increased mixing. Adjusting the EVO timing may be performed when the engine includes a fast VCT system, a CVVL system, or an electric valve actuation system for controlling the exhaust valves, for example. As one example, the controller may adjust an exhaust camshaft phaser (e.g., exhaust camshaft phaser 236 of FIG. 2) to a phasing that is closer to BDC prior to exhaust valve opening of a deactivated cylinder and adjust the exhaust camshaft phaser to a phasing that is more retarded from BDC prior to exhaust valve opening of an active cylinder.

In other examples, adjusting the cylinder intake and/or exhaust valves to adjust mixing of the burned gas and the secondary air includes adjusting an exhaust valve lift, as optionally indicated at 534. A smaller exhaust valve lift increases a gas flow velocity across the valve, which produces increased turbulence in the exhaust manifold for increased mixing. Further, the exhaust valve lift may be adjusted between a larger lift and a smaller lift to vary gas flow properties. As one example for a deactivated cylinder with vacuum at EVO, a large exhaust valve lift may be used initially to pull in an increased amount of gas from the exhaust manifold. Then, the deactivated cylinder may be switched to operating with a small exhaust valve lift during a same exhaust valve opening event to increase the gas flow velocity as a piston rises within the cylinder and expels the contents. A large exhaust valve lift followed by a small exhaust valve lift (during a same exhaust valve opening event) may also be used for an active cylinder to produce an initial large blowdown followed by higher speed post-blowdown exhaust.

Adjusting the exhaust valve lift may be performed when the engine includes a CVVL system or an electric valve actuation system for controlling the exhaust valves, for example. As an example, decreasing the hydraulic pressure in the CVVL system (while maintaining the hydraulic pressure above the threshold hydraulic pressure) by further opening the corresponding hydraulic control valve may decrease the exhaust valve lift, while increasing the hydraulic pressure in the CVVL system by further closing the corresponding hydraulic control valve may increase the exhaust valve lift.

In still other examples, adjusting the cylinder intake and/or exhaust valves to adjust mixing of the burned gas and the secondary air includes operating the deactivated cylinder(s) in a two-stroke mode, as optionally indicated at 536. In the two-stroke mode, the deactivated cylinder may induct during both the intake and expansion strokes and exhaust during both the exhaust and compression strokes. When referring to strokes of deactivated cylinders herein, each stroke is named according to what stroke the deactivated cylinder would be in if combustion were performed during a four-stroke engine cycle based on the known firing order of the engine. Thus, even though one or more deactivated cylinders may be operated in a two-stroke mode, because the active cylinders are operated in a four-stroke mode, reference will still be made to the four-stroke engine cycle. Operating the deactivated cylinder(s) in the two-stroke mode may be achieved when the intake and exhaust valves are controlled by a CVVL system with an additional cam lobe, such as the system shown in FIG. 4, a CVVL system driven at crank speed (instead of half of the crank speed), or an electric valve actuation system.

As one example, to operate a deactivated cylinder in the two-stroke mode, the controller may maintain a hydraulic pressure in an intake CVVL actuator controlling an intake valve of the deactivated cylinder above the threshold hydraulic pressure (e.g., described above at 528) during both of the intake stroke and the expansion stroke of the deactivated cylinder. Additionally, the controller may maintain a hydraulic pressure in an exhaust CVVL actuator controlling an exhaust valve of the deactivated cylinder above the threshold hydraulic pressure during both of the exhaust stroke and the compression stroke of the deactivated cylinder. The controller may adjust a hydraulic control valve of the intake CVVL actuator to maintain the hydraulic pressure in the intake CVVL actuator above the threshold hydraulic pressure and adjust a hydraulic control valve of the exhaust CVVL actuator to maintain the hydraulic pressure in the exhaust CVVL above the threshold hydraulic pressure. For example, the controller may further (e.g., fully) close the corresponding hydraulic control valve so that the cam lobe rise interval further increases the hydraulic pressure on a valve piston of the corresponding valve, thus overcoming a spring force to open the corresponding valve.

Operating the deactivated cylinder(s) in the two-stroke mode may enable unconventional cylinder deactivation patterns to be selected (e.g., at 510) because each deactivated cylinder that is operating in the two-stroke mode provides secondary air twice as frequently as each active cylinder provides burned gas. Further, operating the deactivated cylinders in the two-stroke mode promotes mixing because some of the secondary air is exhausted at the same time as burned gas from an active cylinder.

In yet other examples, adjusting the cylinder intake and/or exhaust valves to adjust mixing of the burned gas and the secondary air includes shifting the deactivated cylinder(s) 360 crank angle degrees (CAD), as optionally indicated at 538. Similar to the two-stroke mode, shifting the deactivated cylinder(s) 360 degrees may be performed when the intake and exhaust valves are controlled by a CVVL system or electric valve actuation and results in secondary air being exhausted at the same time as burned gas from an active cylinder. That is, instead of the intake valve being open during the intake stroke and the exhaust valve being open during the exhaust stroke, the intake valve and the exhaust of the deactivated cylinder(s) may instead be open during the traditional expansion and compression strokes, respectively.

For example, as described above with respect to FIG. 4, a CVVL system driven at the crank speed (or including a cam with two cam lobes) where hydraulic fluid is bypassed every other cam lobe rise interval may be used to shift the deactivated cylinder(s) 360 degrees. The controller may maintain the hydraulic pressure in the intake CVVL actuator below the threshold hydraulic pressure during the intake stroke, such as by further (e.g., fully) opening the corresponding hydraulic control valve, so that the cam rise interval does not overcome the spring force to open the intake valve during the intake stroke. The controller may maintain the hydraulic pressure in the intake CVVL actuator above the threshold hydraulic pressure during the expansion stroke, such as by closing the corresponding hydraulic control valve, to open the intake valve during the expansion stroke, such as described above at 536. Similarly, the controller may open the hydraulic control valve of the exhaust CVVL actuator to maintain the hydraulic pressure in the exhaust CVVL actuator below the threshold hydraulic pressure during the exhaust stroke and close the hydraulic control valve of the exhaust CVVL actuator to maintain the hydraulic pressure in the exhaust CVVL actuator above the threshold hydraulic pressure during the compression stroke, thus opening the exhaust valve during the compression stroke and not during the exhaust stroke. As such, unconventional cylinder deactivation patterns may be selected (e.g., at 510). Further, because of the shift, a cam lobe may be shared by a plurality of cylinders (e.g., two or three cylinders), enabling a cost reduction.

In some examples, adjusting the cylinder intake and/or exhaust valves to adjust mixing of the burned gas and the secondary air includes deactivating the intake valve of a fraction of the deactivated cylinder(s), as optionally indicated at 540. In this way, a remaining number of the deactivated cylinders may provide all of the secondary air while the fraction of the deactivated cylinder(s) with the deactivated intake valves provide mixing via active exhaust valves. For example, a cylinder deactivation pattern of F-s-S-F-s-S may be used, where the intake valve of each of the "s" deactivated cylinders is fully deactivated and the intake valve of each of the "S" deactivated cylinders remains active (e.g., with or without adjustments relative to the active "F" cylinders, depending on the desired burned gas to secondary air ratio). An example of such a cylinder deactivation pattern will be described below with respect to FIG. 8. Deactivating the intake valve of the fraction of the deactivated cylinder(s) may be performed in engine systems that include a valve deactivation system, an electric valve actuation system, or a CVVL system for controlling the intake valves.

It may be understood that the valve adjustments described above from 524 to 540 may be used alone or in combination. For example, a deactivated cylinder that is operated in the two-stroke mode (e.g., as described at 536) may also be operated with intake valve adjustments (e.g., as described at 526) during both the intake and expansion strokes to control the inducted air mass and low exhaust valve lift (e.g., as described at 534) for increased gas flow velocity and turbulence to increase mixing. Similarly, a deactivated cylinder may be shifted 360 degrees (e.g., as described at 538) and may also be operated with intake valve adjustments (e.g., as described at 526) during the expansion stroke to control the inducted air mass and low exhaust valve lift during the compression stroke (e.g., as described at 534) for increased gas flow velocity and turbulence to increase mixing.

At 542, it is again determined if the secondary air is requested. For example, the secondary air may no longer be requested responsive to the catalyst reaching its light-off temperature. If the secondary air continues to be requested, method 500 returns to 508 (see FIG. 5A) to determine the desired gas flow composition based on the catalyst temperature. For example, the desired gas flow composition, including the desired burned gas to secondary air ratio and/or the desired degree of mixing, may change as the catalyst temperature changes, and thus, the cylinder deactivation pattern and cylinder valve adjustments may be adjusted accordingly. Additionally or alternatively, the cylinder deactivation pattern and/or the operating parameters of the active cylinders may be adjusted responsive to a change in the catalyst temperature and/or a change in the torque demand, an example of which will be described with respect to FIG. 22.

If the secondary air is no longer requested, method 500 proceeds to 544 and includes reactivating the deactivated cylinder(s). Reactivating the deactivated cylinder(s) includes adjusting the intake and exhaust valves of the deactivated cylinder(s), as indicated at 546. For example, the intake and exhaust valves of every engine cylinder, including the cylinder(s) previously selected for deactivation, may be opened and closed at predetermined times throughout an engine cycle to enable intake air to be inducted into every cylinder and exhaust gas to be expelled from every cylinder. The predetermined times may be selected based on current operating conditions, such as the torque demand, for example.

Reactivating the deactivated cylinder(s) further includes providing fuel and spark to every cylinder, as indicated at 548. For example, fuel and spark may be resumed in the previously deactivated cylinders. As a result, the reactivated cylinders may begin to combust air and fuel therein to produce torque. As such, every cylinder of the engine may be provided with fuel and an ignition spark, and combustion may occur in every cylinder of the engine according to the firing order.

Reactivating the deactivated cylinder(s) further includes adjusting the engine operating parameters to maintain the torque demand, as indicated at 550. Because all cylinders are now active, each active cylinder may operate with a lower average cylinder load to meet the torque demand relative to when secondary air was provided. In some examples, one or more of airflow, spark timing, and cylinder valve timing may be adjusted in order to minimize torque disturbances during the transition to operating without providing secondary air. Further, in some examples, such as when the vehicle is a HEV, the deactivated cylinders may be gradually reactivated while the torque from the electric machine is gradually decreased in order to provide a smoother transition with reduced torque disturbances.

Method 500 may then end. Thus, the transition to operating with all cylinders active from a thermactor mode may be considered to be finished, and the engine may continue to operate in the non-VDE mode to provide the demanded torque. Further, method 500 may be repeated so that the engine operating conditions may continue to be assessed, enabling the engine to transition back to operating in the VDE mode in response to the VDE mode entry conditions again being met (e.g., due to operating conditions, such as torque demand, changing).

In this way, method 500 may provide secondary air to a catalyst via at least one deactivated cylinder to expedite catalyst warming. Further, the intake and exhaust valve adjustments described above may enable fine control of the amount of secondary air provided while increasing mixing and reducing NVH. Overall, vehicle emissions may be decreased by decreasing an amount of time before the catalyst reaches its light-off temperature while operator comfort is increased by reducing torque disturbances.

Next, FIGS. 6-21 each show a chart of an example cylinder deactivation pattern for an eight cylinder (e.g., V-8) four-stroke engine having a firing order of 1-3-7-2-6-5-4-8. For example, cylinders 1, 2, 3, and 4 may be included on a first engine bank, and cylinders 5, 6, 7, and 8 may be included on a second engine bank. A vertical axis of each chart represents the cylinder number, and a horizontal axis of each chart shows a cycle (e.g., engine cycle) number. Each cylinder is represented by a numbered circle in the firing order that would occur with all cylinders active. Further, the numbered circles are aligned with the corresponding cylinder number on the vertical axis. Thus, each of the eight cylinders undergoes a four-stoke piston movement every engine cycle, whether or not the cylinder is fired (e.g., active) or skipped (e.g., unfired/deactivated), with the stroke named with reference to nominal valve and ignition timings.

The numbered circles have different fills to differentiate the different cylinder states, as indicated by a legend 602 included in each of FIGS. 6-21. As used herein, "cylinder state" refers to whether the cylinder is fired (e.g., active) or unfired (e.g., skipped/deactivated) as well as an intake valve state (e.g., active or deactivated) and an exhaust valve state (e.g., active or deactivated). For example, different cylinder states may be used for producing torque, providing secondary air, or reducing pumping losses, as will be elaborated below. Thus, each cylinder may be fired or skipped each engine cycle, and the skipped cylinders may be operated in different skipped states for finer control of secondary air production and mixing (e.g., with burned gas from the fired cylinders). Fired cylinders are indicated by a first diagonal fill 604, skipped cylinders having fully deactivated intake (IV) and exhaust (EV) valves are indicated by an open fill 606, skipped cylinders operated to produce secondary air having active intake and exhaust valves are indicated by a first dot fill 608, skipped cylinders having only active intake valves (and deactivated exhaust valves) that are operated to provide secondary air are indicated by a second diagonal fill 610, skipped cylinders operated for mixing having only active exhaust valves (and deactivated intake valves) are indicated by a diamond fill 612, and skipped cylinders operated to produce secondary air having only active exhaust valves are indicated by a second dot fill 614. Thus, five different skipped states are provided, which will be elaborated below.

Figure 6:
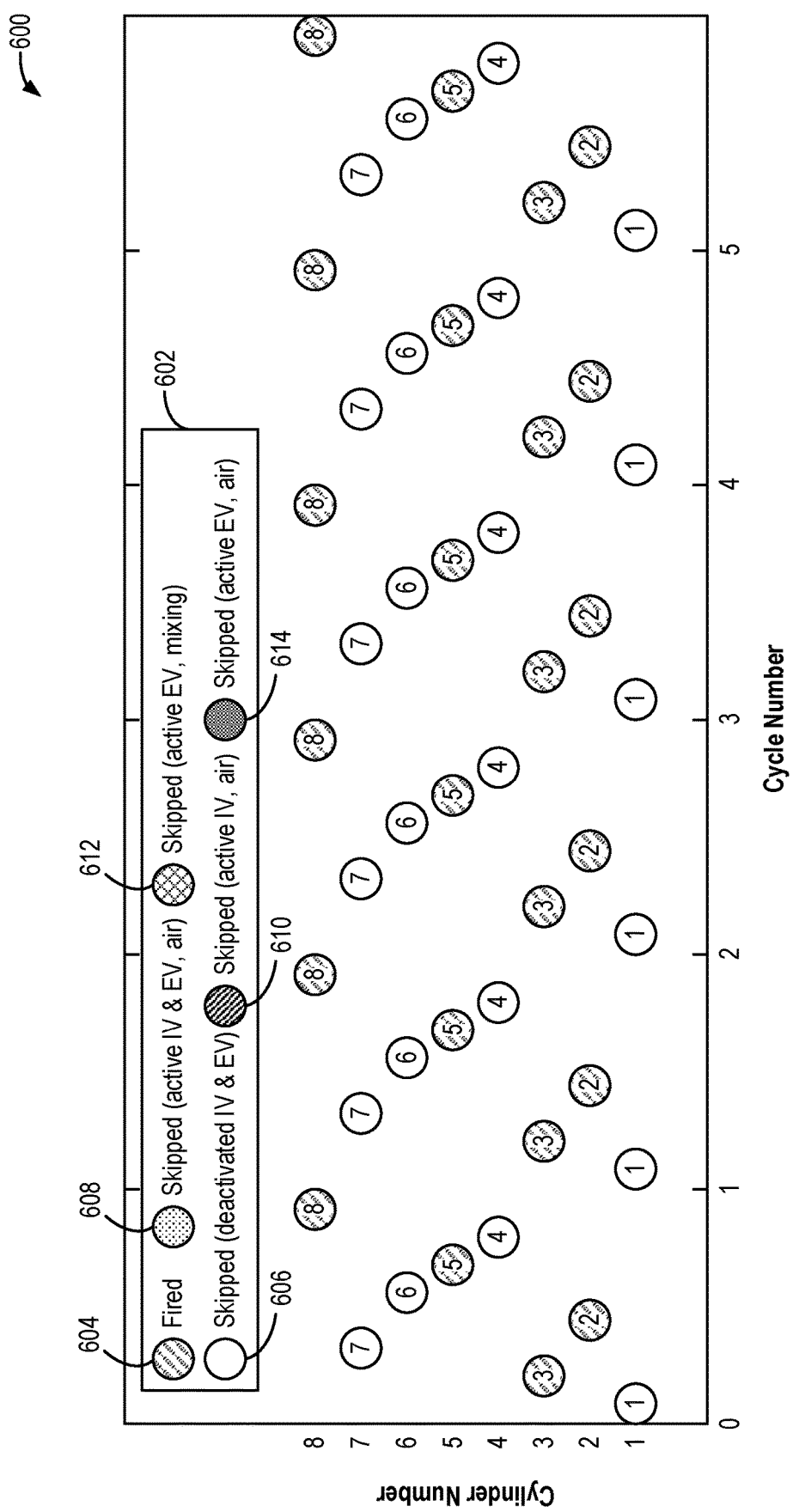
FIG. 6 shows a first example cylinder deactivation pattern, where secondary air is not provided to an exhaust system.

Turning first to FIG. 6, a first cylinder deactivation pattern 600 is shown having a firing density of ½. First cylinder deactivation pattern 600 is a static cylinder deactivation pattern, as the same cylinders are fired and skipped each engine cycle. In particular, cylinders 1, 4, 6, and 7 are deactivated every engine cycle and do not produce torque, and cylinders 2, 3, 5, and 8 are active every engine cycle and produce torque through combustion. Further, the deactivated cylinders are in a first skipped state, wherein the intake and exhaust valves of each of cylinders 1, 4, 6, and 7 are fully deactivated and remain fully closed throughout each engine cycle (e.g., open fill 606). As such, cylinders 1, 4, 6, and 7 do not provide secondary air or mixing, and the engine is operated in a VDE mode rather than a thermactor mode.

Figure 7:
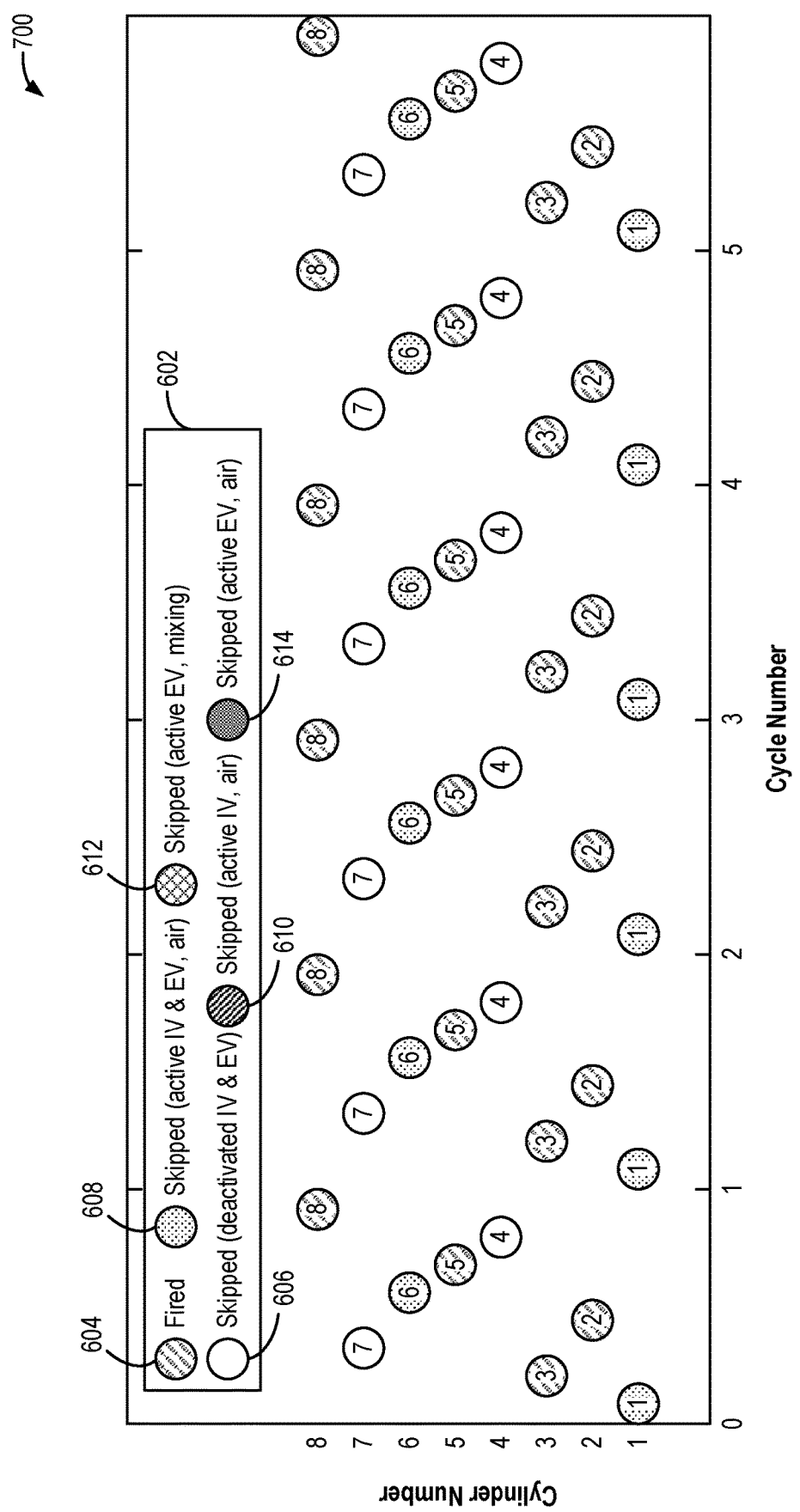
FIG. 7 shows a second example cylinder deactivation pattern, where secondary air is provided to an exhaust system.

Next, FIG. 7 shows a second cylinder deactivation pattern 700 having a firing density of ½. Similar to first cylinder deactivation pattern 600 shown in FIG. 6, second cylinder deactivation pattern 700 is a static cylinder deactivation pattern that includes cylinders 1, 4, 6, and 7 deactivated every engine cycle and cylinders 2, 3, 5, and 8 active every engine cycle. However, unlike first cylinder deactivation pattern 600 of FIG. 6, the deactivated cylinders in second cylinder deactivation pattern 700 are split between two different skipped states. Deactivated cylinders 4 and 7 are operated in the first skipped state, with fully deactivated intake and exhaust valves, and do not produce secondary air or aid mixing, but deactivated cylinders 1 and 6 are operated in a second skipped state that includes active intake and exhaust valves (e.g., first dot fill 608). As such, cylinders 1 and 6 pump secondary air to an exhaust manifold of the engine. For example, cylinder 1 pumps secondary air to a first exhaust manifold coupled to the first engine bank, while cylinder 6 pumps secondary air to a second exhaust manifold coupled to second engine bank. Each exhaust manifold may include its own dedicated catalyst, at least in some examples. Because four cylinders are active and two cylinders provide secondary air, a burned gas to secondary air ratio may be approximately 2. However, as described above with respect to FIGS. 5A and 5B, intake valve timing, duration, and/or lift adjustments of deactivated cylinders 1 and 6 relative to active cylinders 2, 3, 5, and 8 may vary the trapped mass in the skipped cylinders in the second skipped state relative to the fired cylinders. Thus, the burned gas to secondary air ratio may be varied from 2 via the above-described intake valve adjustments.

Figure 8:
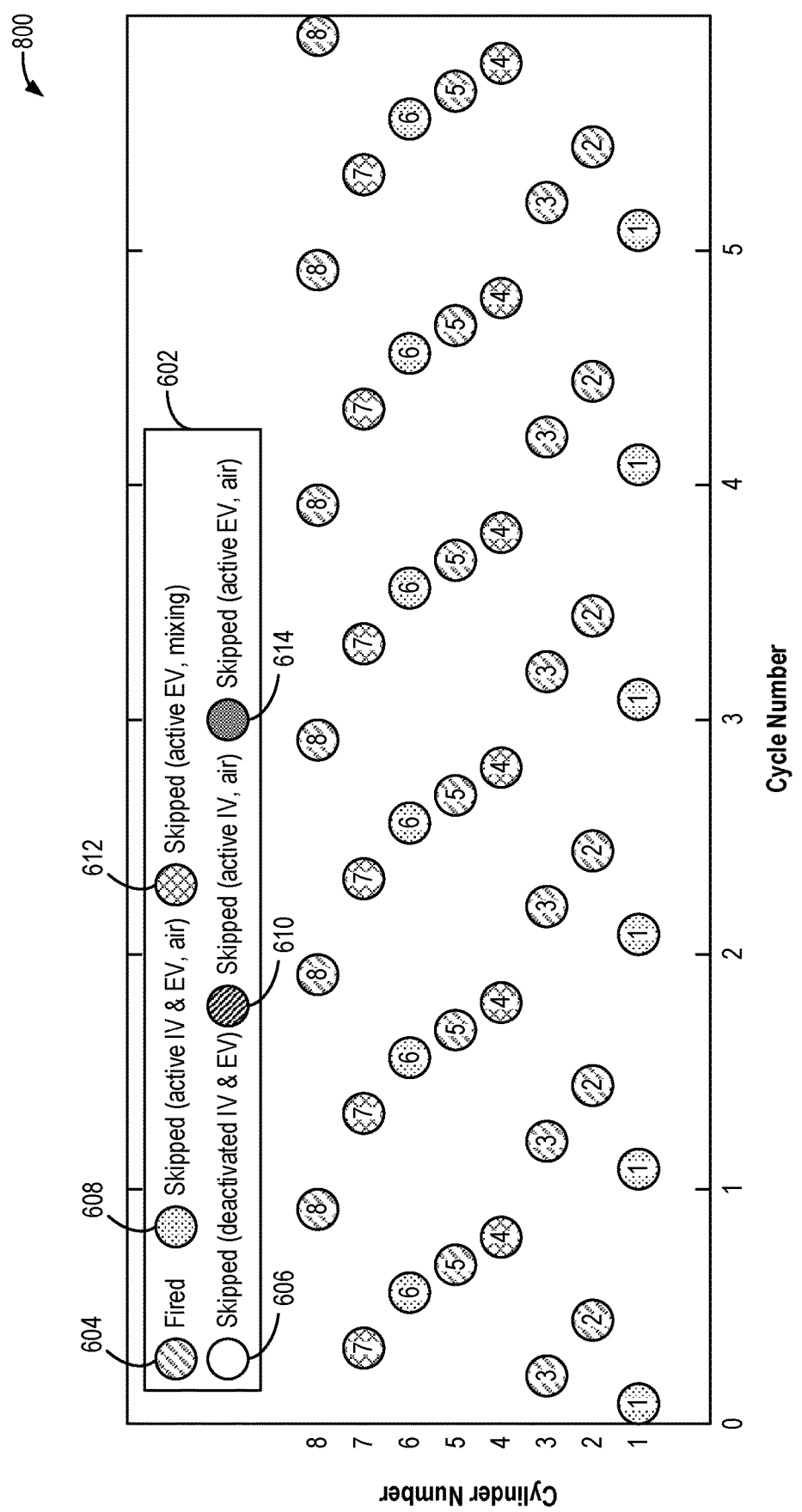
FIG. 8 shows a third example cylinder deactivation pattern, where secondary air is provided to an exhaust system with increased mixing.

Turning now to FIG. 8, a third cylinder deactivation pattern 800 is shown having a firing density of ½. Similar to first cylinder deactivation pattern 600 shown in FIG. 6 and second cylinder deactivation pattern 700 shown in FIG. 7, third cylinder deactivation pattern 800 is a static cylinder deactivation pattern that includes cylinders 1, 4, 6, and 7 deactivated every engine cycle and cylinders 2, 3, 5, and 8 active every engine cycle. The deactivated cylinders in third cylinder deactivation pattern 800 are split between two different skipped states to provide secondary air and mixing. Deactivated cylinders 4 and 7 are operated in a third skipped state, with fully deactivated intake valves and active exhaust valves, and do not produce secondary air but provide mixing (e.g., diamond fill 612). Deactivated cylinders 1 and 6 are operated in the second skipped state to provide secondary air to the exhaust manifolds.

In this way, cylinders 1 and 6 pump secondary air to the exhaust manifolds of the engine, and upon exhaust valve opening, cylinders 4 and 7 draw in a mixture of secondary air and burned gas from the exhaust manifolds. For example, cylinder 4 may draw in the mixture from the first exhaust manifold, and cylinder 7 may draw in the mixture from the second exhaust manifold. As a piston within each of cylinders 4 and 7 rises toward TDC and the corresponding exhaust valve remains open, the mixture is expelled from the corresponding cylinder back into the corresponding exhaust manifold. The backflow into cylinders 4 and 7 and subsequent expulsion further homogenizes the mixture and generates additional turbulence in the exhaust manifolds, particularly if the exhaust valve lift is varied throughout the exhaust stroke (e.g., as described with respect to 534 of FIG. 5B). As with second cylinder deactivation pattern 700 of FIG. 7, because four cylinders are active and two cylinders provide secondary air, a burned gas to secondary air ratio may be approximately 2 or may vary from 2 by adjusting the trapped mass in the skipped cylinders in the second skipped state relative to the fired cylinders via intake valve adjustments.

Figure 9:
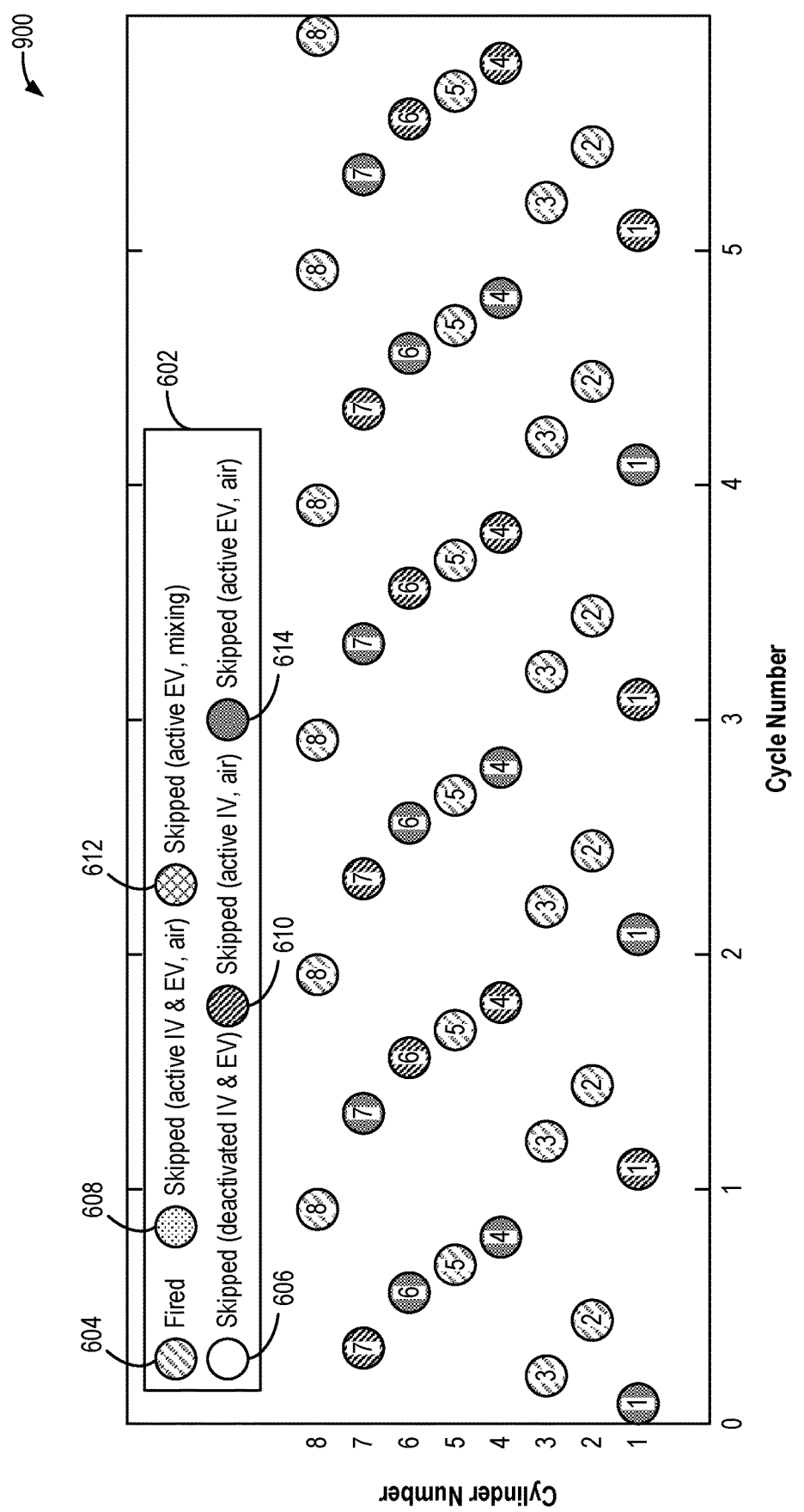
FIG. 9 shows a fourth example cylinder deactivation pattern, where secondary air is provided to an exhaust system after one cycle of crankcase bleeding.

Next, FIG. 9 shows a fourth cylinder deactivation pattern 900 having a firing density of ½. However, unlike the static cylinder deactivation patterns shown in FIGS. 6-8, fourth cylinder deactivation pattern 900 is a rolling cylinder deactivation pattern. In the example of fourth cylinder deactivation pattern 900, cylinders 2, 3, 5, and 8 are active every engine cycle, as in the static cylinder deactivation patterns shown in FIGS. 6-8, but the deactivated cylinders "roll" between different two different skipped states to provide thermactor air with crankcase bleeding. In the example shown, deactivated cylinders 1, 4, 6, and 7 alternate between a fourth skipped state, where the intake valve is active to induct air and the exhaust valve is deactivated to trap the air throughout the remainder of the engine cycle (e.g., second diagonal fill 610), and a fifth skipped state, where the exhaust valve is active to exhaust the trapped air and the intake valve is deactivated to prevent additional air induction throughout the engine cycle (e.g., second dot fill 614). Note that although the third skipped state (e.g., diamond fill 612) and the fifth skipped state (e.g., second dot fill 614) use the same or similar cylinder valve settings, the third skipped state and the fifth skipped state are distinguished from each other based on whether or not the deactivated cylinder is used to exhaust secondary air.

During a first engine cycle (e.g., occurring between cycle number 0 and cycle number 1), cylinders 1, 4, and 6 are operated in the fifth skipped state while cylinder 7 is operated in the fourth skipped state. As such, cylinder 7 inducts air, which is trapped for the remainder of the engine cycle due to the deactivated and fully closed exhaust valve of cylinder 7. While the air is trapped, a mass of the air decreases as a portion of the air bleeds to a crankcase of the engine. During a second engine cycle, (e.g., occurring between cycle number 1 and cycle number 2), cylinders 1, 4, and 6 are operated in the fourth skipped state to induct and trap air, while cylinder 7 is operated in the fifth skipped state to exhaust the reduced air mass. During a third engine cycle (e.g., occurring between cycle number 2 and cycle number 3), cylinders 1, 4, and 6 exhaust the air (e.g., after a portion bleeds to the crankcase during the second engine cycle), and cylinder 7 inducts and traps air. The pattern thus repeats while the engine continues to be operated in fourth cylinder deactivation pattern 900.

In this way, secondary air is exhausted after every two fires, similar to second cylinder deactivation pattern 700 of FIG. 7 and third cylinder deactivation pattern 800 of FIG. 8, but may have reduced mass due to the crankcase bleeding (e.g., one cycle trapping), such as described above with respect to 528 of FIG. 5A. Thus, the burned gas to secondary air ratio may be greater than 2 by decreasing the amount of secondary air exhausted relative to inducted.

Figure 10:
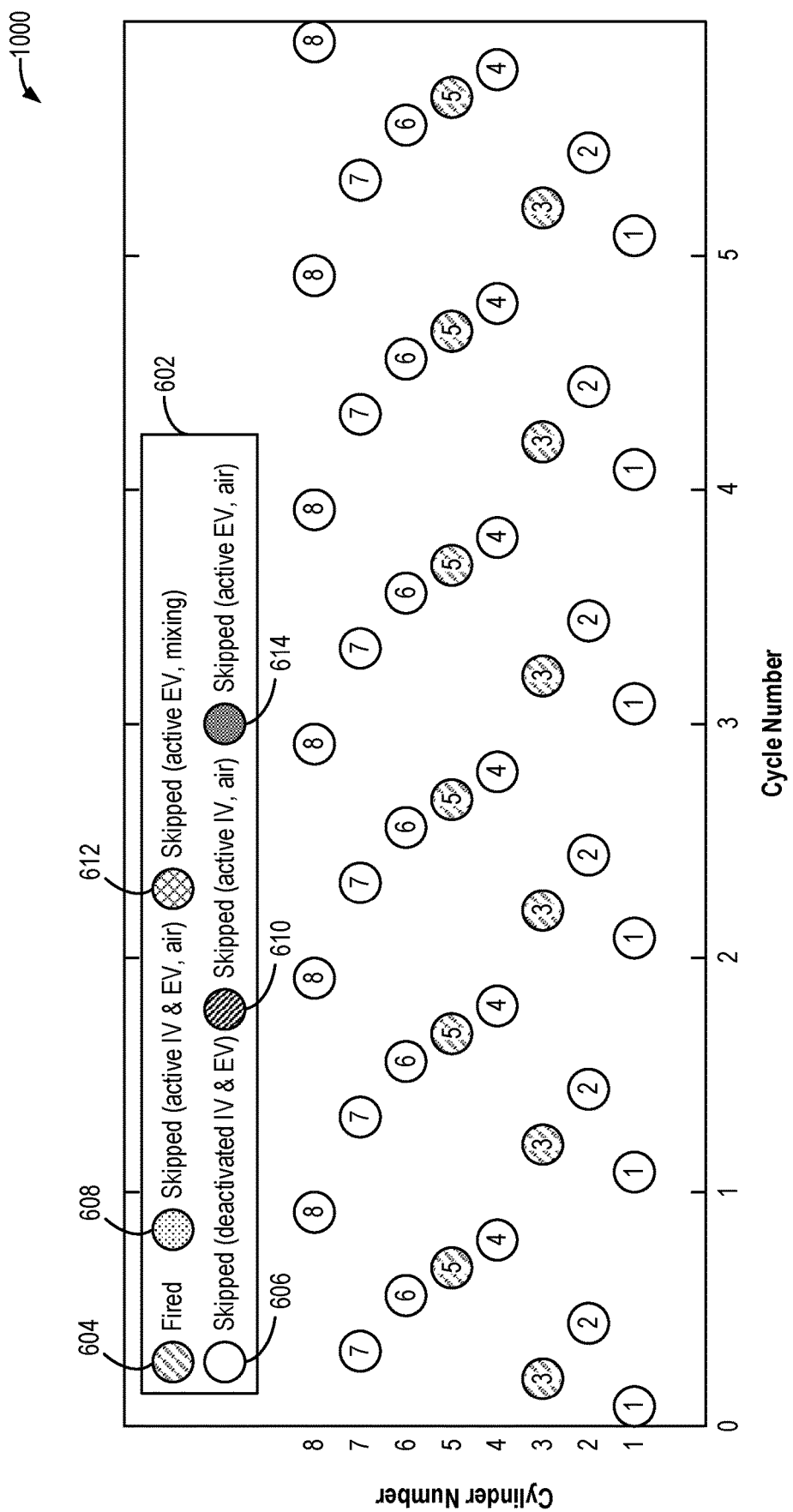
FIG. 10 shows a fifth example cylinder deactivation pattern, where secondary air is not provided to an exhaust system.

Turning next to FIG. 10, a fifth cylinder deactivation pattern 1000 is shown having a firing density of ¼. Fifth cylinder deactivation pattern 1000 is a static cylinder deactivation pattern, as the same cylinders are fired and skipped each engine cycle. In particular, cylinders 1, 2, 4, 6, 7, and 8 are deactivated every engine cycle and do not produce torque, and cylinders 3 and 5 are active every engine cycle and produce torque through combustion. Further, the deactivated cylinders are in the first skipped state and do not provide secondary air or mixing. As such, the engine is operated in the VDE mode via fifth cylinder deactivation pattern 1000 rather than the thermactor mode.

Figure 11:
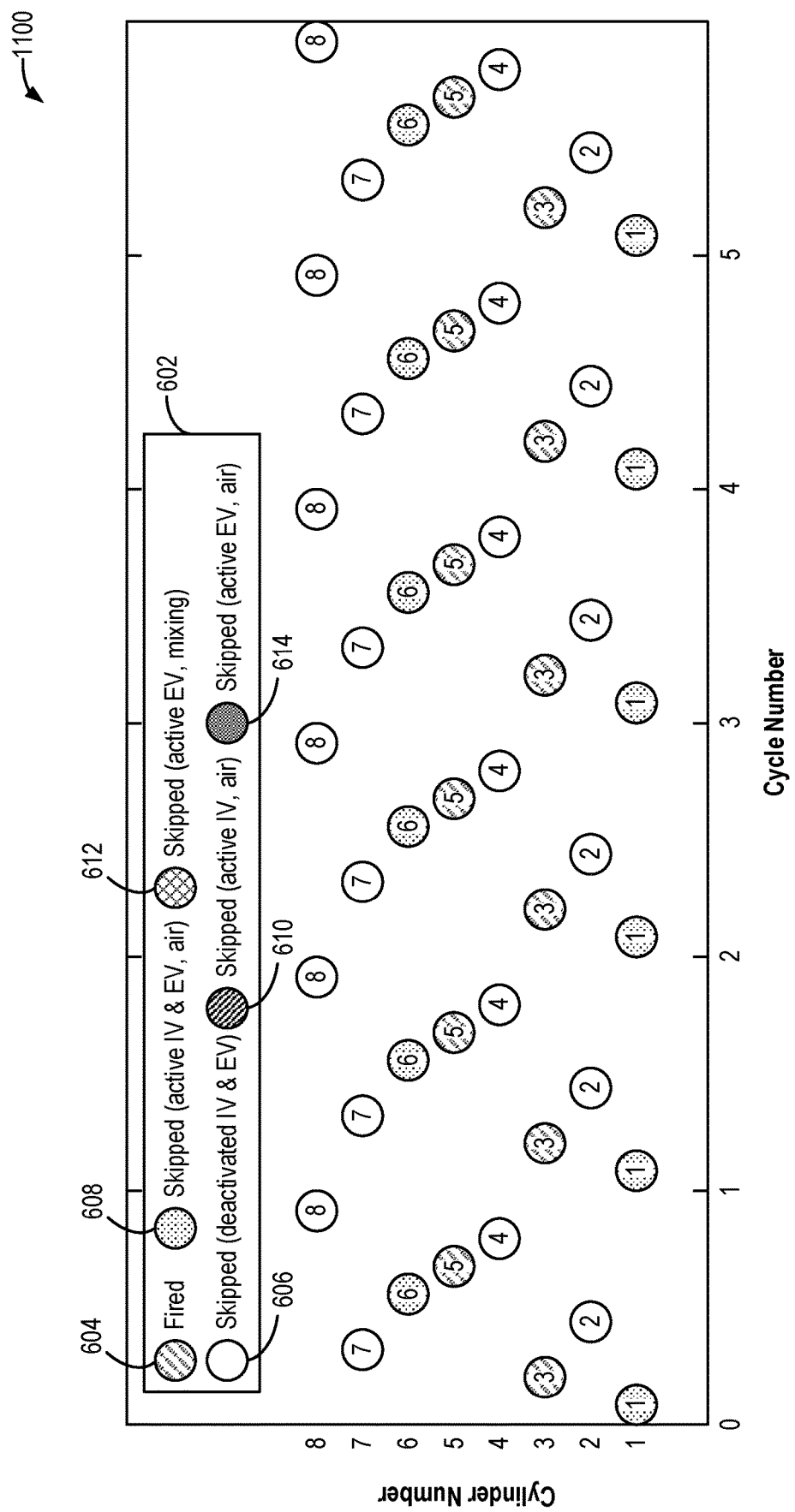
FIG. 11 shows a sixth example cylinder deactivation pattern, where secondary air is provided to an exhaust system.

Next, FIG. 11 shows a sixth cylinder deactivation pattern 1100 having a firing density of ¼, similar to fifth cylinder deactivation pattern 1000 shown in FIG. 10. Sixth cylinder deactivation pattern 1100 is a static cylinder deactivation pattern that includes cylinders 1, 2, 4, 6, 7, and 8 deactivated every engine cycle and cylinders 3 and 5 active every engine cycle. Similar to second cylinder deactivation pattern 700 of FIG. 7, the skipped cylinders in sixth cylinder deactivation pattern are divided between two different skipped states. Deactivated cylinders 2, 4, 7, and 8 are operated in the first skipped state (e.g., open fill 606), with fully deactivated intake and exhaust valves, while deactivated cylinders 1 and 6 are operated in the second skipped state, with active intake and exhaust valves each engine cycle (e.g., first dot fill 608). As such, cylinders 1 and 6 pump secondary air to the exhaust manifolds of the engine. Because two cylinders are active and two cylinders provide secondary air, the burned gas to secondary air ratio may be approximately 1. However, as described above with respect to FIGS. 5A and 5B, intake valve timing, duration, and/or lift adjustments of deactivated cylinders 1 and 6 relative to active cylinders 3 and 5 may vary the trapped mass in the skipped cylinders in the second skipped state relative to the fired cylinders, which may vary the burned gas to secondary air ratio.

Figure 12:
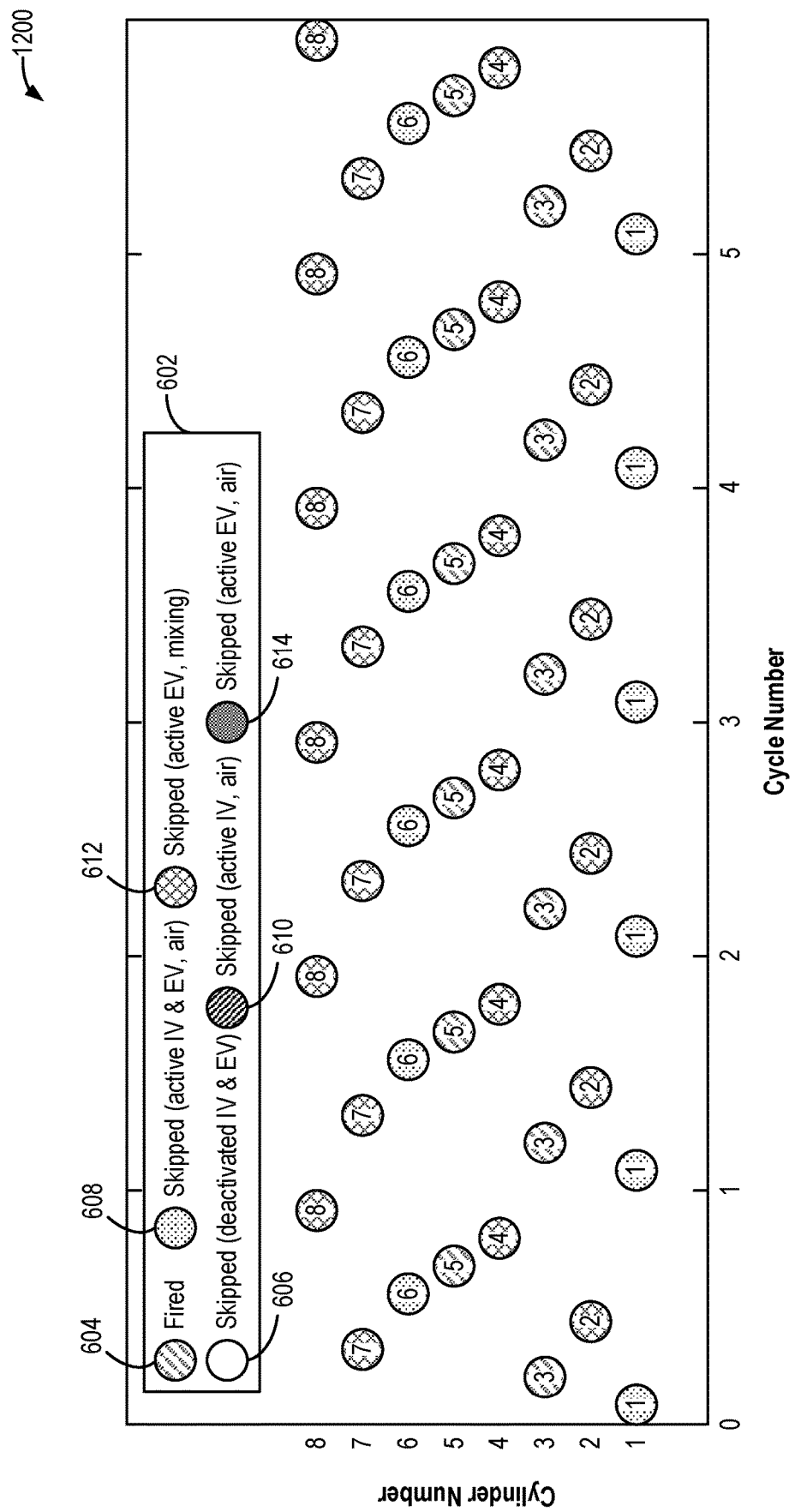
FIG. 12 shows a seventh example cylinder deactivation pattern, where secondary air is provided to an exhaust system with increased mixing.

FIG. 12 shows a seventh cylinder deactivation pattern 1200. Similar to fifth cylinder deactivation pattern 1000 shown in FIG. 10 and sixth cylinder deactivation pattern 1100 shown in FIG. 11, seventh cylinder deactivation pattern 1200 is a static cylinder deactivation pattern having a firing density of ¼, That is, cylinders 1, 2, 4, 6, 7, and 8 are deactivated every engine cycle and cylinders 3 and 5 are active every engine cycle. The deactivated cylinders in seventh cylinder deactivation pattern 1200 are divided between two different skipped states to provide secondary air and mixing, similar to third cylinder deactivation pattern 800 of FIG. 8.

Deactivated cylinders 2, 4, 7, and 8 are operated in the third skipped state (e.g., diamond fill 612), with fully deactivated intake valves and active exhaust valves, and do not produce secondary air but provide mixing, while deactivated cylinders 1 and 6 are operated in the second skipped state (e.g., first dot fill 608) to provide secondary air. In this way, cylinders 1 and 6 pump secondary air to the exhaust manifolds of the engine, and cylinders 2, 4, 7, and 8 draw in a mixture of secondary air (e.g., exhausted from cylinders 1 and 6) and burned gas (e.g., exhausted from cylinder 3 and 5) upon exhaust valve opening to increase mixing.

In an alternative example, if deactivating the intake valve of only cylinders 2 and 8 provides sufficient mixing, then cylinders 4 and 7 may be operated in the first skipped state (e.g., open fill 606), with both the intake valve and the exhaust valve fully deactivated, to reduce pumping losses.

Figure 13:
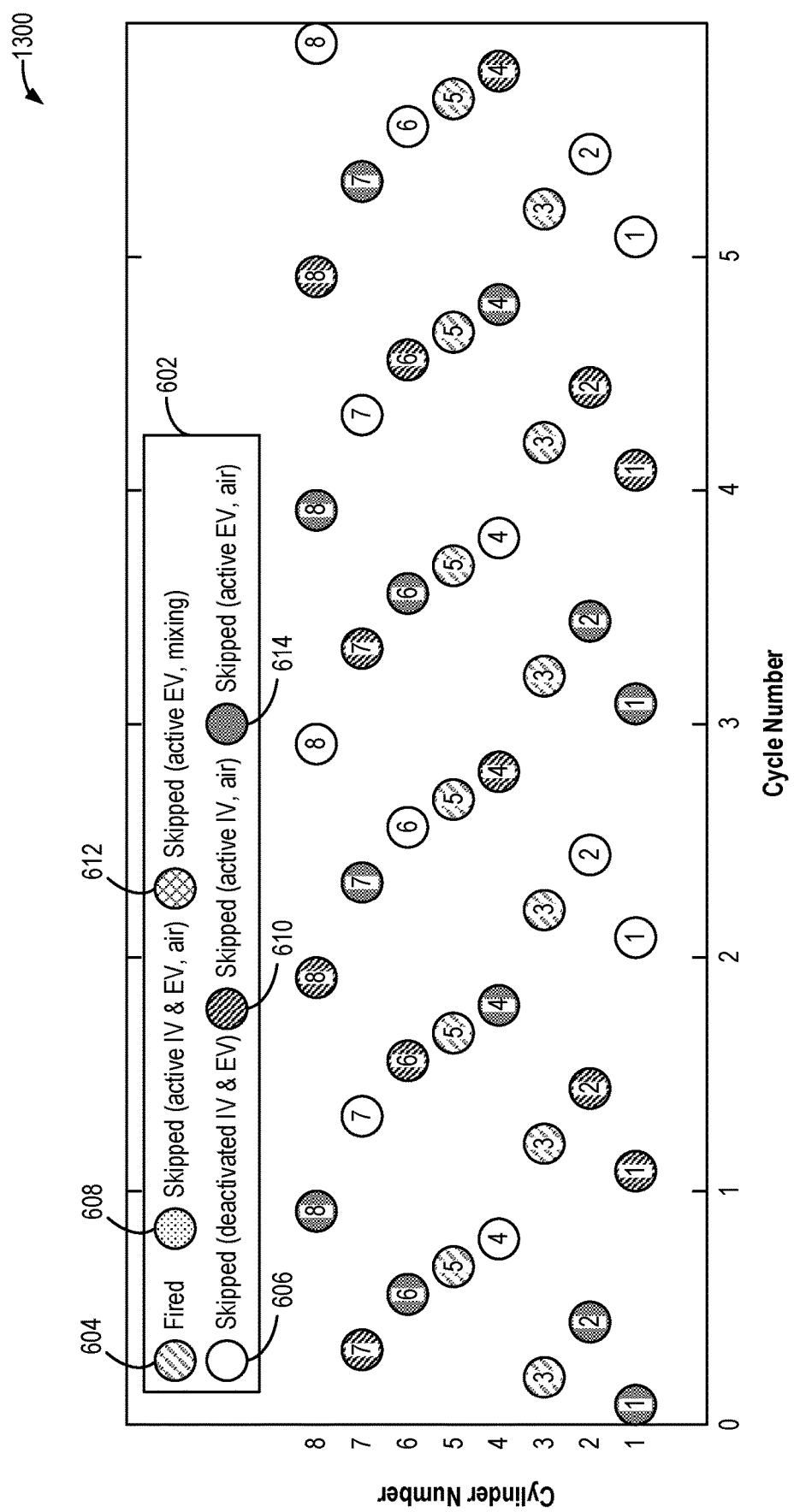
FIG. 13 shows an eighth example cylinder deactivation pattern, where secondary air is provided to an exhaust system after two cycles of crankcase bleeding.

Next, FIG. 13 shows an eighth cylinder deactivation pattern 1300, which has a firing density of ¼, However, unlike the static cylinder deactivation patterns shown in FIGS. 10-12, eighth cylinder deactivation pattern 1300 is a rolling cylinder deactivation pattern with crankcase bleeding, similar to fourth cylinder deactivation pattern 900 of FIG. 9. In the example of eighth cylinder deactivation pattern 1300, cylinders 3 and 5 are active every engine cycle, as in the static cylinder deactivation patterns shown in FIGS. 10-12, but the deactivated cylinders "roll" between three different skipped states to provide thermactor air with crankcase bleeding. As shown, deactivated cylinders 1, 2, 4, 6, 7, and 8 cycle between the first skipped state, where the intake valve and the exhaust valve are fully deactivated (e.g., open fill 606), the fourth skipped state, where the intake valve is active to induct air and the exhaust valve is deactivated to trap the air throughout the remainder of the engine cycle (e.g., second diagonal fill 610), and the fifth skipped state, where the exhaust valve is active to exhaust the trapped air and the intake valve is deactivated to prevent additional air induction throughout the engine cycle (e.g., second dot fill 614).

During a first engine cycle (e.g., occurring between cycle number 0 and cycle number 1), cylinder 4 is operated in the first skipped state, cylinders 1, 2, 6, and 8 are operated in the fifth skipped state, and cylinder 7 is operated in the fourth skipped state. As such, cylinder 7 inducts air, which is trapped for the remainder of the engine cycle due to the deactivated and fully closed exhaust valve of cylinder 7. While the air is trapped, a mass of the air decreases as it bleeds to a crankcase of the engine. During a second engine cycle, (e.g., occurring between cycle number 1 and cycle number 2), cylinder 7 is operated in the first skipped state, cylinder 4 is operated in the fifth skipped state, and cylinders 1, 2, 6, and 8 are operated in the fourth skipped state to induct and trap air. As such, the air inducted by cylinder 7 during the first engine cycle is trapped throughout the second engine cycle, further reducing its mass due to crankcase bleeding.

During a third engine cycle (e.g., occurring between cycle number 2 and cycle number 3), cylinders 1, 2, 6, and 8 are operated in the first skipped state so that the air inducted during the second engine cycle remains trapped throughout the third engine cycle. Cylinder 4 is operated in the fourth skipped state to induct and trap air, and cylinder 7 is operated in the fifth skipped state to finally exhaust the air trapped during the first engine cycle. Thus, a portion of air inducted by cylinder 7 bleeds to the crankcase during the first and second engine cycles before it is exhausted. The pattern thus repeats while the engine continues to be operated in eighth cylinder deactivation pattern 1300.

In this way, the first skipped state is used in between the fourth skipped state and the fifth skipped state for additional crankcase bleeding. As a result, the mass of secondary air trapped within each deactivated cylinder may be further reduced due to the crankcase bleeding over two engine cycles (e.g., two cycle trapping). Further, secondary air is exhausted between every fire of an active cylinder (e.g., between cylinder 3 firing and cylinder 5 firing) for favorable mixing.

Figure 14:
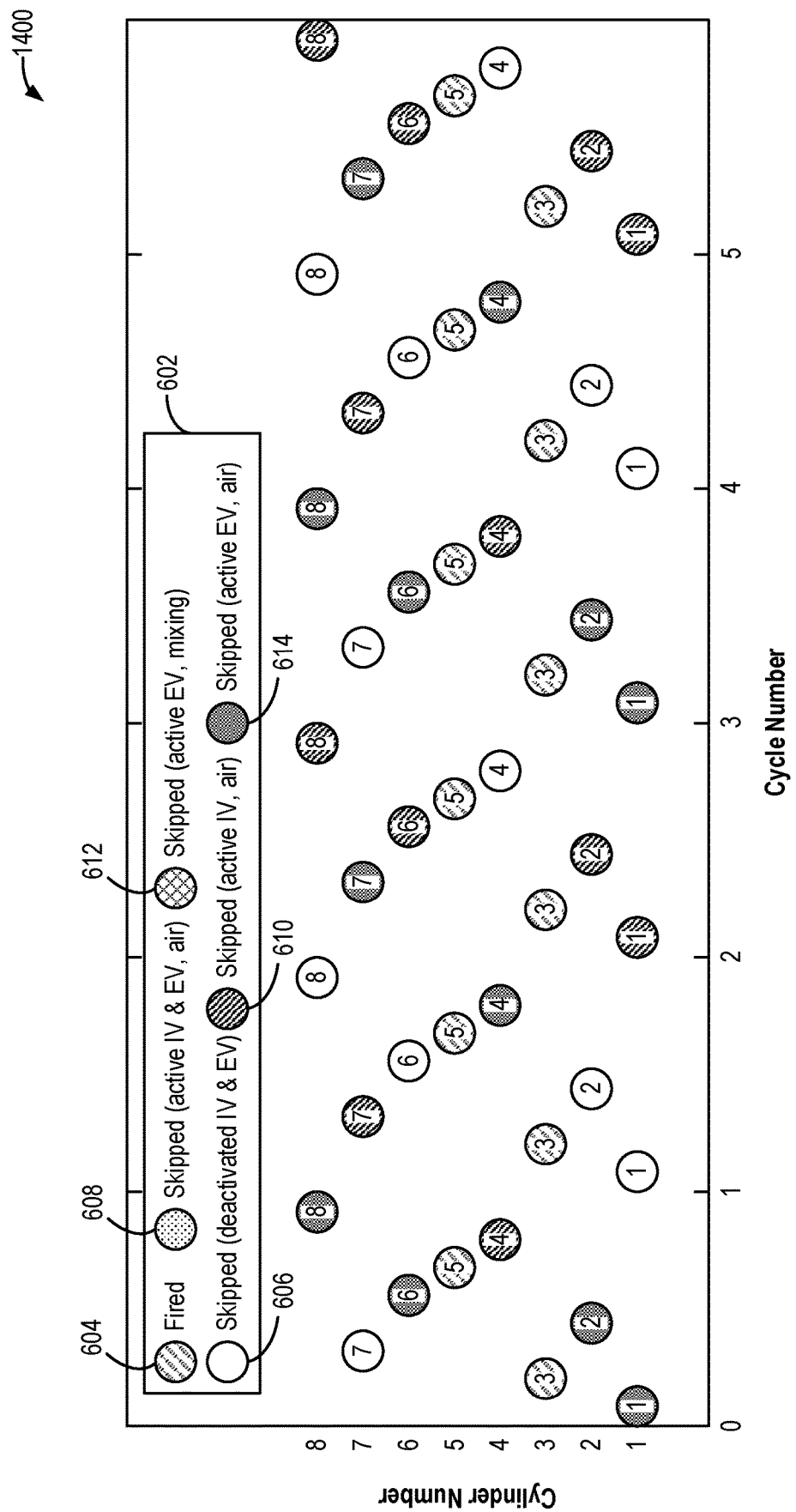
FIG. 14 shows a ninth example cylinder deactivation pattern, where secondary air is provided to an exhaust system after one cycle of crankcase bleeding.

FIG. 14 shows a ninth cylinder deactivation pattern 1400. Similar to eighth cylinder deactivation pattern 1300 of FIG. 13, ninth cylinder deactivation pattern 1400 is a rolling cylinder deactivation pattern with crankcase bleeding and has a firing density of ¼. In the example of ninth cylinder deactivation pattern 1400, cylinders 3 and 5 are active every engine cycle, as in the static cylinder deactivation patterns shown in FIGS. 10-12, but the deactivated cylinders "roll" between different three different skipped states to provide thermactor air with crankcase bleeding. Similar to eighth cylinder deactivation pattern 1300 of FIG. 13, deactivated cylinders 1, 2, 4, 6, 7, and 8 cycle between the first skipped state (e.g., open fill 606), where the intake valve and the exhaust valve are fully deactivated, the fourth skipped state (e.g., second diagonal fill 610), where the intake valve is active to induct air and the exhaust valve is deactivated to trap the air throughout the remainder of the engine cycle, and the fifth skipped state (e.g., second dot fill 614), where the exhaust valve is active to exhaust the trapped air and the intake valve is deactivated to prevent additional air induction throughout the engine cycle. However, the ordering of the different skipped states varies between eighth cylinder deactivation pattern 1300 of FIG. 13 and ninth cylinder deactivation pattern 1400 to vary the amount of crankcase bleeding that occurs. In particular, ninth cylinder deactivation pattern 1400 includes one-cycle trapping (versus the two-cycle trapping of eighth cylinder deactivation pattern 1300 of FIG. 13), as will be elaborated below.

During a first engine cycle (e.g., occurring between cycle number 0 and cycle number 1), cylinder 7 is operated in the first skipped state, cylinders 1, 2, 6, and 8 are operated in the fifth skipped state, and cylinder 4 is operated in the fourth skipped state. As such, cylinder 4 inducts air, which is trapped for the remainder of the engine cycle due to the deactivated and fully closed exhaust valve of cylinder 4. While the air is trapped, a mass of the air decreases as it bleeds to a crankcase of the engine. During a second engine cycle, (e.g., occurring between cycle number 1 and cycle number 2), cylinder 4 is operated in the fifth skipped state to exhaust the trapped air, cylinder 7 is operated in the fourth skipped state to induct air, and cylinders 1, 2, 6, and 8 are operated in the first skipped state to reduce pumping losses.

During a third engine cycle (e.g., occurring between cycle number 2 and cycle number 3), cylinders 1, 2, 6, and 8 are operated in the fourth skipped state to induct and trap air. Cylinder 4 is operated in the first skipped state to reduce pumping losses, and cylinder 7 is operated in the fifth skipped state to exhaust the air trapped during the second engine cycle. The pattern thus repeats while the engine continues to be operated in ninth cylinder deactivation pattern 1400.

In this way, crankcase bleeding may reduce the amount of air trapped in a given deactivated cylinder, but to a smaller degree than in eighth cylinder deactivation pattern 1300 of FIG. 13. Instead of using the first skipped state in between the fourth skipped state and the fifth skipped state for additional crankcase bleeding, the fifth skipped state occurs during the engine cycle immediately following the fourth skipped state, and the first skipped state occurs the engine cycle immediately following the fifth skipped state. As such, the first skipped state provides reduced pumping losses without affecting the trapped air mass, and secondary air is exhausted after every fire of an active cylinder (e.g., between cylinder 3 firing and cylinder 5 firing).

Figure 15:
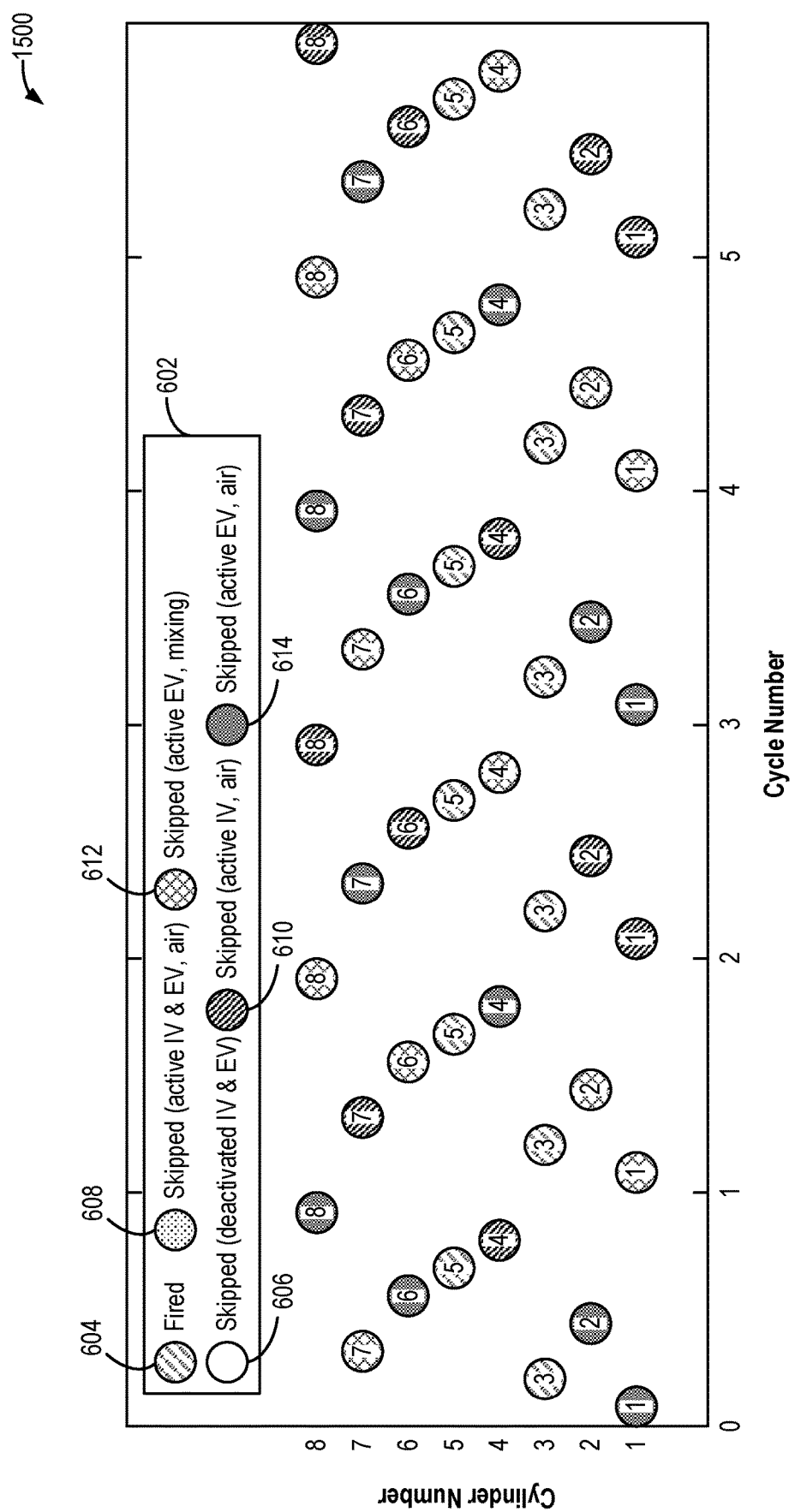
FIG. 15 shows a tenth example cylinder deactivation pattern, where secondary air is provided to an exhaust system after one cycle of crankcase bleeding and additional mixing.

Continuing to FIG. 15, a tenth cylinder deactivation pattern 1500 is shown. Similar to eighth cylinder deactivation pattern 1300 of FIG. 13 and ninth cylinder deactivation pattern 1400 of FIG. 14, tenth cylinder deactivation pattern 1500 is a rolling cylinder deactivation pattern with crankcase bleeding and has a firing density of ¼. However, tenth cylinder deactivation pattern 1500 includes increased mixing relative to eighth cylinder deactivation pattern 1300 of FIG. 13 and ninth cylinder deactivation pattern 1400 of FIG. 14. In the example shown in FIG. 15, cylinders 3 and 5 are active every engine cycle, as in the static cylinder deactivation patterns shown in FIGS. 10-12, but the deactivated cylinders "roll" between different three different skipped states to provide thermactor air with crankcase bleeding and mixing. In particular, deactivated cylinders 1, 2, 4, 6, 7, and 8 cycle between the third skipped state (e.g., diamond fill 612), where the exhaust valve is active for mixing and the intake valve is deactivated, the fourth skipped state (e.g., second diagonal fill 610), where the intake valve is active to induct air and the exhaust valve is deactivated to trap the air throughout the remainder of the engine cycle, and the fifth skipped state (e.g., second dot fill 614), where the exhaust valve is active to exhaust the trapped air and the intake valve is deactivated to prevent additional air induction throughout the engine cycle. Further, tenth cylinder deactivation pattern 1500 includes one-cycle trapping, as will be elaborated below.

During a first engine cycle (e.g., occurring between cycle number 0 and cycle number 1), cylinder 7 is operated in the third skipped state, cylinders 1, 2, 6, and 8 are operated in the fifth skipped state, and cylinder 4 is operated in the fourth skipped state. As such, cylinder 4 inducts air, which is trapped for the remainder of the engine cycle due to the deactivated and fully closed exhaust valve of cylinder 4. While the air is trapped, a mass of the air decreases as it bleeds to a crankcase of the engine. During a second engine cycle, (e.g., occurring between cycle number 1 and cycle number 2), cylinder 4 is operated in the fifth skipped state to exhaust the trapped air, cylinder 7 is operated in the fourth skipped state to induct air, and cylinders 1, 2, 6, and 8 are operated in the third skipped state. Upon exhaust valve opening of each of cylinders 1, 2, 6, and 8, a mixture of the secondary air (e.g., exhausted from cylinders 1, 2, 6, and 8 during the first engine cycle and cylinder 4 in the second engine cycle) and the burned gas (e.g., exhausted from cylinders 3 and 5 each engine cycle) is pulled into the corresponding cylinder before being forced out again as a piston rises in the corresponding cylinder. As a result of the backflow and forward flow, mixing of the secondary air and burned gas is increased.

During a third engine cycle (e.g., occurring between cycle number 2 and cycle number 3), cylinders 1, 2, 6, and 8 are operated in the fourth skipped state to induct and trap air. Cylinder 4 is operated in the third skipped state to provide mixing, and cylinder 7 is operated in the fifth skipped state to exhaust the air trapped during the second engine cycle. The pattern thus repeats while the engine continues to be operated in tenth cylinder deactivation pattern 1500.

In this way, crankcase bleeding may reduce the amount of air trapped in a given deactivated cylinder, but to a smaller degree than in eighth cylinder deactivation pattern 1300 of FIG. 13. Instead of using the first skipped immediately following the fifth skipped state, as in ninth cylinder deactivation pattern 1400 of FIG. 14, by using the third skipped state in the engine cycle immediately following the fifth skipped state and immediately before the fourth skipped state, mixing is increased without affecting the trapped air mass or a frequency of providing secondary air to the exhaust manifold.

Figure 16:
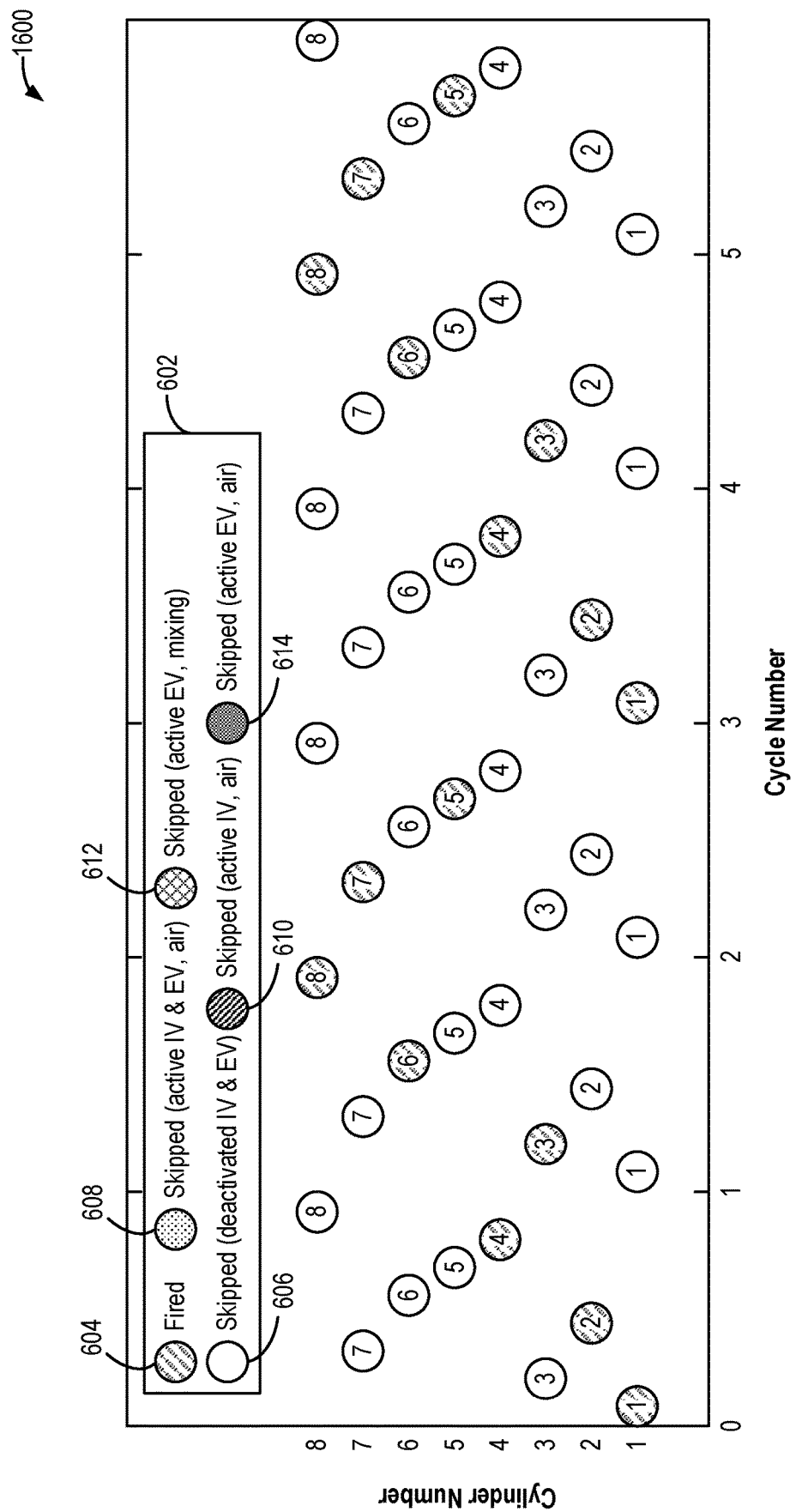
FIG. 16 shows an eleventh example cylinder deactivation pattern, where secondary air is not provided to an exhaust system.

Turning next to FIG. 16, an eleventh cylinder deactivation pattern 1600 is shown having a firing density of ⅓. Eleventh cylinder deactivation pattern 1600 is a rolling cylinder deactivation pattern, as different cylinders are fired and skipped each engine cycle. In particular, each cylinder is skipped for two consecutive engine cycles after being fired once. Further, the deactivated cylinders are in the first skipped state and do not provide secondary air or mixing. As such, the engine is operated in the VDE mode rather than the thermactor mode.

For example, cylinders 1, 2, and 4 are active (e.g., first diagonal fill 604) during a first engine cycle (e.g., occurring between cycle number 0 and cycle number 1) and deactivated in the first skipped state (e.g., open fill 606) during a second engine cycle (e.g., occurring between cycle number 1 and cycle number 2) and during a third engine cycle (e.g., occurring between cycle number 2 and cycle number 3) before being fired again during a fourth engine cycle (e.g., occurring between cycle number 3 and cycle number 4). Cylinders 3, 6, and 8 are deactivated in the first skipped state during the first engine cycle, fried during the second engine cycle, and deactivated in the first skipped state during both the third engine cycle and the fourth engine cycle. Cylinders 5 and 7 are deactivated in the first skipped state during the first and second engine cycles and fired during the third engine cycle before being deactivated again (e.g., in the first skipped state) during the fourth engine cycle. As such, there are three torque-producing combustion events during each of two engine cycles followed by one engine cycle that includes two combustion events. The pattern may thus repeat while the engine continues operating in eleventh cylinder deactivation pattern 1600.

Figure 17:
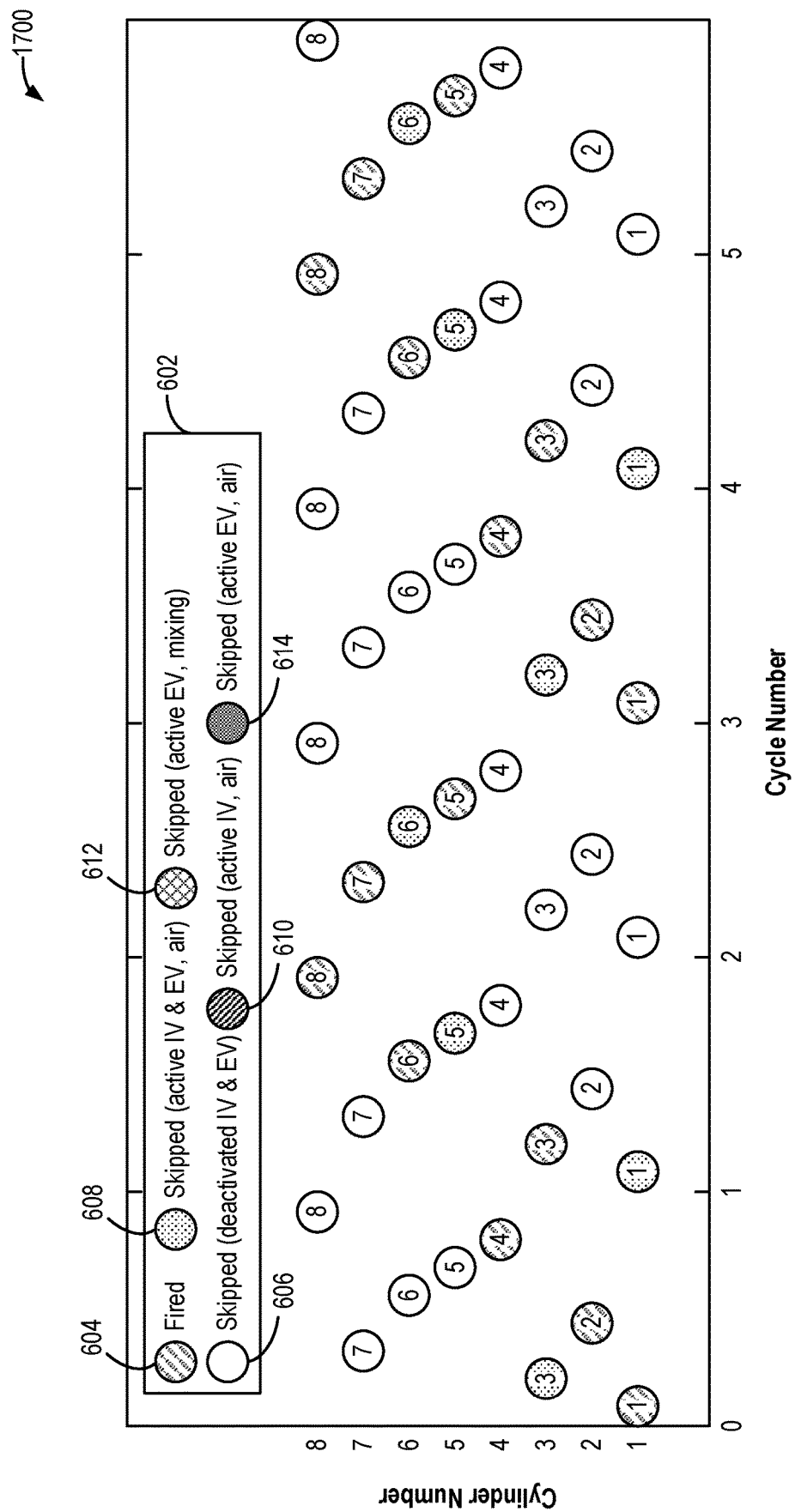
FIG. 17 shows a twelfth example cylinder deactivation pattern, where secondary air is provided to an exhaust system.

Next, FIG. 17 shows a twelfth cylinder deactivation pattern 1700. Twelfth cylinder deactivation pattern 1700 has a firing density of ⅓, similar to eleventh cylinder deactivation pattern 1600 shown in FIG. 16. Twelfth cylinder deactivation pattern 1700 is a rolling cylinder deactivation pattern where the cylinder state changes every engine cycle or every number of engine cycles. Further, during a given engine cycle, only a portion (e.g., subset) of the deactivated cylinders are used to provide secondary air, while the remaining deactivated cylinders are in the first skipped state (e.g., open fill 606) with fully deactivated intake and exhaust valves for decreased pumping losses. Thus, both fires and skipped states follow a rolling pattern.

In the example shown in FIG. 17, cylinders 1, 2, and 4 are active during a first engine cycle (e.g., occurring between cycle number 0 and cycle number 1), while cylinder 3 is operated in the second skipped state (e.g., first dot fill 608) to provide secondary air. Further, cylinders 5, 6, 7, and 8 are deactivated in the first skipped state to reduce pumping losses without influencing the burned gas to secondary air ratio or mixing. Thus, only cylinder 3 provides secondary air during the first engine cycle, which mixes with burned gas exhausted from cylinders 1, 2, and 4. Because cylinder 3 is on a same engine bank (e.g., the first engine bank) as cylinders 1, 2, and 4, mixing of the secondary air and burned gas may be increased.

During a second engine cycle (e.g., occurring between cycle number 1 and cycle number 2), cylinders 3, 6, and 8 are active, cylinders 1 and 5 are deactivated in the second skipped state to provide secondary air, and cylinders 2, 4, and 7 are deactivated in the first skipped state to decrease pumping losses. Thus, both cylinders 1 and 5 provide secondary air during the second engine cycle, which mixes with burned gas exhausted from cylinders 3, 6, and 8. In particular, the secondary air from cylinder 1 may initially mix with the burned gas from cylinder 3, as both are on the first engine bank, and the secondary air from cylinder 5 may initially mix with the burned gas from cylinders 6 and 8 due to their positioning on the second engine bank. Further, the secondary air from cylinder 1 may also initially mix with the burned gas from cylinder 4 from the preceding engine cycle (e.g., the first engine cycle). During a third engine cycle (e.g., occurring between cycle number 2 and cycle number 3), cylinders 5 and 7 are active while cylinder 6 is operated in the second skipped state to provide secondary air. Further, cylinders 1, 2, 3, 4, and 8 are deactivated in the first skipped state to reduce pumping losses without influencing the burned gas to secondary air ratio or mixing. Thus, only cylinder 6 provides secondary air during the third engine cycle, which mixes with burned gas exhausted from cylinders 5 and 7. Because cylinder 6 is on the second engine bank with cylinders 5 and 7, mixing of the secondary air and burned gas may be increased. The pattern may thus be repeated while the engine continues to be operated in twelfth cylinder deactivation pattern 1700.

As may be seen in FIG. 17, a first portion of the cylinders switch states every engine cycle, while a second, remaining portion of the cylinders change states less frequently. For example, cylinders 1, 3, 5, and 6 each cycle between the first skipped state, the second skipped state, and the active state (in varying order), whereas cylinders 2, 4, 7, and 8 are each maintained in the first skipped state for two consecutive engine cycles followed by one engine cycle in the active state. As such, only cylinders 1, 3, 5, and 6 produce secondary air in twelfth cylinder deactivation pattern 1700 (e.g., during half of their skips), while each of the cylinders is used to produce torque after two consecutive cycles of deactivation. It may be noted that on each engine bank, a firing cylinder is either followed or preceded with a skipped cylinder in the second skipped state. For example, during the first engine cycle, active cylinder 1 is followed by skipped (e.g., second skipped state) cylinder 3, which precedes active cylinder 2. Further, active cylinder 4 during the first engine cycle is followed by skipped (e.g., second skipped state) cylinder 1 during the second engine cycle, which precedes active cylinder 3 during the second engine cycle.

Figure 18:
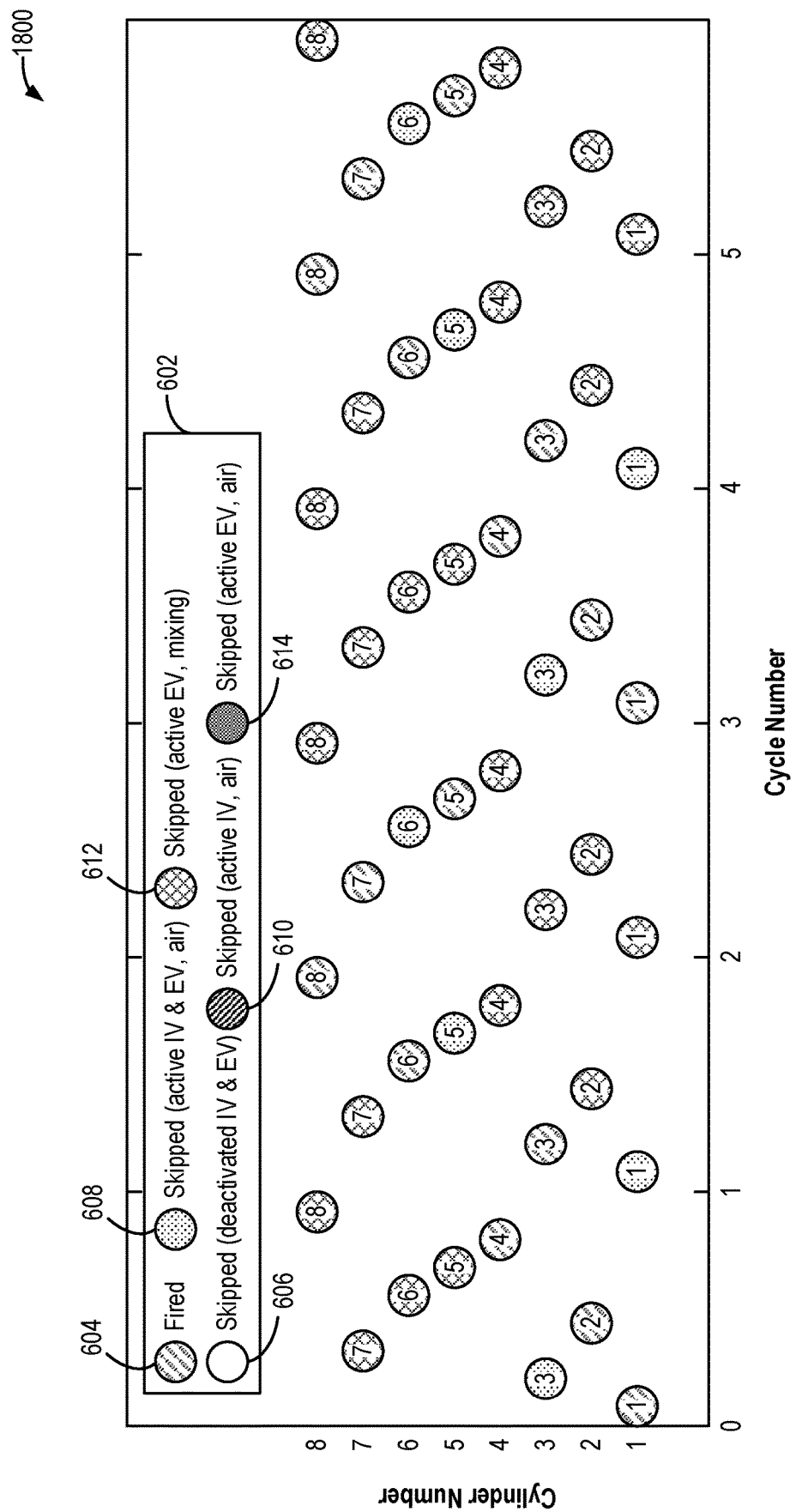
FIG. 18 shows a thirteenth example cylinder deactivation pattern, where secondary air is provided to an exhaust system with increased mixing.

FIG. 18 shows a thirteenth cylinder deactivation pattern 1800, which has a firing density of ⅓. Thirteenth cylinder deactivation pattern 1800 is similar to twelfth cylinder deactivation pattern 1700 of FIG. 17 in that thirteenth cylinder deactivation pattern 1800 is a rolling cylinder deactivation pattern where the cylinder state changes every engine cycle or every number of engine cycles. However, thirteenth cylinder deactivation pattern 1800 differs from twelfth cylinder deactivation pattern 1700 in that the deactivated cylinders not used to provide secondary air are operated in the third skipped state (e.g., diamond fill 612) for mixing.

In the example shown in FIG. 18, cylinders 1, 2, and 4 are active during a first engine cycle (e.g., occurring between cycle number 0 and cycle number 1), while cylinder 3 is operated in the second skipped state (e.g., first dot fill 608) to provide secondary air. Further, cylinders 5, 6, 7, and 8 are operated in the third skipped state to draw in burned gas and secondary air upon exhaust valve opening, thereby increasing mixing. Thus, only cylinder 3 provides secondary air during the first engine cycle, which mixes with burned gas exhausted from cylinders 1, 2, and 4.

During a second engine cycle (e.g., occurring between cycle number 1 and cycle number 2), cylinders 3, 6, and 8 are active, cylinders 1 and 5 are deactivated in the second skipped state to provide secondary air, and cylinders 2, 4, and 7 are deactivated in the third skipped state to increase mixing. Thus, both cylinders 1 and 5 provide secondary air during the second engine cycle, with mixes with burned gas exhausted from cylinders 3, 6, and 8. In particular, the secondary air from cylinder 1 and the burned gas from cylinder 3 may be drawn into cylinders 2 and 4 upon exhaust valve opening, as all are on the first engine bank, and the secondary air from cylinder 5 and the burned gas from cylinders 6 and 8 may be drawn into cylinder 7 because they are on the second engine bank.

During a third engine cycle (e.g., occurring between cycle number 2 and cycle number 3), cylinders 5 and 7 are active while cylinder 6 is operated in the second skipped state to provide secondary air. Further, cylinders 1, 2, 3, 4, and 8 are deactivated in the third skipped state to provide mixing. Thus, only cylinder 6 provides secondary air during the third engine cycle, which mixes with burned gas exhausted from cylinders 5 and 7. Because cylinders 5, 6, 7, and 8 are all on the second engine bank, mixing of the secondary air and burned gas may be increased. The pattern may thus repeat while the engine continues to be operated in thirteenth cylinder deactivation pattern 1800.

Similar to twelfth cylinder deactivation pattern 1700 of FIG. 17, a first portion of the cylinders switch states every engine cycle, while a second, remaining portion of the cylinders change states less frequently. For example, cylinders 1, 3, 5, and 6 each cycle between the second skipped state, the third skipped state, and the active state (in varying order), whereas cylinders 2, 4, 7, and 8 are each maintained in the second skipped state for two consecutive engine cycles followed by one engine cycle in the active state. As such, only cylinders 1, 3, 5, and 6 produce secondary air in thirteenth cylinder deactivation pattern 1800, while each of the cylinders is used to produce torque after two consecutive cycles of deactivation.

Further, in some examples, an exhaust valve timing may be adjusted between firing and mixing if an exhaust valve actuation system, such as a VCT system, is not fast enough to vary the timing from event to event. For example, the exhaust valve timing of the cylinders on the first engine bank may be adjusted in a first direction (e.g., to be less retarded from BDC) during the second engine cycle after cylinder 3 is fired and then adjusted in a second direction (e.g., opposite the first direction, to be more retarded from BDC) at the end of the third engine cycle, before cylinder 1 is fired. The exhaust valve timing of the cylinders on the second engine bank may undergo similar adjustments. For example, the exhaust valve timing may be adjusted in the second direction during the second engine cycle, before cylinder 6 is fired, and then in the first direction during the third engine cycle, after cylinder 5 is fired. In this way, the fired cylinders may exhaust a larger blowdown pulse due to the more retarded exhaust valve opening timing, and the deactivated cylinders in the third skipped state may have increased vacuum due to the less retarded exhaust valve opening timing. As a result, mixing may be increased.

In an alternative example, if operating a first number of the cylinders in the third skipped state provides sufficient mixing, then a remaining number of the skipped cylinders that are not providing secondary air may be operated in the first skipped state (e.g., open fill 606), with both the intake valve and the exhaust valve fully deactivated, to reduce pumping losses.

Figure 19:
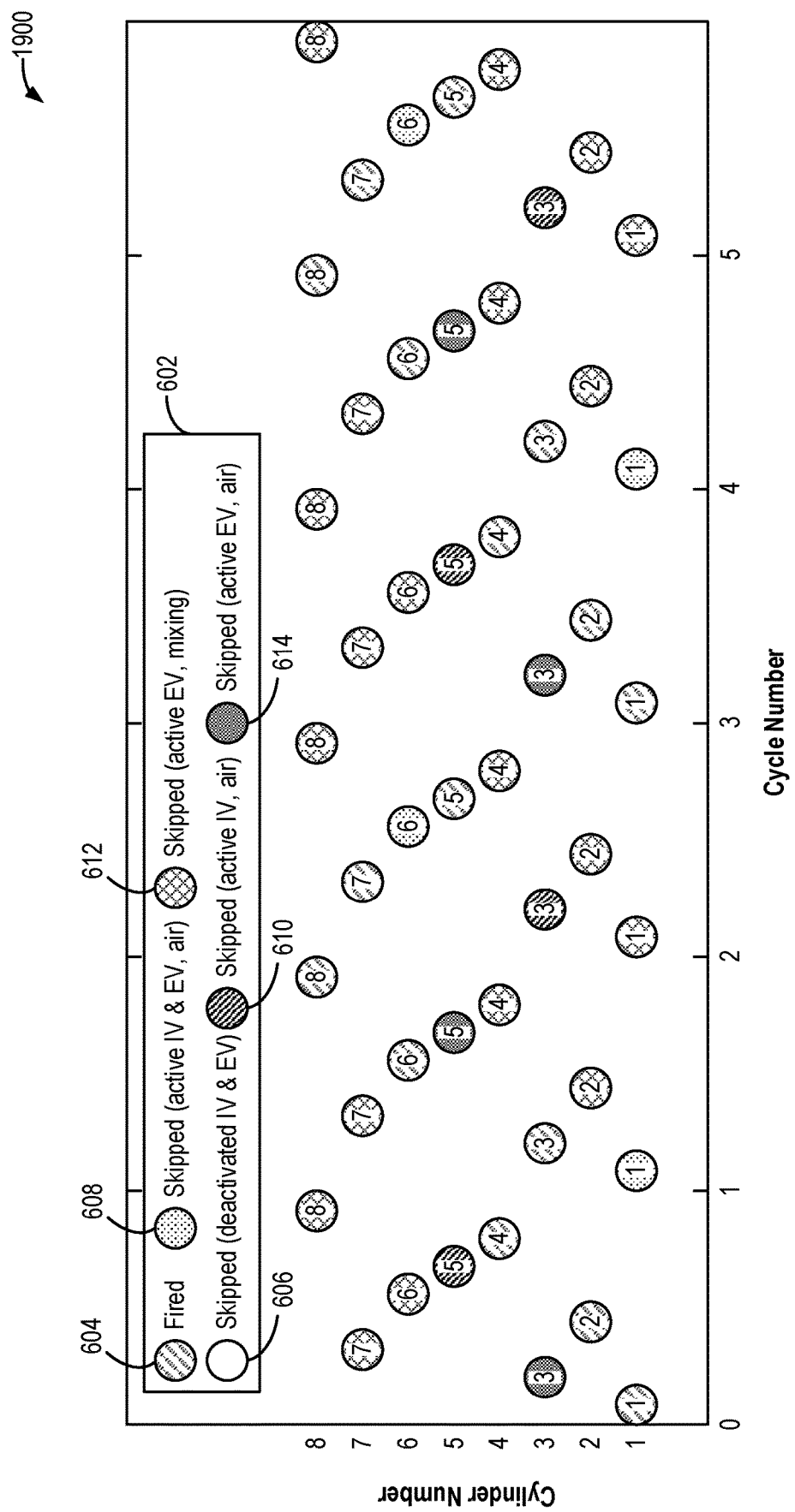
FIG. 19 shows a fourteenth example cylinder deactivation pattern, where secondary air is provided to an exhaust system using a plurality of different rolling patterns for different cylinders.

Next, FIG. 19 shows a fourteenth cylinder deactivation pattern 1900 is having a firing density of ⅓. Fourteenth cylinder deactivation pattern 1900 is similar to thirteenth cylinder deactivation pattern 1800 of FIG. 18 and to twelfth cylinder deactivation pattern 1700 of FIG. 17 in that fourteenth cylinder deactivation pattern 1900 is a rolling cylinder deactivation pattern where the cylinder state changes every engine cycle or every number of engine cycles. However, fourteenth cylinder deactivation pattern 1900 differs from thirteenth cylinder deactivation pattern 1800 and twelfth cylinder deactivation pattern 1700 in that crankcase bleeding is used in a portion of the cylinders providing secondary air in order to reduce an overall mass of the provided secondary air.

In the example shown in FIG. 19, cylinders 1, 2, and 4 are active during a first engine cycle (e.g., occurring between cycle number 0 and cycle number 1), while cylinder 3 is operated in the fifth skipped state (e.g., second dot fill 614) to exhaust secondary air trapped during a previous engine cycle. Because the secondary air has been trapped for an engine cycle, the mass of the secondary air is reduced due to crankcase bleeding. Further, cylinders 6, 7, and 8 are operated in the third skipped state (e.g., diamond fill 612) to draw in burned gas and secondary air upon exhaust valve opening, while cylinder 5 is operated in the fourth skipped state (e.g., second diagonal fill 610) to induct and trap an air charge. Thus, while cylinders 3, 6, 7, and 8 are all skipped cylinders with active exhaust valves and deactivated intake valves, only cylinder 3 is used to provide secondary air during the first engine cycle.

During a second engine cycle (e.g., occurring between cycle number 1 and cycle number 2), cylinders 3, 6, and 8 are active, cylinder 1 is deactivated in the second skipped state to provide secondary air without crankcase bleeding (e.g., first dot fill 608), cylinder 5 is operated in the fifth skipped state to exhaust secondary air inducted and trapped during the first engine cycle, and cylinders 2, 4, and 7 are deactivated in the third skipped state to increase mixing. Thus, both cylinders 1 and 5 provide secondary air during the second engine cycle, which mixes with burned gas exhausted from cylinders 3, 6, and 8. However, the mass of secondary air exhausted from cylinder 5 may be less than that exhausted from cylinder 1 because the secondary air is trapped within cylinder 5 for a cycle, versus the same cycle induction and exhausting of cylinder 1.

During a third engine cycle (e.g., occurring between cycle number 2 and cycle number 3), cylinders 5 and 7 are active while cylinder 6 is operated in the second skipped state to provide secondary air. Further, cylinder 3 is operated in the fourth skipped state to induct and trap secondary air, while cylinders 1, 2, 4, and 8 are deactivated in the third skipped state to provide mixing. Thus, only cylinder 6 provides secondary air during the third engine cycle, which mixes with burned gas exhausted from cylinders 5 and 7. Because cylinders 5, 6, 7, and 8 are all on the second engine bank, mixing of the secondary air and burned gas may be increased. The pattern may thus be repeated while the engine continues to be operated in fourteenth cylinder deactivation pattern 1900.

In this way, a plurality of different rolling patterns are combined in fourteenth cylinder deactivation pattern 1900. For example, cylinders, 2, 4, 7 and 8 each follow a first pattern that includes one active engine cycle followed by two consecutive engine cycles in the third skipped state for mixing. However, the pattern is offset between the cylinders so that cylinder 8 is fired the engine cycle after cylinders 2 and 4 are fired, and cylinder 7 is fired the engine cycle following cylinder 8. As another example, cylinders 1 and 6 each follow a second pattern that includes one active engine cycle followed by a deactivated cycle in the second skipped state, which is further followed by a deactivated cycle in the third skipped state. As with cylinders 4 and 8, the pattern is offset so that cylinder 6 fires the engine cycle after cylinder 1 is fired. As still another example, cylinders 3 and 5 each follow a third pattern that includes one active engine cycle followed by a deactivated cycle in the fourth skipped state, which is further followed by a deactivated cycle in the fifth skipped state. Further, the patterns of cylinders 3 and 5 are offset such that cylinder 5 fires the engine cycle after cylinder 3 is fired. As such, the second pattern and the third pattern both include providing secondary air one out of three engine cycles, although the second pattern may provide a greater secondary air mass than the third pattern due to the effect of crankcase bleeding in the third pattern.

Figure 20:
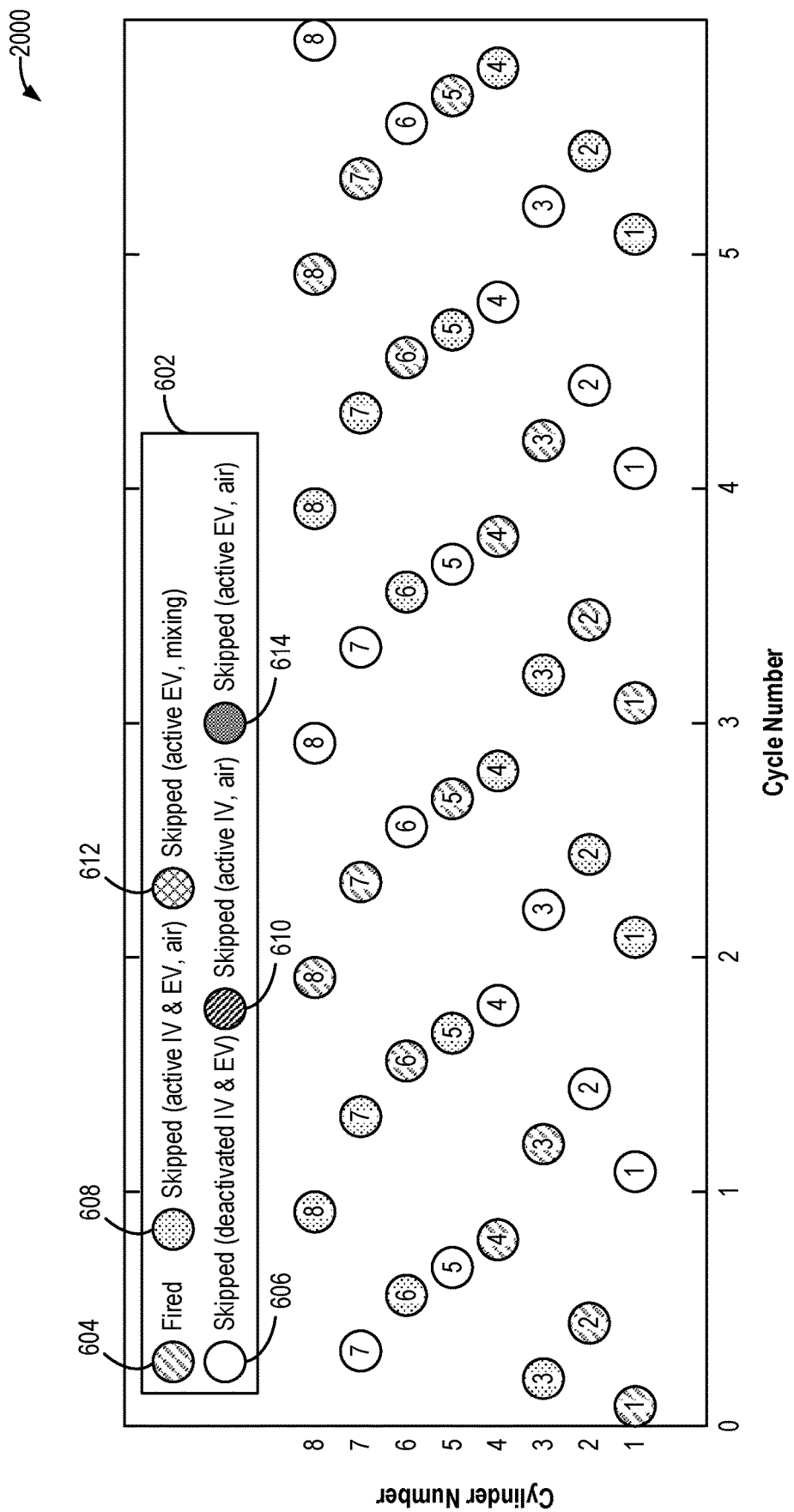
FIG. 20 shows a fifteenth example cylinder deactivation pattern, where secondary air is provided to an exhaust system using a same rolling pattern for each cylinder.

However, in some examples, it may be favorable to instead operate all of the cylinders in the same rolling pattern. Thus, FIG. 20 shows a fifteenth cylinder deactivation pattern 2000 having a firing density of ⅓. Fifteenth cylinder deactivation pattern 2000 is a rolling cylinder deactivation pattern where the cylinder state changes every engine cycle and in the same order for each cylinder, with different cylinders starting at different states within the pattern in order to stagger burned gas and secondary air production. That is, each cylinder has one active engine cycle (e.g., first diagonal fill 604) immediately followed by a deactivated cycle in the first skipped state (e.g., open fill 606), which is immediately followed by a deactivated cycle in the second skipped state (e.g., first dot fill 608).

In the example shown in FIG. 20, cylinders 1, 2, and 4 are active during a first engine cycle (e.g., occurring between cycle number 0 and cycle number 1). Cylinders 5 and 7 are deactivated in the first skipped state, with fully deactivated intake and exhaust valves, to reduce pumping losses without providing secondary air. Cylinders 3, 6, and 8 are operated in the second skipped state to provide secondary air without crankcase bleeding. During a second engine cycle (e.g., occurring between cycle number 1 and cycle number 2), cylinders 3, 6, and 8 are active and produce torque, while cylinders 1, 2, 4 are switched to being fully deactivated in the first skipped state. Cylinders 5 and 7, which were in the first skipped state during the first engine cycle, are switched to the second skipped state to provide secondary air. In a third engine cycle (e.g., occurring between cycle number 2 and cycle number 3), cylinders 1, 2, and 4 provide secondary air in the second skipped state, cylinders 5 and 7 produce torque in the active state, and cylinders 3, 6, and 8 reduce pumping losses in the first skipped state. The pattern may thus be repeated while the engine continues to operate in the fifteenth cylinder deactivation pattern 2000.

In this way, mixing within an exhaust port of each cylinder, rather than the exhaust manifold, may be increased, as the firing event of each individual cylinder is immediately preceded by a secondary air production event. Thus, exhausted secondary air that remains in the exhaust runner may mix with burned gas exhausted the subsequent engine cycle.

Still other patterns are possible that use the same rolling pattern for each cylinder. For example, FIG. 21 shows a sixteenth cylinder deactivation pattern 2100. Similar to fifteenth cylinder deactivation pattern 2000 of FIG. 20, sixteenth cylinder deactivation pattern 2100 is a rolling cylinder deactivation pattern where the cylinder state changes every engine cycle and in the same order for each engine cycle and has a firing density of ⅓. However, instead of the first skipped state, the third skipped state (e.g., diamond fill 612) is included for further increased mixing. In the example shown, each cylinder has one active engine cycle (e.g., first diagonal fill 604) immediately followed by a deactivated cycle in the third skipped state, which is immediately followed by a deactivated cycle in the second skipped state (e.g., first dot fill 608) to provide secondary air.

In the example shown in FIG. 21, cylinders 1, 2, and 4 are active during a first engine cycle (e.g., occurring between cycle number 0 and cycle number 1). Cylinders 5 and 7 are deactivated in the third skipped state, with fully deactivated intake valves and active exhaust valves, to provide mixing without providing secondary air. Further, cylinders 3, 6, and 8 are operated in the second skipped state to provide secondary air without crankcase bleeding. During a second engine cycle (e.g., occurring between cycle number 1 and cycle number 2), cylinders 3, 6, and 8 are active and produce torque, while cylinders 1, 2, 4 are switched to the third skipped state to provide mixing. Cylinders 5 and 7, which were in the third skipped state during the first engine cycle, are switched to the second skipped state to provide secondary air. In a third engine cycle (e.g., occurring between cycle number 2 and cycle number 3), cylinders 1, 2, and 4 provide secondary air in the second skipped state, cylinders 5 and 7 produce torque in the active state, and cylinders 3, 6, and 8 increasing mixing in the third skipped state. The cylinder deactivation pattern may thus be repeated while the engine continues to operate in sixteenth cylinder deactivation pattern 2100.

In this way, mixing within an exhaust port of each cylinder may be further increased due to the vacuum that occurs upon exhaust valve opening while the cylinder is deactivated in the third skipped state. As a result of the mixing, an amount of time before a catalyst reaches its light-off temperature may be reduced.

Note that FIGS. 6-21 provide example cylinder deactivation patterns utilizing different firing densities, skipped states, and rolling versus static patterns (for both active versus deactivated cylinders and different skipped states for deactivated cylinders). However, other cylinder deactivation patterns are also possible without departing from the scope of this disclosure that utilize different engine configurations, different firing densities, and different patterns of the cylinder states and valve adjustments described herein.

Turning now to FIG. 22, an example timeline 2200 shows adjustments to engine operation during a cold start, prior to a catalyst coupled in an exhaust system of the engine reaching its light-off temperature. For example, the engine may be engine 10 shown in FIG. 1 and may include a valve actuation mechanism that enables intake and/or exhaust valves to be differently adjusted for each cylinder or groups of cylinders. In particular, a varying number of cylinders are deactivated during the cold start and do not produce engine torque via combustion while a remaining number of cylinders produce all of the engine torque, and at least some of the deactivated cylinders provide secondary air to the exhaust system. A firing density of the engine is shown in a plot 2202, a catalyst temperature is shown in a lot 2204, a burned gas to secondary air ratio is shown in a plot 2206, an amount of spark retard of the active cylinders is shown in a plot 2208, an intake valve lift used for the active cylinders is shown in a plot 2210, an intake valve lift used for deactivated cylinders providing the secondary air is shown in a dashed plot 2212, an intake valve lift used for deactivated cylinders not providing the secondary air is shown in a dotted plot 2214, an intake valve duration used for the active cylinders is shown in a plot 2216, an intake valve duration used for the deactivated cylinders providing the secondary air is shown in a dashed plot 2216, an intake valve duration used for the deactivated cylinders not providing the secondary air is shown in a dotted plot 2216, an exhaust valve opening (EVO) timing used for the active cylinders is shown in a plot 2222, and an EVO timing used for the deactivated cylinders providing the secondary air is shown in a dashed plot 2224.

For all of the above plots, the horizontal axis represents time, with time increasing along the horizontal axis from left to right. The vertical axis of each plot represents the labeled parameter. For plot 2202, the vertical axis shows the firing density relative to 1, with 1 corresponding to operating the engine with all cylinders active. Firing densities less than 1 correspond to operating the engine with a number of cylinders deactivated. As noted herein, the firing density is defined as a number of active cylinders divided by a total number of cylinders of the engine. For plot 2204, the catalyst temperature increases upward along the vertical axis (e.g., in the direction of the arrow) and is shown relative to ambient temperature and a threshold catalyst temperature represented by a dashed line 2205. In the present example, the threshold catalyst temperature is the light-off temperature of the catalyst. For plots 2206, 2208, 2210, 2212, 2214, 2216, 2218, and 2220, a magnitude of the labeled vertical parameter increases upward along the vertical axis, in the direction of the arrow. Further, the intake valve lift for plots 2210, 2212, and 2214 refers to a maximum height during valve opening, which may occur for a duration (e.g., the relative durations shown in plots 2216, 2218, and 2220) during a cylinder cycle (e.g., during an intake stroke of the corresponding cylinder). As such, an intake valve lift and intake valve duration of zero represents an intake valve that is fully deactivated and remains fully closed each cylinder cycle (e.g., the intake valve does not open). For plots 2222 and 2224, the EVO timing is shown relative to bottom dead center (BDC) timing. Values below (e.g., less than) BDC are retarded from BDC, and values above (e.g., greater than) BDC are advanced from BDC.

Prior to time t1, the engine is off, and combustion does not occur in any cylinder of the engine (e.g., the firing density is zero). Further, the catalyst temperature (plot 2204) is approximately equal to ambient temperature. The engine is started at time t1, and combustion initially occurs in every cylinder in response to the engine start (plot 2202). However, because the catalyst temperature (plot 2204) is less than the threshold catalyst temperature (dashed line 2205), a cold start condition is present, and catalyst heating is desired.

In response, the engine is transitioned to operating in a thermactor mode at time t2, and the firing density of the engine (plot 2202) is reduced in order to provide thermactor air to the exhaust system. Note that in other examples, a controller (e.g., controller 12 of FIG. 1) may anticipate the engine cold start, and the engine may be started in the thermactor mode (e.g., at time t1) instead of transitioning to the thermactor mode following the engine start. In the example shown, the firing density is reduced to $\frac{2}{3}$ at time t2 (e.g., two active, fired cylinders for every three cylinders), and a cylinder deactivation pattern of F-F-S-F-F-S is used to increase mixing. Further, all of the deactivated cylinders are used to provide secondary air, and a desired burned gas to secondary air ratio, represented by a dashed line 2207, is 4 in order to prevent exhaust system cooling. To provide the desired burned gas to secondary air ratio of four, the intake valve lift of the deactivated cylinders (dashed plot 2212) is decreased relative to the intake valve lift of the active cylinders (plot 2210) and the intake valve duration of the deactivated cylinders (dashed plot 2218) is reduced relative to the intake valve duration of the active cylinders (plot 2216). Because there are twice as many active cylinders as deactivated cylinders, the decreased intake valve lift and decreased intake valve duration of the deactivated cylinders results in a trapped mass for a deactivated cylinder that is half that of an active cylinder. As a result, a mass of burned gas exhausted by all of the active cylinders is approximately four times a mass of secondary air exhausted by all of the deactivated cylinders, producing the burned gas to secondary ratio of approximately four (plot 2206).

Note that in other examples, one of the intake valve lift and the intake valve duration may be reduced in the deactivated cylinders relative to the active cylinders (instead of both). Further, in other examples, an intake valve opening timing may be delayed in the deactivated cylinders relative to the active cylinders in addition to or as an alternative to intake valve lift and/or duration adjustments. Thus, timeline 2200 provides one example of intake valve adjustments that may be used to reduce the trapped mass in the deactivated cylinders relative to that in the active cylinders, and other valve adjustments are possible, such as the valve adjustments described herein with respect to method 500 of FIGS. 5A and 5B and the example cylinder deactivation patterns described with respect to FIGS. 6-21.

Also at time t2, the EVO timing of the active cylinders (plot 2222) is further retarded from BDC timing, while the EVO timing of the deactivated cylinders providing secondary air is advanced toward BDC timing (plot 2224). As such, and additionally due to the reduced trapped mass in the deactivated cylinders, in-cylinder vacuum at EVO is increased in the deactivated cylinders, producing greater mixing between the secondary air and the burned gas from the active cylinders. Further, each active cylinder is operated with a rich AFR at time t2 to provide fuel to the exhaust system to react with the secondary air, generating exotherms that heat the catalyst. Further still, the active cylinders are operated with aggressive spark retard to provide additional waste heat to the exhaust. As a result, the catalyst temperature increases between time t2 and time t3 (plot 2204).

At time t3, the catalyst temperature (plot 2204) is increased but remains below the threshold catalyst temperature (dashed line 2205). Because the catalyst temperature is increased, less aggressive spark retard can be used, allowing each active cylinder to produce more torque. As such, the engine can be operated with fewer active cylinders to meet the torque demand, and at time t3, the firing density is decreased (plot 2202) and the spark retard is decreased (plot 2208). The firing density is reduced to ½, which allows a skip fire pattern of F-S-F-S-F-S to be used where all of the deactivated cylinders continue to provide secondary air to the exhaust system.

The F-S-F-S-F-S has increased mixing compared with the F-F-S-F-F-S pattern used beginning at time t2. However, the desired burned gas to secondary air ratio (dashed line 2207) remains at four, and because the number of deactivated cylinders has increased, additional intake valve adjustments are performed at time t3 to reduce the trapped mass of each deactivated cylinder to ¼ of that of an active cylinder. In the present example, the intake valve lift of the deactivated cylinders (dashed plot 2212) is further decreased relative to the intake valve lift of the active cylinders (plot 2210), and the intake valve duration of the deactivated cylinders (dashed plot 2218) is further decreased relative to the intake valve duration of the active cylinders (plot 2216). As a result, the burned gas to secondary air ratio remains at approximately four (plot 2206). Further, at time t3, the remaining active cylinders continue to operate with the retarded EVO timing (plot 2222), while the deactivated cylinders continue to operate with the EVO timing close to BDC timing (dashed plot 2224).

At time t4, the catalyst temperature (plot 2204) is further increased but remains below the threshold catalyst temperature (dashed line 2205). The firing density is reduced to ⅓ (plot 2202), and the spark retard is further reduced accordingly (plot 2208) in order to produce more torque via each remaining active cylinder. Further, a cylinder deactivation pattern of F-S-s-F-S-s is used where half of the deactivated cylinders do not provide secondary air to the exhaust system. As such, the intake valve lift of the deactivated cylinders that are not providing secondary air is reduced to zero (dotted plot 2214), as is the intake valve duration of the deactivated cylinders that are not providing secondary air (dotted plot 2220). Because there continue to be an equal number of active cylinders and deactivated cylinders providing secondary air, the intake valve lift of the deactivated cylinders providing the secondary air (dashed plot 2212) remains the same, as does the intake valve duration of the deactivated cylinders providing the secondary air (dashed plot 2220).

At time t5, the catalyst temperature (plot 2204) reaches the threshold catalyst temperature (dashed line 2205). However, if the engine were not operated in the thermactor mode and only spark retard were used to provide heat to the exhaust system, the catalyst temperature would increase more slowly and would not reach the threshold catalyst temperature by time t5, such as represented by a dashed segment 2203. In response to reaching the threshold catalyst temperature, the deactivated cylinders are reactivated, and the firing density is increased to one (plot 2202). Further, the spark retard (plot 2208) is initially increased to reduce torque disturbances because all of the cylinders of the engine are producing torque, but then the spark retard is decreased as additional engine parameters, such as airflow, are adjusted to compensate for the increased number of active cylinders. Further, in the example shown, the cylinders are operated with an EVO timing that is slightly advanced from BDC timing (plot 2222) in order to reduce pumping losses.

In this way, hydrocarbon emissions during catalyst warm-up may be reduced by generating exotherms in the exhaust using secondary air provided by skipped (e.g., deactivated) cylinders. By providing the secondary air via the skipped cylinders instead of a separate, dedicated thermactor air source, a cost of the system may be reduced. Further, by using intake and exhaust valve adjustments to control secondary air production and mixing with burned exhaust gas, firing densities that reduce NVH and further increase mixing may be used that would otherwise produce too much or too little secondary air. By reducing or preventing excessive secondary air flow, exhaust system cooling may be reduced or prevented, further expediting the catalyst warm-up and further reducing vehicle emissions.

The technical effect of controlling an amount of secondary air provided by unfired cylinders relative to burned gas from fired cylinders via cylinder valve adjustments is that catalyst warm-up may be expedited with decreased vehicle emissions.

The technical effect of adjusting an intake valve of an unfired cylinder relative to that of a fired cylinder while providing secondary air via one or more unfired cylinders is that exhaust system cooling may be decreased.

The technical effect of adjusting an exhaust valve of an unfired cylinder relative to that of a fired cylinder while providing secondary air via one or more unfired cylinders is that exotherm generation in an exhaust system may be increased.

The technical effect of operating an unfired cylinder of a four-stroke engine in a two-stroke mode during catalyst heating is that secondary air may be provided twice during each engine cycle to increase mixing and exotherm generation in an exhaust system of the engine.

As one example, a method comprises: during a cold start condition, operating an engine with a first number of cylinders unfired and a remaining number of cylinders fired during an engine cycle, opening an intake valve of an unfired cylinder of the first number of cylinders during an expansion stroke of the unfired cylinder, and opening an exhaust valve of the unfired cylinder during a compression stroke of the unfired cylinder. In a first example of the method, the intake valve is controlled via an intake continuously variable valve lift (CVVL) actuator and the exhaust valve is controlled via an exhaust CVVL actuator. In a second example of the method, optionally including the first example, the intake CVVL actuator comprises an intake cam including a first intake cam lobe that provides a first intake valve lift interval during an intake stroke of the unfired cylinder and a second intake cam lobe that provides a second intake valve lift interval during the expansion stroke of the unfired cylinder, the exhaust CVVL actuator comprises an exhaust cam including a first exhaust cam lobe that provides a first exhaust valve lift interval during an exhaust stroke of the unfired cylinder and a second exhaust cam lobe that provides a second exhaust valve lift interval during the compression stroke of the unfired cylinder, and the method further comprises rotating each of the intake cam and the exhaust cam at half of a speed of a crankshaft of the engine. In a third example of the method, optionally including one or both of the first and second examples, opening the intake valve of the unfired cylinder during the expansion stroke of the unfired cylinder comprises maintaining a first hydraulic pressure in the intake CVVL actuator above a first threshold pressure during the second intake valve lift interval, and wherein opening the exhaust valve of the unfired cylinder during the compression stroke of the unfired cylinder comprises maintaining a second hydraulic pressure in the exhaust CVVL actuator above a second threshold pressure during the second exhaust valve lift interval. In a fourth example of the method, optionally including one or more or each of the first through third examples, the method further comprises: during the cold start condition: maintaining closed the intake valve during the intake stroke of the unfired cylinder by maintaining the first hydraulic pressure in the intake CVVL actuator below the first threshold pressure during the first intake valve lift interval, and maintaining closed the exhaust valve during the exhaust stroke of the unfired cylinder by maintaining the second hydraulic pressure in the exhaust CVVL actuator below the second threshold pressure during the first exhaust valve lift interval. In a fifth example of the method, optionally including one or more or each of the first through fourth examples, the method further comprises: while the cold start condition is not present: operating the engine with every cylinder fired during each engine cycle, opening the intake valve during the intake stroke, and not the expansion stroke, by maintaining the first hydraulic pressure above the first threshold pressure during the first intake valve lift interval and maintaining the first hydraulic pressure below the first threshold pressure during the second intake valve lift interval, and opening the exhaust valve during the exhaust stroke, and not the compression stroke, by maintaining the second hydraulic pressure above the second threshold pressure during the first exhaust valve lift interval and maintaining the second hydraulic pressure below the second threshold pressure during the second exhaust valve lift interval. In a sixth example of the method, optionally including one or more or each of the first through fifth examples, the intake CVVL actuator comprises an intake cam having a single intake cam lobe, the exhaust CVVL actuator comprises an exhaust cam having a single exhaust cam lobe, and the method further comprises rotating each of the intake cam and the exhaust cam at a same speed as a crankshaft of the engine. In a seventh example of the method, optionally including one or more or each of the first through sixth examples, the single intake cam lobe provides an intake valve lift interval that occurs during both of an intake stroke of the unfired cylinder and the expansion stroke of the unfired cylinder, the single exhaust cam lobe provides an exhaust valve lift interval that occurs during both of an exhaust stroke of the unfired cylinder and the compression stroke of the unfired cylinder, and the method further comprises: during the cold start condition: bypassing the intake valve lift interval during the intake stroke of the unfired cylinder by reducing a first hydraulic pressure in the intake CVVL actuator below a first threshold pressure for opening the intake valve, and bypassing the exhaust valve lift interval during the exhaust stroke of the unfired cylinder by reducing a second hydraulic pressure in the exhaust CVVL actuator below a second threshold pressure for opening the exhaust valve. In an eighth example of the method, optionally including one or more or each of the first through seventh examples, the method further comprises: while the cold start condition is not present: operating the engine with every cylinder fired during each engine cycle, opening the intake valve during the intake stroke, and not the expansion stroke, by maintaining the first hydraulic pressure above the first threshold pressure during the intake stroke and maintaining the first hydraulic pressure below the first threshold pressure during the expansion stroke, and opening the exhaust valve during the exhaust stroke, and not the compression stroke, by maintaining the second hydraulic pressure above the second threshold pressure during the exhaust stroke and maintaining the second hydraulic pressure below the second threshold pressure during the compression stroke. In a ninth example of the method, optionally including one or more or each of the first through eighth examples, the method further comprises: reducing a lift of the intake valve of the unfired cylinder relative to an intake valve lift of the remaining number of cylinders by reducing a hydraulic pressure in the intake CVVL actuator.

As another example, a method comprises: during a cold start, operating the engine with a first number of skipped cylinders and a second, remaining number of active cylinders each engine cycle, adjusting a stroke during which a valve of at least a first cylinder of the first number of skipped cylinders is open via a continuously variable valve lift mechanism. In a first example of the method, each engine cycle occurs over a 720 crank angle degree rotation of a crankshaft of the engine, and wherein adjusting the stroke during which the valve of at least the first cylinder of the first number of skipped cylinders is open comprises opening the valve during a first stroke that is separated from a second stroke during which the valve is opened while the first cylinder is active by 360 crank angle degrees. In a second example of the method, optionally including the first example, the valve is an intake valve, the first stroke is an expansion stroke of the first cylinder, and the second stroke is an intake stroke of the first cylinder. In a third example of the method, optionally including one or both of the first and second examples, the valve is an exhaust valve, the first stroke is a compression stroke of the first cylinder, and the second stroke is an exhaust stroke of the first cylinder. In a fourth example of the method, optionally including one or more or each of the first through third examples, adjusting the stroke during which the valve of the at least the first cylinder of the first number of skipped cylinders is open further comprises opening the valve during the second stroke in addition to opening the valve during the first stroke during the cold start. In a fifth example of the method, optionally including one or more or each of the first through fourth examples, at least a portion of the first number of skipped cylinders provides air to an exhaust system of the engine, and each of the second number of active cylinders provide exhaust gas to the exhaust system. In a sixth example of the method, optionally including one or more or each of the first through fifth examples, adjusting the stroke during which the valve of the at least one cylinder of the first number of skipped cylinders is open via the continuously variable valve lift mechanism comprises adjusting a hydraulic pressure within a passage fluidically coupling a cam cylinder to a valve cylinder by adjusting a position of a hydraulic control valve.

In yet another example, a system comprises: a variable displacement engine including a plurality of cylinders, each of the plurality of cylinders including an intake valve and an exhaust valve, and a controller storing instructions in non-transitory memory that, when executed, cause the controller to: operate the variable displacement engine with a portion of the plurality of cylinders unfired and a remaining portion of the plurality of cylinders fired during a cold start, open the intake valve of at least one unfired cylinder of the portion of the plurality of cylinders during an expansion stroke of the at least one unfired cylinder, and open the exhaust valve of the at least one unfired cylinder during a compression stroke of the at least one unfired cylinder. In a first example of the system, the intake valve is controlled by an intake continuously variable valve lift (CVVL) actuator comprising an intake cam having a rise interval every 360 rotation of a crankshaft of the variable displacement engine, the rise interval positioned to open the intake valve during an intake stroke of the at least one unfired cylinder and during the expansion stroke of the at least one unfired cylinder while a hydraulic pressure of the intake CVVL actuator is greater than a threshold hydraulic pressure. In a second example of the system, optionally including the first example, the exhaust valve is controlled by an exhaust continuously variable valve lift (CVVL) actuator comprising an exhaust cam having a rise interval every 360 rotation of a crankshaft of the variable displacement engine, the rise interval positioned to open the exhaust valve during an exhaust stroke of the at least one unfired cylinder and during the compression stroke of the at least one unfired cylinder while a hydraulic pressure of the exhaust CVVL actuator is greater than a threshold hydraulic pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a cold start condition,
operating an engine with a first number of cylinders unfired and a remaining number of cylinders fired during an engine cycle;
opening an intake valve of an unfired cylinder of the first number of cylinders during an expansion stroke of the unfired cylinder; and
opening an exhaust valve of the unfired cylinder during a compression stroke of the unfired cylinder.

2. The method of claim 1, wherein the intake valve is controlled via an intake continuously variable valve lift (CVVL) actuator and the exhaust valve is controlled via an exhaust CVVL actuator.

3. The method of claim 2, wherein the intake CVVL actuator comprises an intake cam including a first intake cam lobe that provides a first intake valve lift interval during an intake stroke of the unfired cylinder and a second intake cam lobe that provides a second intake valve lift interval during the expansion stroke of the unfired cylinder, the exhaust CVVL actuator comprises an exhaust cam including a first exhaust cam lobe that provides a first exhaust valve lift interval during an exhaust stroke of the unfired cylinder and a second exhaust cam lobe that provides a second exhaust valve lift interval during the compression stroke of the unfired cylinder, and the method further comprises rotating each of the intake cam and the exhaust cam at half of a speed of a crankshaft of the engine.

4. The method of claim 3, wherein opening the intake valve of the unfired cylinder during the expansion stroke of the unfired cylinder comprises maintaining a first hydraulic pressure in the intake CVVL actuator above a first threshold pressure during the second intake valve lift interval, and wherein opening the exhaust valve of the unfired cylinder during the compression stroke of the unfired cylinder comprises maintaining a second hydraulic pressure in the exhaust CVVL actuator above a second threshold pressure during the second exhaust valve lift interval.

5. The method of claim 4, further comprising:
during the cold start condition:
maintaining closed the intake valve during the intake stroke of the unfired cylinder by maintaining the first hydraulic pressure in the intake CVVL actuator below the first threshold pressure during the first intake valve lift interval; and
maintaining closed the exhaust valve during the exhaust stroke of the unfired cylinder by maintaining the second hydraulic pressure in the exhaust CVVL actuator below the second threshold pressure during the first exhaust valve lift interval.

6. The method of claim 4, further comprising:
while the cold start condition is not present:
operating the engine with every cylinder fired during each engine cycle;
opening the intake valve during the intake stroke, and not the expansion stroke, by maintaining the first hydraulic pressure above the first threshold pressure during the first intake valve lift interval and maintaining the first hydraulic pressure below the first threshold pressure during the second intake valve lift interval; and
opening the exhaust valve during the exhaust stroke, and not the compression stroke, by maintaining the second hydraulic pressure above the second threshold pressure during the first exhaust valve lift interval and maintaining the second hydraulic pressure below the second threshold pressure during the second exhaust valve lift interval.

7. The method of claim 2, wherein the intake CVVL actuator comprises an intake cam having a single intake cam lobe, the exhaust CVVL actuator comprises an exhaust cam having a single exhaust cam lobe, and the method further comprises rotating each of the intake cam and the exhaust cam at a same speed as a crankshaft of the engine.

8. The method of claim 7, wherein the single intake cam lobe provides an intake valve lift interval that occurs during both of an intake stroke of the unfired cylinder and the expansion stroke of the unfired cylinder, the single exhaust cam lobe provides an exhaust valve lift interval that occurs during both of an exhaust stroke of the unfired cylinder and the compression stroke of the unfired cylinder, and the method further comprises:
during the cold start condition:
bypassing the intake valve lift interval during the intake stroke of the unfired cylinder by reducing a first hydraulic pressure in the intake CVVL actuator below a first threshold pressure for opening the intake valve; and
bypassing the exhaust valve lift interval during the exhaust stroke of the unfired cylinder by reducing a second hydraulic pressure in the exhaust CVVL actuator below a second threshold pressure for opening the exhaust valve.

9. The method of claim 8, further comprising:
while the cold start condition is not present:
operating the engine with every cylinder fired during each engine cycle;
opening the intake valve during the intake stroke, and not the expansion stroke, by maintaining the first hydraulic pressure above the first threshold pressure during the intake stroke and maintaining the first hydraulic pressure below the first threshold pressure during the expansion stroke; and
opening the exhaust valve during the exhaust stroke, and not the compression stroke, by maintaining the second hydraulic pressure above the second threshold pressure during the exhaust stroke and maintaining the second hydraulic pressure below the second threshold pressure during the compression stroke.

10. The method of claim 2, further comprising:
reducing a lift of the intake valve of the unfired cylinder relative to an intake valve lift of the remaining number of cylinders by reducing a hydraulic pressure in the intake CVVL actuator.

11. A system, comprising:
a variable displacement engine including a plurality of cylinders, each of the plurality of cylinders including an intake valve and an exhaust valve; and
a controller storing instructions in non-transitory memory that, when executed, cause the controller to:
operate the variable displacement engine with a portion of the plurality of cylinders unfired and a remaining portion of the plurality of cylinders fired during a cold start;
open the intake valve of at least one unfired cylinder of the portion of the plurality of cylinders during an expansion stroke of the at least one unfired cylinder; and
open the exhaust valve of the at least one unfired cylinder during a compression stroke of the at least one unfired cylinder.

12. The system of claim 11, wherein the intake valve is controlled by an intake continuously variable valve lift (CVVL) actuator comprising an intake cam having a rise interval every 360 rotation of a crankshaft of the variable displacement engine, the rise interval positioned to open the intake valve during an intake stroke of the at least one unfired cylinder and during the expansion stroke of the at least one unfired cylinder while a hydraulic pressure of the intake CVVL actuator is greater than a threshold hydraulic pressure.

13. The system of claim 11, wherein the exhaust valve is controlled by an exhaust continuously variable valve lift (CVVL) actuator comprising an exhaust cam having a rise interval every 360 rotation of a crankshaft of the variable displacement engine, the rise interval positioned to open the exhaust valve during an exhaust stroke of the at least one unfired cylinder and during the compression stroke of the at least one unfired cylinder while a hydraulic pressure of the exhaust CVVL actuator is greater than a threshold hydraulic pressure.

* * * * *